(12) United States Patent
Casimiro et al.

(10) Patent No.: US 12,495,179 B2
(45) Date of Patent: *Dec. 9, 2025

(54) CONTROL WITH DISTRIBUTED COMMAND PROCESSING

(71) Applicant: Sonos, Inc., Goleta, CA (US)

(72) Inventors: Daniel Casimiro, Mansfield, MA (US); Gregory Ramsperger, Portland, OR (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/811,338

(22) Filed: Aug. 21, 2024

(65) Prior Publication Data

US 2025/0097505 A1    Mar. 20, 2025

Related U.S. Application Data

(63) Continuation of application No. 18/001,160, filed as application No. PCT/US2021/036392 on Jun. 8, 2021, now Pat. No. 12,075,109.

(60) Provisional application No. 63/112,459, filed on Nov. 11, 2020, provisional application No. 63/036,295, filed on Jun. 8, 2020.

(51) Int. Cl.
*H04N 21/422* (2011.01)
*H04N 21/63* (2011.01)

(52) U.S. Cl.
CPC ....... *H04N 21/42203* (2013.01); *H04N 21/63* (2013.01)

(58) Field of Classification Search
CPC .................. H04N 21/42203; H04N 21/63
See application file for complete search history.

(56) References Cited

U.S. PATENT DOCUMENTS

| | | | |
|---|---|---|---|
| 8,234,395 B2 * | 7/2012 | Millington | H04L 12/2854 709/248 |
| 10,931,999 B1 * | 2/2021 | Jobanputra | H04N 21/233 |
| 11,184,660 B1 * | 11/2021 | Ewanchuk | H04N 21/43635 |
| 2007/0038999 A1 * | 2/2007 | Millington | H03G 3/00 718/100 |
| 2017/0243587 A1 * | 8/2017 | Plagge | H04L 67/561 |
| 2019/0102145 A1 * | 4/2019 | Wilberding | G10L 15/08 |
| 2023/0053765 A1 * | 2/2023 | He | H04N 21/42204 |

* cited by examiner

*Primary Examiner* — Nicholas T Corbo
(74) *Attorney, Agent, or Firm* — Fortem IP LLP

(57) ABSTRACT

Example techniques described herein involve a point-of-contact (POC) playback device that operates as an intermediary between the cloud and a media playback system that includes the POC playback device. As the intermediary, when the cloud issues a command to the media playback system, the POC playback device may perform some or all processing of the command to determine how to implement that command in the media playback system. For instance, the POC playback device may determine the target devices for a command, and then cause the target devices to carry out the command. This processing by the POC playback device may simplify control of the media playback system from the perspective of third party controllers, as these controllers need not have full and/or completely up-to-date knowledge of the media playback system functionality and status, among other possible benefits.

20 Claims, 30 Drawing Sheets

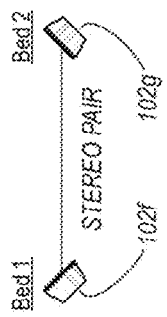
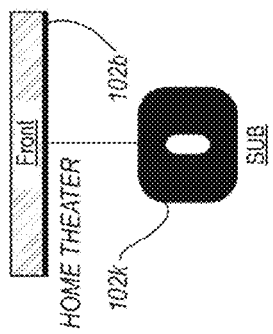
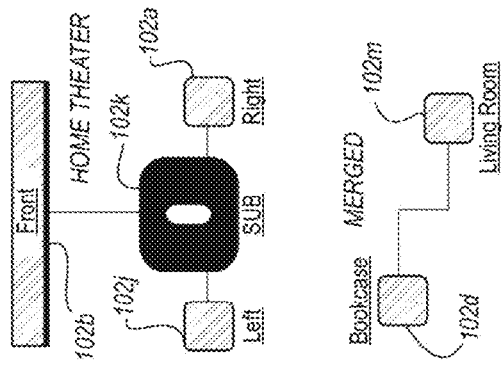
Fig. 3B
Fig. 3C
Fig. 3D
Fig. 3E
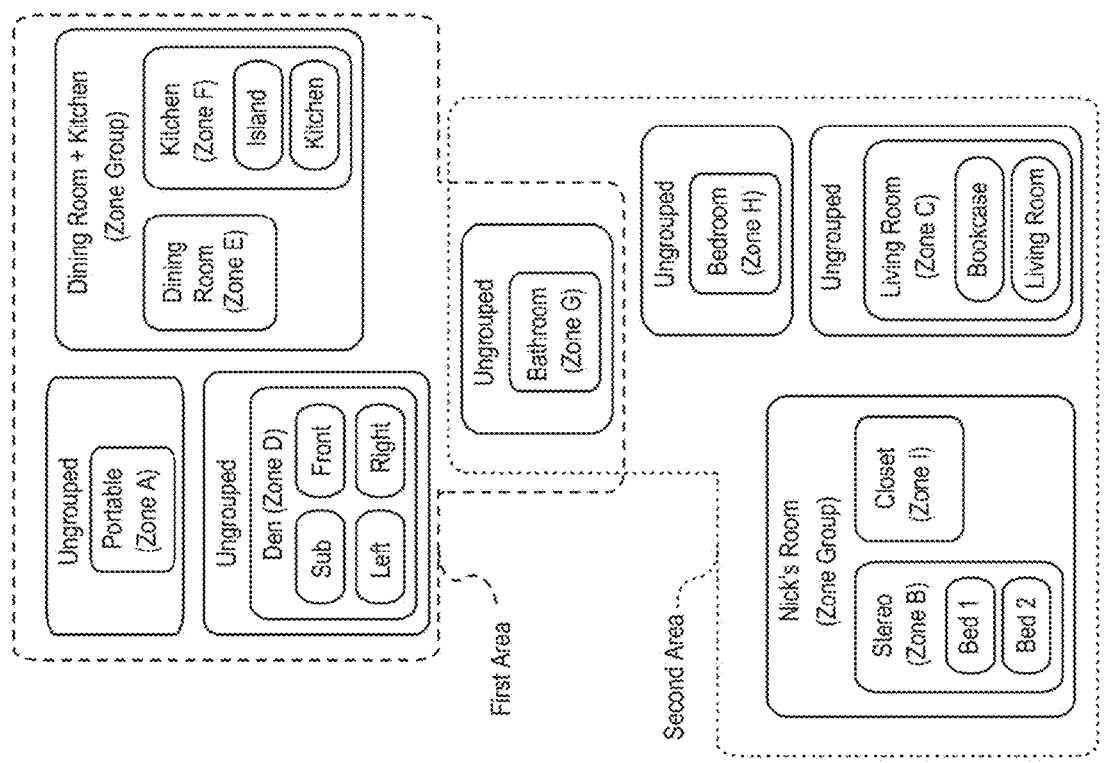
Fig. 3A

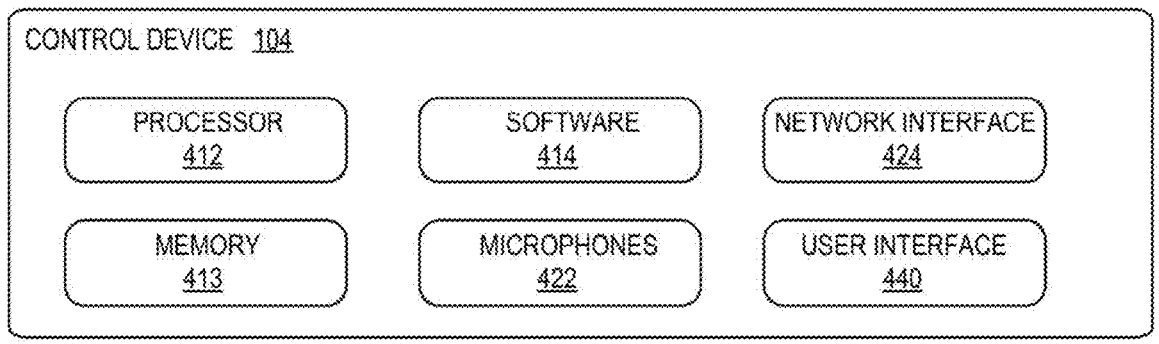
Fig. 4
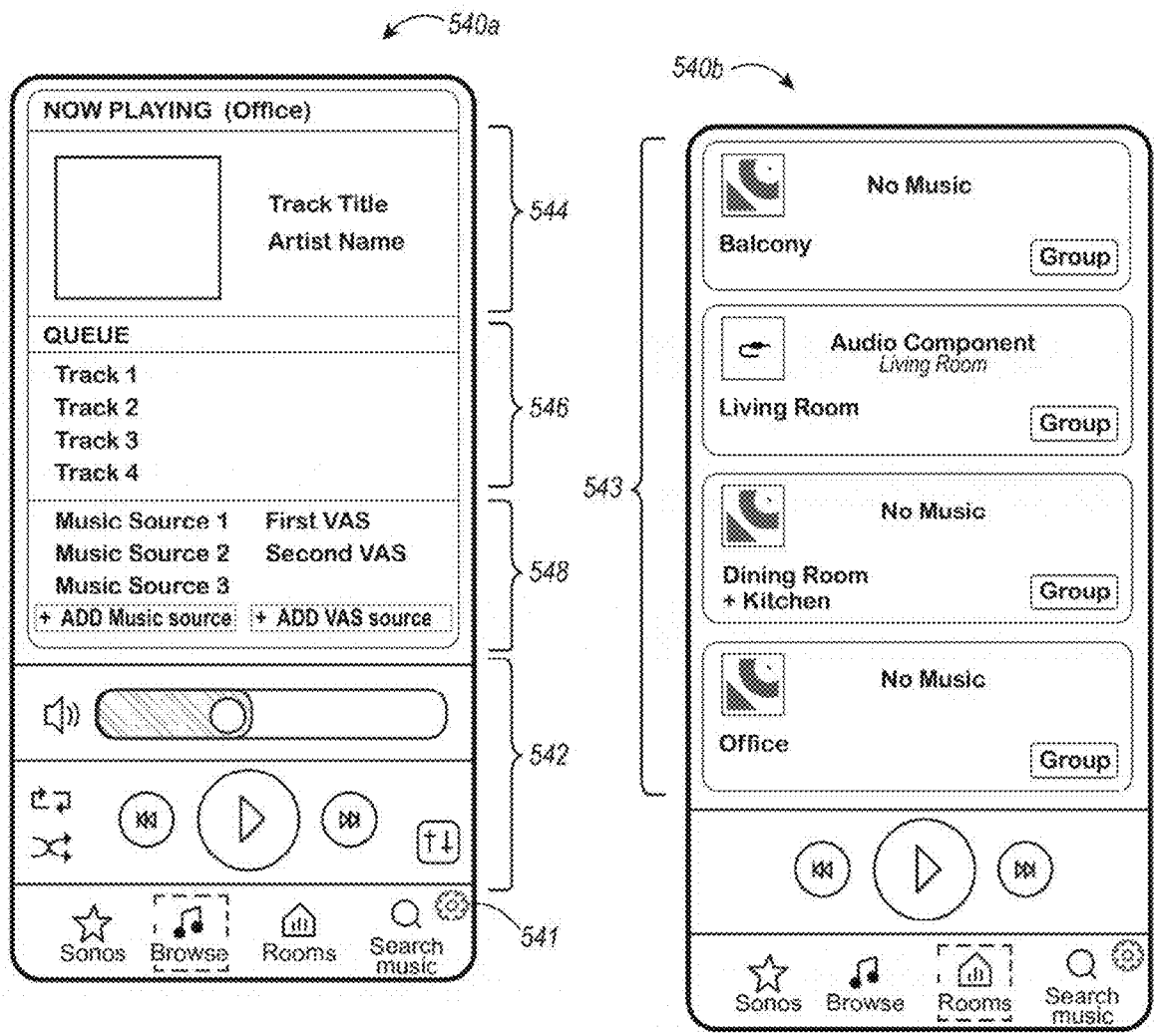
Fig. 5A
Fig. 5B

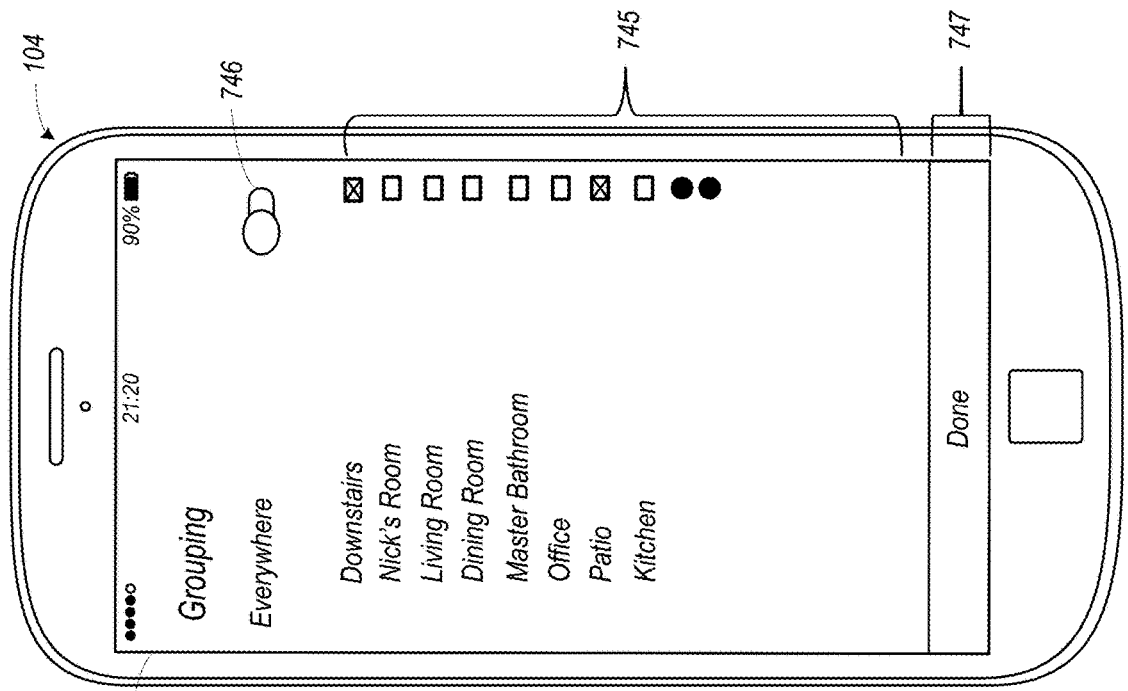
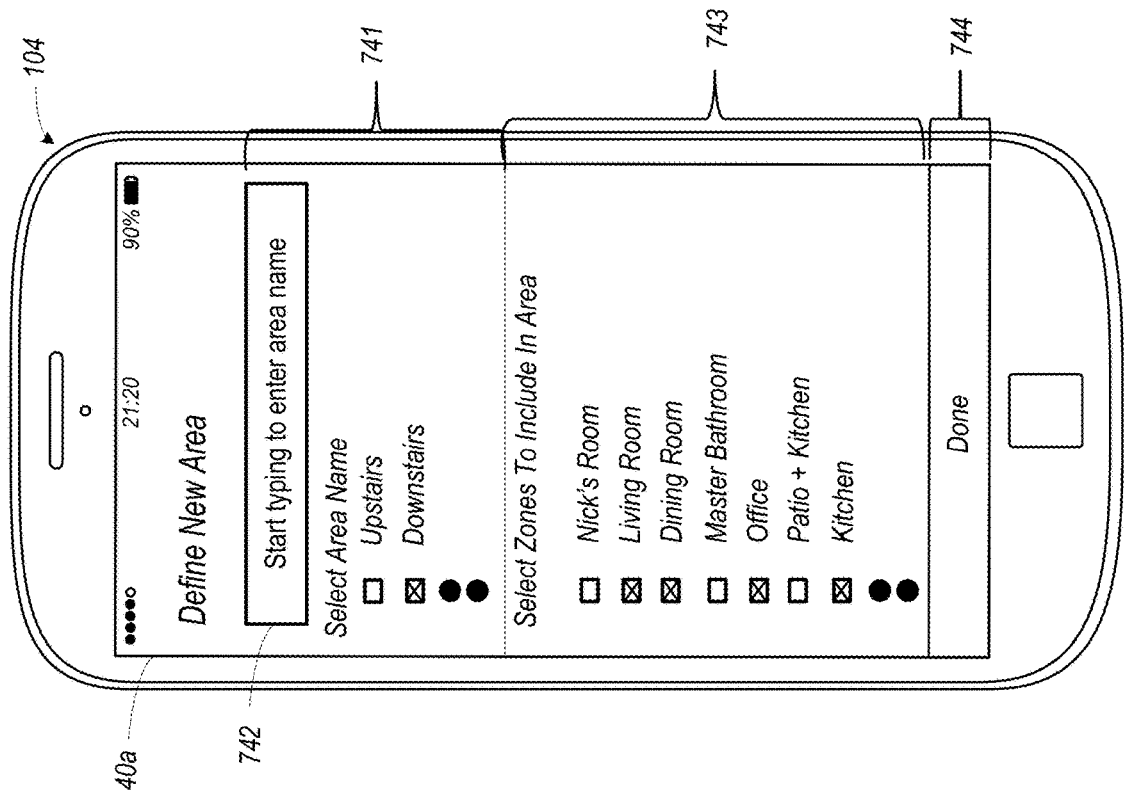
FIGURE 7A
FIGURE 7B

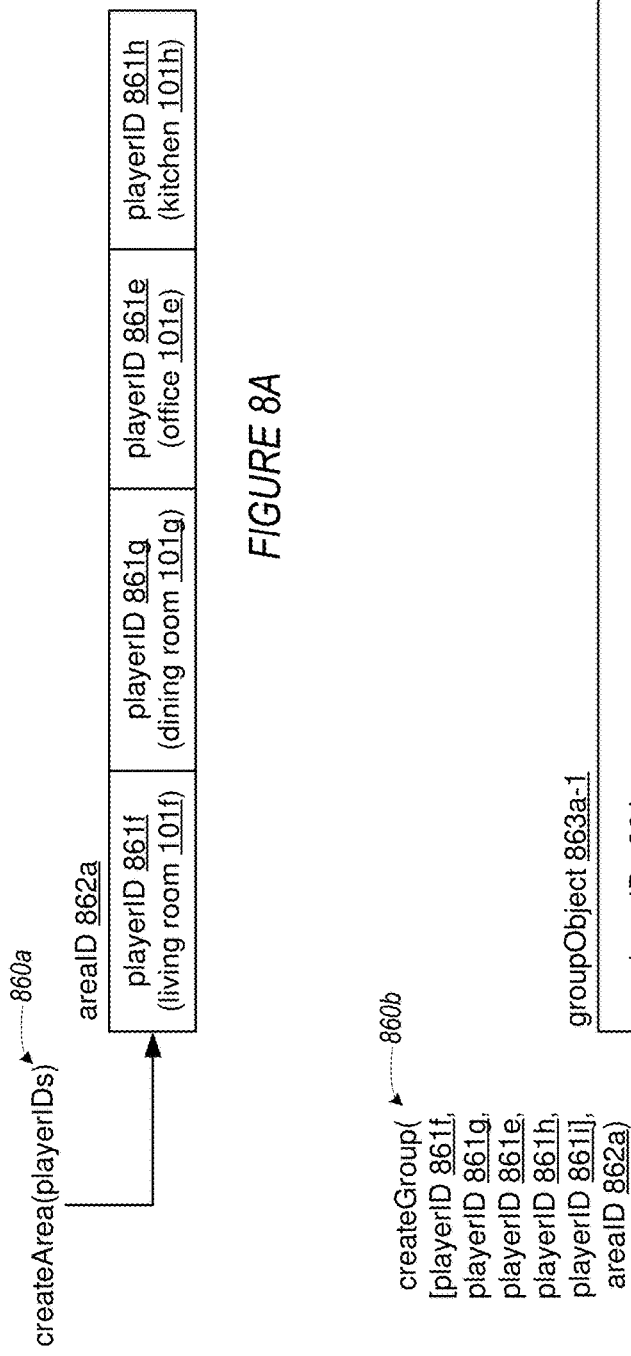
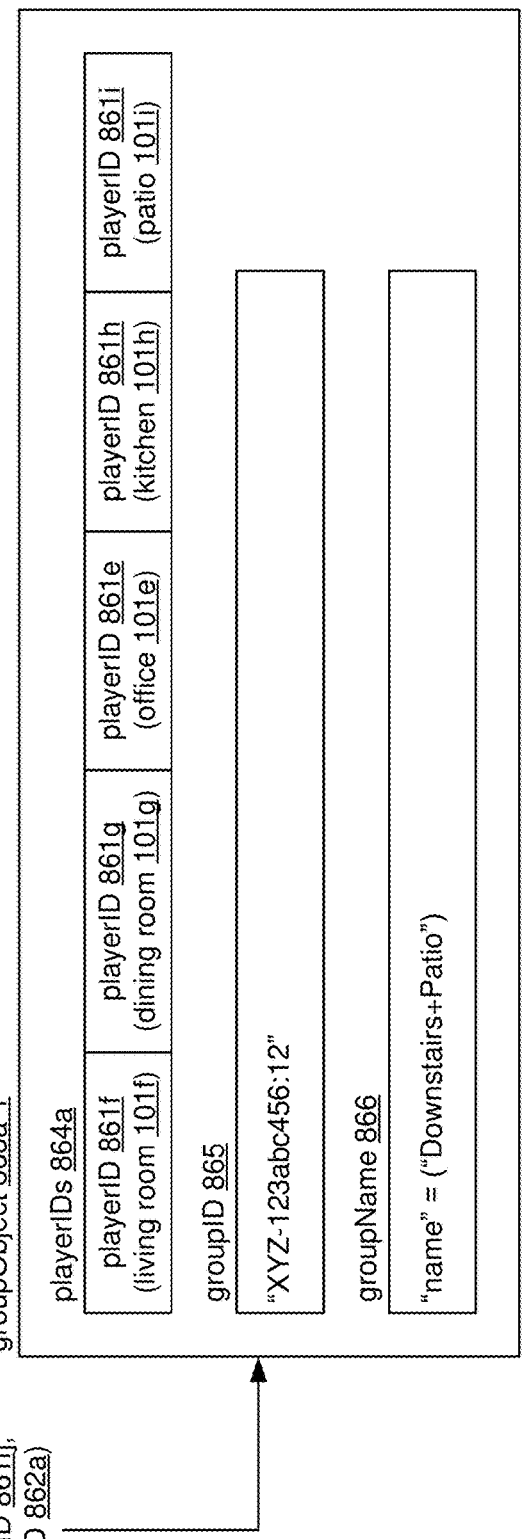

CONTROL WITH DISTRIBUTED COMMAND PROCESSING

CROSS-REFERENCE TO RELATED APPLICATIONS

This application is a continuation of U.S. patent application Ser. No. 18/001,160, filed Dec. 8, 2022, now U.S. Pat. No. 12,075,109, which is a 371 U.S. national phase application of International Application No. PCT/US2021/036392, filed Jun. 8, 2021, which claims the benefit of priority to U.S. Patent Application No. 63/036,295, filed Jun. 8, 2020, and to U.S. Patent Application No. 63/112,459, filed Nov. 11, 2020, each of which is incorporated herein by reference in its entirety.

FIELD OF THE DISCLOSURE

The present technology relates to consumer goods and, more particularly, to methods, systems, products, features, services, and other elements directed to voice-assisted control of media playback systems or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings where:

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIGS. 3A, 3B, 3C, 3D and 3E are diagrams showing example playback device configurations in accordance with aspects of the disclosure.

FIG. 4 is a functional block diagram of an example controller device in accordance with aspects of the disclosure.

FIGS. 5A and 5B are controller interfaces in accordance with aspects of the disclosure.

FIGS. 7A and 7B are example controller interfaces in accordance with aspects of the disclosure.

FIGS. 8A, 8B, 8C, and 8D are diagrams illustrating example functions and data structures.

Figure 1A:
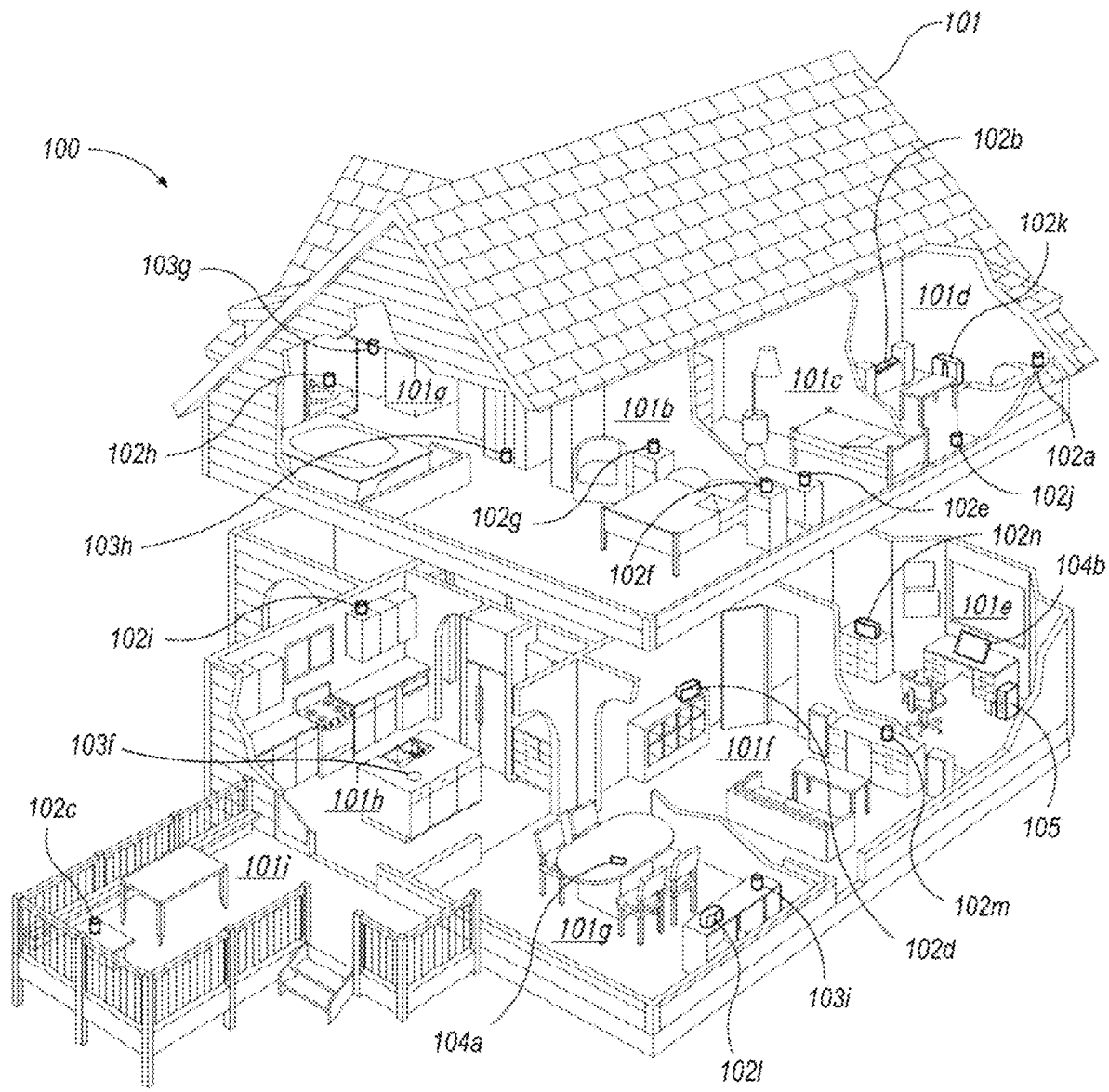
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103a is first introduced and discussed with reference to FIG. 1A.

DETAILED DESCRIPTION

I. Overview

Example techniques described herein involve a point-of-contact (POC) playback device (or other suitable device, such as a smart hub) that operates as an intermediary between the cloud and a media playback system (or other system of networked devices) that includes the POC playback device. As the intermediary, when the cloud issues a command to the media playback system, the POC playback device may perform some or all processing of the command to determine, e.g., the nature of the command and/or how to implement that command in the media playback system. For instance, the POC playback device may determine the target devices for a command, and then cause the target devices to carry out the command. This processing by the POC playback device may enable more efficient control of the media playback system via external entities (such as a cloud-based infrastructure and/or other third party controllers, etc.), as these external entities need not have full and/or completely up-to-date knowledge of the media playback system functionality and status, among other possible benefits. Moreover, such an architecture enables resolution and execution of a command to be carried out by a device that is native to the media playback system itself, rather than a third-party.

An exemplary cloud-based control architecture may include one or more platform servers that interface with the POC playback device. These platform servers may complement the media playback system by facilitating control of playback devices in the media playback system using third party cloud services, such as voice assistants, streaming media services, and/or other providers of hardware including other playback systems, or "smart home" appliances (e.g., refrigerators, microwaves, ovens, dishwashers, washing machines, hot water heaters), among other examples. Third party cloud services may interface with the platform server(s) using common application programming interfaces (APIs) of the media playback system platform and/or of the third party cloud services. The one or more platform servers may translate this data to native control API calls and then interface with the POC playback device in the media playback system to execute the playback command locally. Native (first-party controllers) may likewise interface with the platform servers and/or the POC playback device directly to facilitate control of the media playback system.

In the context of voice control, a voice assistant service may process a voice input to determine what the user wants to do (i.e., intent) but not be required to determine how to implement this intent in the media playback system. Instead, using example techniques, the POC playback device may receive data representing the user intent, and from this data determine how to implement this intent. In this manner, the voice assistant service is freed from having to know the details of how to implement this intent in the media playback system.

For instance, a voice assistant service may process a voice input (e.g., "play some music in Living Room") and determine that the intent is to play music and that one of the target parameters is "Living Room." This processing may be referred to as a first command determination. The voice assistant service may pass data representing the play command (referred to herein as a "command intermediate") and the target parameter (referred to herein as an "intermediate parameter") to the POC playback device via the one or more platform servers.

As another example, a voice assistant service may perform an initial intent determination and then the POC playback device may perform a second intent determination. In this manner, intent determination is performed by the combination of voice assistant service and the POC playback device, rather than a single entity. For instance, a voice assistant service may perform an initial intent determination on a voice input (e.g., "play some classical music") to yield command intermediates representing an intent to play music. The POC playback device may then perform its own intent determination to determine various other aspects of the intent, such as the exact content, its source, as well as the target playback devices, among other examples.

From this command intermediate and the intermediate parameter, the POC playback device may perform a second command determination to determine how to implement this intent in the media playback system. For example, the POC playback device may resolve implicit (e.g., where the command was spoken, or "here") and explicit ("Living Room") targets into a set of target playback devices. Further, the POC playback device may determine the sequence of media playback system commands involved in implementing this intent. For instance, implementing this intent may involve forming a synchrony group from two playback devices, which can then be issued a play command once the synchrony group is formed.

By having the POC playback device determine how to implement the intent, the voice assistant service is freed from having to manage implementation details. For instance, forming the synchrony group may involve designating a group coordinator that distributes timing information to group members to facilitate synchronous playback. Under this architecture, the voice assistant service does not need to know or manage these details, simplifying control of the media playback system.

Further, by shifting this burden to the POC playback device, the media playback system may behave more consistently across multiple controllers, such as two or more voice assistant services. For instance, rather than a first voice assistant service and a second voice assistant service determining independently (and perhaps differently) how to implement respective voice inputs with the same intent, the POC playback device may implement these different voice inputs with the same intent in a consistent manner.

Moreover, since ultimate control is native to the media playback system under this architecture, the manufacturer of the media playback system can maintain control of the user experience. As indicated above, in this architecture, user interactions with the media playback system in various contexts (e.g., different voice assistant services or other cloud services) and/or controllers (e.g., native and third-party) are consistent and predictable, which may contribute to an improved user experience. Further, as third-parties change their functionality (e.g., via software updates), the behavior of the media playback system can remain constant, or be updated in a consistent manner.

In addition, this architecture may significantly reduce the amount of state information that has to be transmitted to third party controllers when changes to the media playback system are made. Since third party services do not need to know all details of how to implement a command, state information associated with these details does not need to be maintained by the third party services. Instead, third party controllers may maintain a subset of state information. By reducing amount of state information maintained by third parties, this architecture may significantly reduce cloud computing costs incurred in updating and storing the state information.

Another possible benefit of this architecture is that the third party controllers need not specifically direct a command to any particular device in the media playback system. Instead, the issuing device can send the command to the one or more platform servers (i.e., the cloud), and trust that the command will be handled appropriately from that hub. Such an implementation may make the platform service API easier to consume from the perspective of the third party services.

After determining the media playback system commands and the target playback device(s), the POC playback device causes the target playback device(s) to carry out the media playback system commands. For instance, the POC playback device may cause the target playback device(s) to carry out the media playback system commands using state updates. In particular, the POC playback device may update state information maintained by the POC playback device according to the media playback system commands. This updating in turn causes the state updates to be evented across the media playback system, thereby causing the target playback device(s) to make the corresponding changes. As another example, the POC playback device may send the target playback device(s) instructions to perform the media playback system commands.

Yet further, the POC playback device may cause the target playback device(s) to carry out the media playback system commands by sending data representing the media playback system commands to the platform server(s). The platform server(s) may then use state updates or instructions to further cause the target playback device(s) to carry out the media playback system commands. This implementation may complement a cloud-based control architecture, while still providing the benefit of the POC playback device determining how to implement a command locally.

A POC playback device may be able to draw upon additional contextual data as compared with a voice assistant service or other third party service. Such third party services might only have access to data that the user has generated within the service, or that the user has opted to share with the service. Some users might be apprehensive about sharing all of their data with cloud servicers such as voice assistant services for privacy reasons. In contrast, if their data were to be used by a POC playback device for resolving intent locally, these users might opt to share more data.

More broadly, by making certain determinations locally, this architecture may protect user privacy and keep user data secure relative to determinations performed by third-party cloud services. Such third-party cloud services may operate on an ad-supported business model, whereby user privacy is de-emphasized in favor of monetizing user data. By making determinations locally so that user data need not be shared with such third-party cloud services, the example architectures may enhance user privacy relative to cloud processing by such third-party services.

In some cases, the POC playback device may adjust the intent determination made by a voice assistant service based on the additional contextual data and/or its more exhaustive state information. In this manner, performing the second command determination may be considered a secondary intent determination, as the POC playback device may adjust the primary intent determination performed by a voice assistant service. For instance, a user may speak a voice input such as "play some Mitski favs," which may be processed by a voice assistant service as an intent to play top tracks by the artist Mitski using a default streaming audio service. In performing a second command determination on intermediates representing this play command, the POC playback device may determine that the user's actual intent was to play their "Mitski favorites" playlist, which the voice assistant service was not aware of. The POC playback device may then implement the intent determined by the voice assistant service with a play command to play back the "Mitski favorites" playlist.

As noted above, example techniques relate to a cloud-based control architecture that utilizes processing of commands at the edge. An example implementation involves a point-of-contact (POC) playback device in a media playback system comprising a plurality of playback devices, where the POC playback device comprises a network interface, at least one processor and at least one non-transitory computer-readable medium including instructions that are executable by the at least one processor such that the POC playback device is configured to: receive, via the network interface from one or more servers of a cloud service, data representing command intermediates comprising (i) an intermediate command and (ii) one or more intermediate parameters, wherein the command intermediates are based on a first command determination performed on a user input, perform a second command determination on the command intermediates to determine (i) one or more media playback system commands and (ii) one or more target playback devices from among the plurality of playback devices in the media playback system; perform a second command determination on the command intermediates to determine (i) one or more media playback system commands and (ii) one or more target playback devices from among the plurality of playback devices in the media playback system; and cause the determined one or more target playback devices to perform the determined one or more media playback system commands.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

II. Example Operation Environment

Figure 1B:
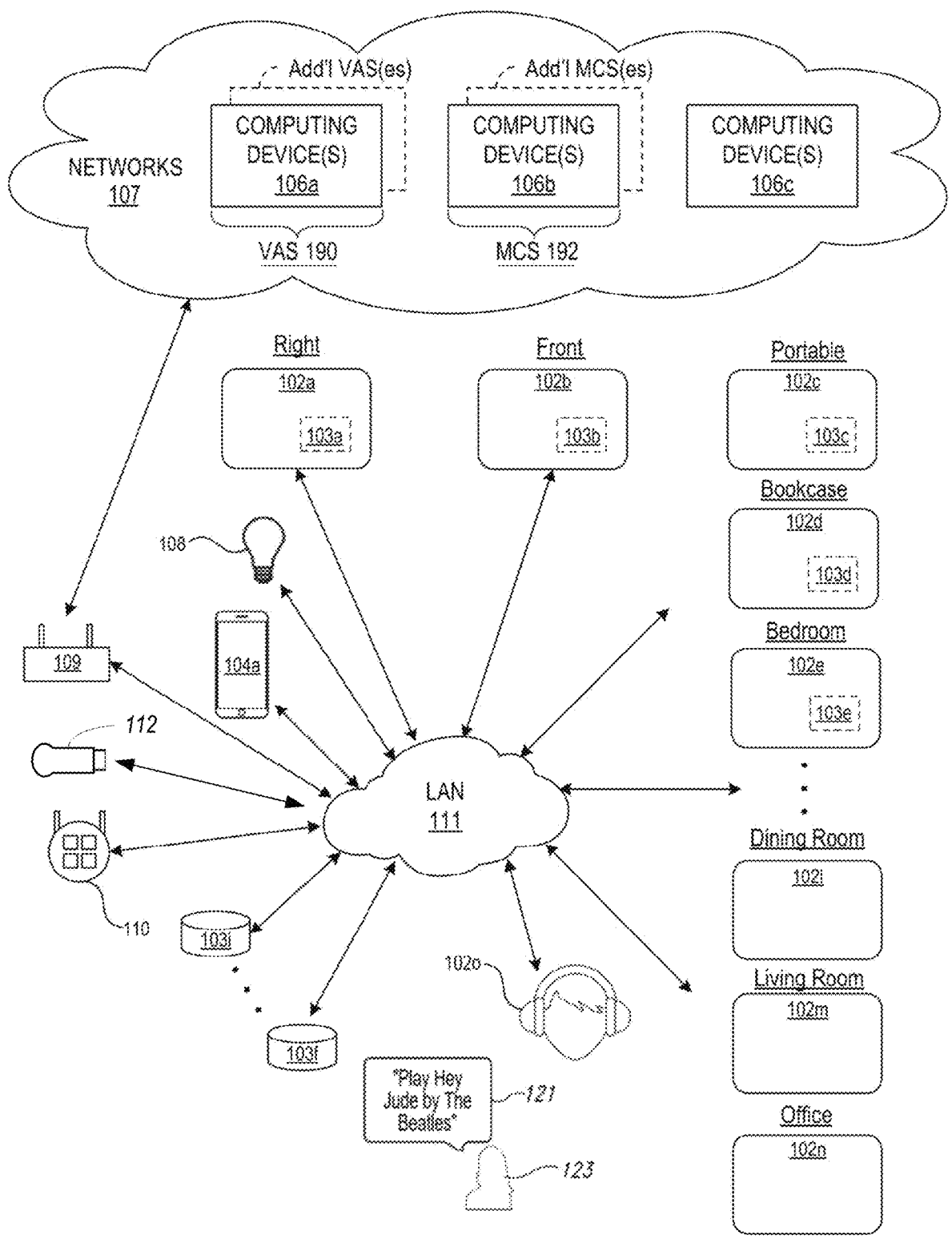
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101a, a master bedroom 101b, (referred to herein as "Nick's Room"), a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102n), network microphone devices 103 (identified individually as "NMDs" 103a-102i), and controller devices 104a and 104b (collectively "controller devices 104"). Referring to FIG. 1B, the home environment may include additional and/or other computing devices, including local network devices, such as one or more smart illumination devices 108 (FIG. 1B), a smart thermostat 110, a streaming video dongle 112, and a local computing device 105 (FIG. 1A).

With reference still to FIG. 1B, the various playback, network microphone, and controller devices 102, 103, and 104 and/or other network devices of the MPS 100 may be coupled to one another via point-to-point connections and/or over other connections, which may be wired and/or wireless, via a network 111, such as a LAN including a network router 109. For example, the playback device 102j in the Den 101d (FIG. 1A), which may be designated as the "Left" device, may have a point-to-point connection with the playback device 102a, which is also in the Den 101d and may be designated as the "Right" device. In a related embodiment, the Left playback device 102j may communicate with other network devices, such as the playback device 102b, which may be designated as the "Front" device, via a point-to-point connection and/or other connections via the NETWORK 111.

As further shown in FIG. 1B, the MPS 100 may be coupled to one or more remote computing devices 106 via a wide area network ("WAN") (i.e., the Internet), labeled here as the networks 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In alternative examples, the various playback, network microphone, and controller devices 102, 103, and 104 and/or other network devices of the MPS 100 may be coupled to one another via the wide area network. For instance, these device may include respective cellular (e.g., 4G/5G) interfaces to form their own internet connections to the networks 107. Using these connections, the devices of the MPS 100 may communicate with one another in a similar manner as via the network 111, albeit over the networks 107.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106 are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 102 may take the form of or include an on-board (e.g., integrated) network microphone device. For example, the playback devices 102a-c include or are otherwise equipped with corresponding NMDs 103a-c, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103f and 103g may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102d because it is physically situated on a bookcase. Similarly, the NMD 103f may be assigned the named "Island" because it is physically situated on an island countertop in the kitchen 101h (FIG. 1A). Some playback devices may be assigned names according to a zone or room, such as the playback devices 102e, 102l, 102m, and 102n, which are named "Bedroom," "Dining Room," "Living Room," and "Office," respectively. Further, certain playback devices may have functionally descriptive names. For example, the playback devices 102a and 102b are assigned the names "Right" and "Front," respectively, because these two devices are configured to provide specific audio channels during media playback in the zone of the Den 101d (FIG. 1A). The playback device 102c in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the network 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102d in the environment 101 (FIG. 1A) is in relatively close proximity to the NMD-equipped Living Room playback device 102m, and both devices 102d and 102m may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103f in the kitchen 101h (FIG. 1A) may be assigned to the dining room playback device 102l, which is in relatively close proximity to the Island NMD 103f. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. patent application Ser. No. 15/438,749.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the NETWORK 111 (FIG. 1B) may be eliminated and the single playback device 102 and/or the single NMD 103 may communicate directly with the remote computing devices 106-d. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
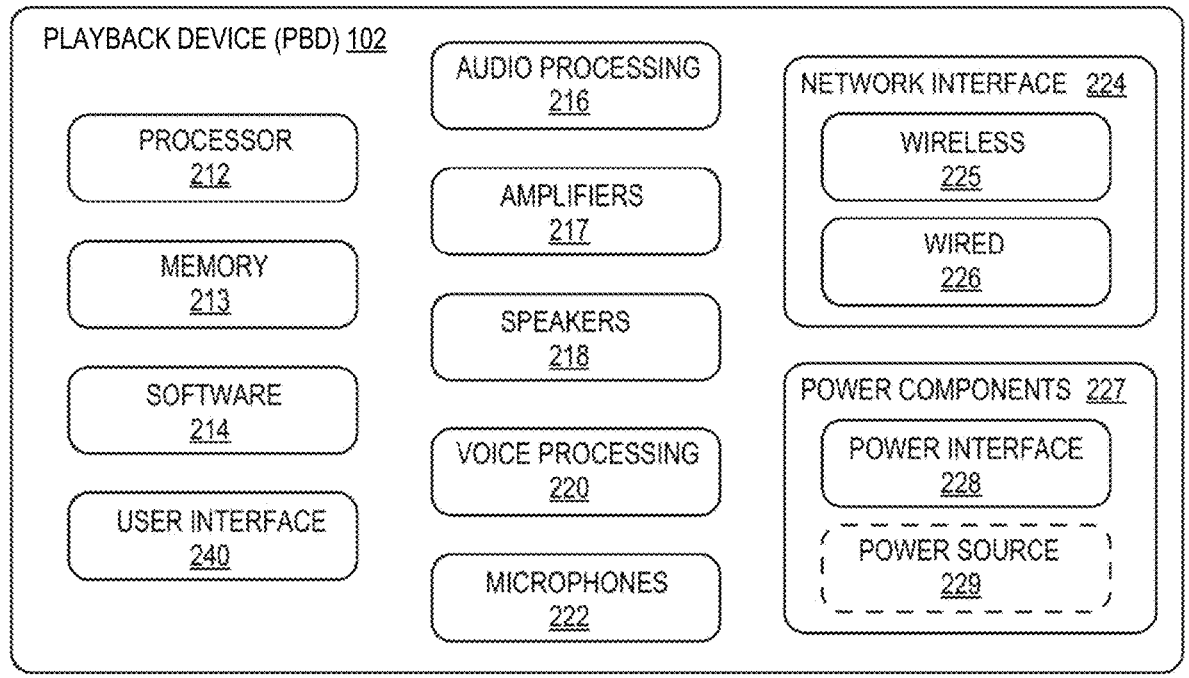
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
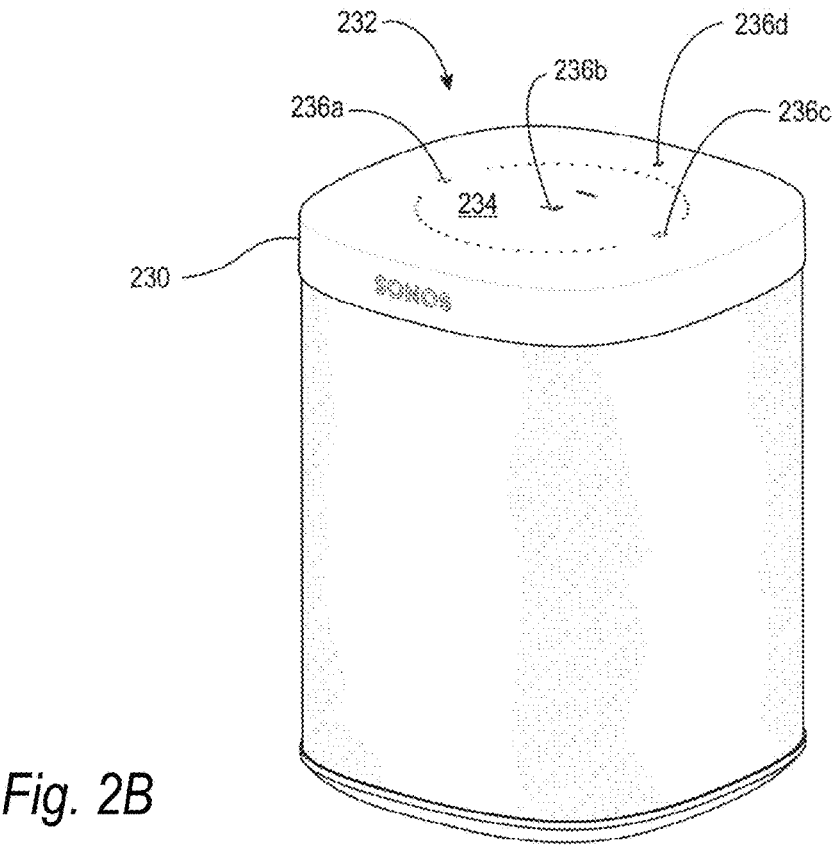
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY: 1," "PLAY: 3," "PLAY: 5," "PLAY-BAR," "CONNECT: AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the MPS 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

Figure 2C:
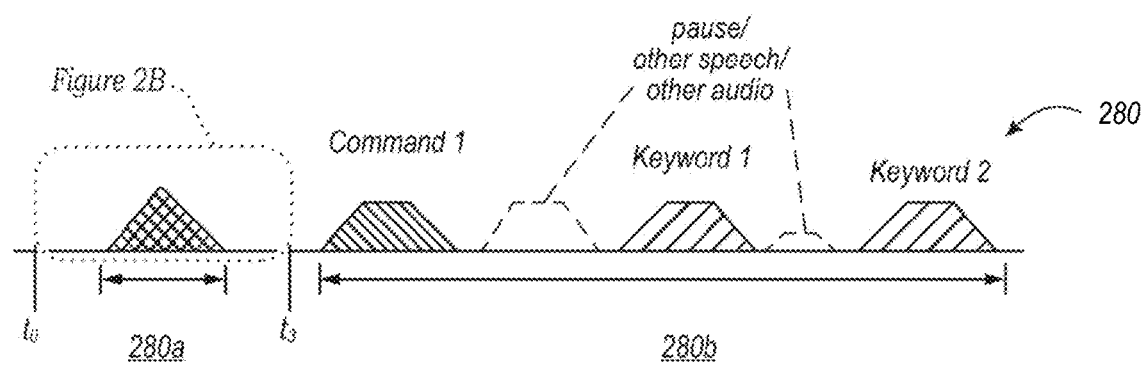
FIG. 2C is a diagram of an example voice input.

FIG. 2C is a diagram of an example voice input 280 that may be processed by an NMD or an NMD-equipped playback device. The voice input 280 may include a keyword portion 280a and an utterance portion 280b. The keyword portion 280a may include a wake word or a command keyword. In the case of a wake word, the keyword portion 280a corresponds to detected sound that caused a wake-word The utterance portion 280b corresponds to detected sound that potentially comprises a user request following the keyword portion 280a. An utterance portion 280b can be processed to identify the presence of any words in detected-sound data by the NMD in response to the event caused by the keyword portion 280a. In various implementations, an underlying intent can be determined based on the words in the utterance portion 280b. In certain implementations, an underlying intent can also be based or at least partially based on certain words in the keyword portion 280a, such as when keyword portion includes a command keyword. In any case, the words may correspond to one or more commands, as well as a certain command and certain keywords. A keyword in the voice utterance portion 280b may be, for example, a word identifying a particular device or group in the MPS 100. For instance, in the illustrated example, the keywords in the voice utterance portion 280b may be one or more words identifying one or more zones in which the music is to be played, such as the Living Room and the Dining Room (FIG. 1A). In some cases, the utterance portion 280b may include additional information, such as detected pauses (e.g., periods of non-speech) between words spoken by a user, as shown in FIG. 2C. The pauses may demarcate the locations of separate commands, keywords, or other information spoke by the user within the utterance portion 280b.

Based on certain command criteria, the NMD and/or a remote VAS may take actions as a result of identifying one or more commands in the voice input. Command criteria may be based on the inclusion of certain keywords within the voice input, among other possibilities. Additionally, or alternatively, command criteria for commands may involve identification of one or more control-state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

In some implementations, the MPS 100 is configured to temporarily reduce the volume of audio content that it is playing upon detecting a certain keyword, such as a wake word, in the keyword portion 280a. The MPS 100 may restore the volume after processing the voice input 280. Such a process can be referred to as ducking, examples of which are disclosed in U.S. patent application Ser. No. 15/438,749, incorporated by reference herein in its entirety.

Figure 2D:
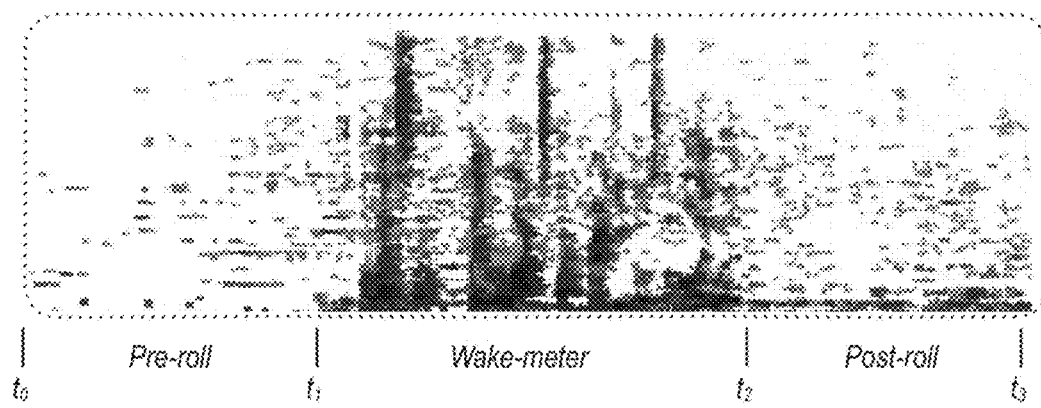
FIG. 2D is a graph depicting an example sound specimen in accordance with aspects of the disclosure.

FIG. 2D shows an example sound specimen. In this example, the sound specimen corresponds to the sound-data stream (e.g., one or more audio frames) associated with a spotted wake word or command keyword in the keyword portion 280a of FIG. 2A. As illustrated, the example sound specimen comprises sound detected in an NMD's environment (i) immediately before a wake or command word was spoken, which may be referred to as a pre-roll portion (between times $t_0$ and $t_1$), (ii) while a wake or command word was spoken, which may be referred to as a wake-meter portion (between times $t_1$ and $t_2$), and/or (iii) after the wake or command word was spoken, which may be referred to as a post-roll portion (between times $t_2$ and $t_3$). Other sound specimens are also possible. In various implementations, aspects of the sound specimen can be evaluated according to an acoustic model which aims to map mels/spectral features to phonemes in a given language model for further processing. For example, automatic speech recognition (ASR) may include such mapping for command-keyword detection.

Wake-word detection engines, by contrast, may be precisely tuned to identify a specific wake-word, and a downstream action of invoking a VAS (e.g., by targeting only nonce words in the voice input processed by the playback device).

ASR for command keyword detection may be tuned to accommodate a wide range of keywords (e.g., 5, 10, 100, 1,000, 10,000 keywords). Command keyword detection, in contrast to wake-word detection, may involve feeding ASR output to an onboard, local NLU which together with the ASR determine when command word events have occurred. In some implementations described below, the local NLU may determine an intent based on one or more other keywords in the ASR output produced by a particular voice input. In these or other implementations, a playback device may act on a detected command keyword event only when the playback devices determines that certain conditions have been met, such as environmental conditions (e.g., low background noise).

b. Example Playback Device Configurations

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102m (as shown). In another example, Zone C may instead take on the name of the Bookcase device 102d. In a further example, Zone C may take on a name that is some combination of the Bookcase device 102d and Living Room device 102m. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102f in the master bedroom 101b (FIG. 1A) and the Bed 2 device may be the playback device 102g also in the master bedroom 101b (FIG. 1A).

As noted above, playback devices that are bonded may have different playback responsibilities, such as playback responsibilities for certain audio channels. For example, as shown in FIG. 3B, the Bed 1 and Bed 2 devices 102f and 102g may be bonded so as to produce or enhance a stereo effect of audio content. In this example, the Bed 1 playback device 102f may be configured to play a left channel audio component, while the Bed 2 playback device 102g may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102b named "Front" may be bonded with the playback device 102k named "SUB." The Front device 102b may render a range of mid to high frequencies, and the SUB device 102k may render low frequencies as, for example, a subwoofer. When unbonded, the Front device 102b may be configured to render a full range of frequencies. As another example, FIG. 3D shows the Front and SUB devices 102b and 102k further bonded with Right and Left playback devices 102a and 102j, respectively. In some implementations, the Right and Left devices 102a and 102j may form surround or "satellite" channels of a home theater system. The bonded playback devices 102a, 102b, 102j, and 102k may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102d and 102m in the Living Room merged, which would result in these devices being represented by the single UI entity of Zone C. In one embodiment, the playback devices 102d and 102m may playback audio in synchrony, during which each outputs the full range of audio content that each respective playback device 102d and 102m is capable of rendering.

In some embodiments, a stand-alone NMD may be in a zone by itself. For example, the NMD 103h from FIG. 1A is named "Closet" and forms Zone 1 in FIG. 3A. An NMD may also be bonded or merged with another device so as to form a zone. For example, the NMD device 103f named "Island" may be bonded with the playback device 102i Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the MPS 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs. During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone.

For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the user may pair or group the moved playback device 102c with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the MPS 100.

c. Example Controller Devices

FIG. 4 is a functional block diagram illustrating certain aspects of a selected one of the controller devices 104 of the MPS 100 of FIG. 1A. Such controller devices may also be referred to herein as a "control device" or "controller." The controller device shown in FIG. 4 may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4, the controller device 104 also includes a user interface 440 that is generally configured to facilitate user access and control of the MPS 100. The user interface 440 may include a touch-screen display or other physical interface configured to provide various graphical controller interfaces, such as the controller interfaces 540a and 540b shown in FIGS. 5A and 5B. Referring to FIGS. 5A and 5B together, the controller interfaces 540a and 540b includes a playback control region 542, a playback zone region 543, a playback status region 544, a playback queue region 546, and a sources region 548. The user interface as shown is just one example of an interface that may be provided on a network device, such as the controller device shown in FIG. 4, and accessed by users to control a media playback system, such as the MPS 100. Other user interfaces of varying formats, styles, and interactive sequences may alternatively be implemented on one or more network devices to provide comparable control access to a media playback system.

The playback control region 542 (FIG. 5A) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 542 may also include selectable icons that, when selected, modify equalization settings and/or playback volume, among other possibilities.

The playback zone region 543 (FIG. 5B) may include representations of playback zones within the MPS 100. The playback zones regions 543 may also include a representation of zone groups, such as the Dining Room+Kitchen zone group, as shown.

In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 543 (FIG. 5B) may be dynamically updated as playback zone or zone group configurations are modified.

The playback status region 544 (FIG. 5A) may include graphical representations of audio content that is presently being played, previously played, or scheduled to play next in the selected playback zone or zone group. The selected playback zone or zone group may be visually distinguished on a controller interface, such as within the playback zone region 543 and/or the playback status region 544. The graphical representations may include track title, artist name, album name, album year, track length, and/or other relevant information that may be useful for the user to know when controlling the MPS 100 via a controller interface.

The playback queue region 546 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 5A and 5B, the graphical representations of audio content in the playback queue region 646 (FIG. 5A) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 548 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102*a* and 102*b* in the Living Room shown in FIG. 1A, and a second VAS to the NMD 103*f* in the Kitchen. Other examples are possible.

d. Example Audio Content Sources

The audio sources in the sources region 548 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

Figure 6:
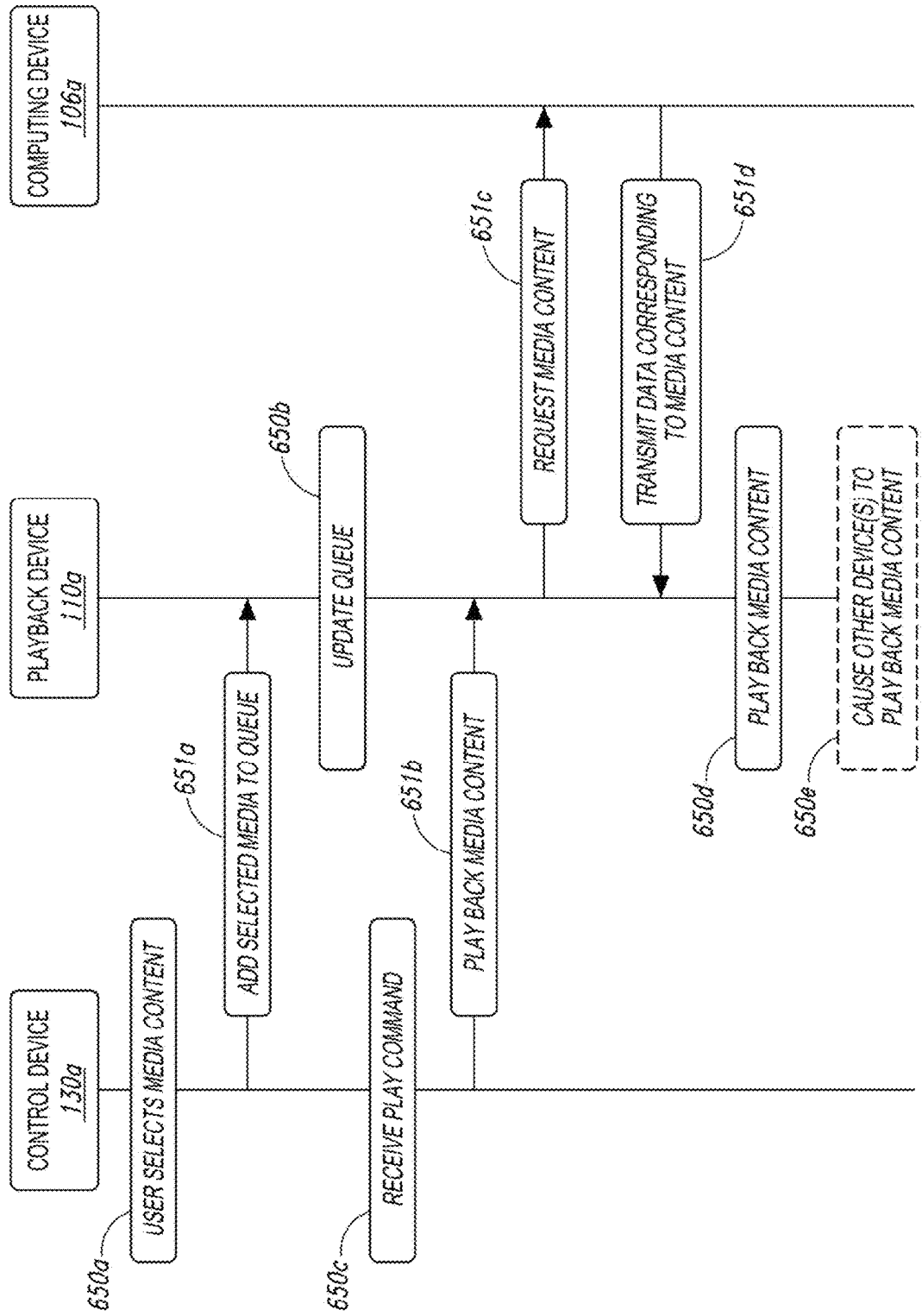
FIG. 6 is a message flow diagram of a media playback system.

FIG. 6 is a message flow diagram illustrating data exchanges between devices of the MPS 100. At step 650*a*, the MPS 100 receives an indication of selected media content (e.g., one or more songs, albums, playlists, podcasts, videos, stations) via the control device 104. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 104 transmits a message 651*a* to the playback device 102 (FIGS. 1A-1C) to add the selected media content to a playback queue on the playback device 102.

At step 650*b*, the playback device 102 receives the message 651*a* and adds the selected media content to the playback queue for play back.

At step 650c, the control device 104 receives input corresponding to a command to play back the selected media content. In response to receiving the input corresponding to the command to play back the selected media content, the control device 104 transmits a message 651b to the playback device 102 causing the playback device 102 to play back the selected media content. In response to receiving the message 651b, the playback device 102 transmits a message 651c to the computing device 106 requesting the selected media content. The computing device 106, in response to receiving the message 651c, transmits a message 651d comprising data (e.g., audio data, video data, a URL, a URI) corresponding to the requested media content.

At step 650d, the playback device 102 receives the message 651d with the data corresponding to the requested media content and plays back the associated media content.

At step 650e, the playback device 102 optionally causes one or more other devices to play back the selected media content. In one example, the playback device 102 is one of a bonded zone of two or more players (FIG. 1M). The playback device 102 can receive the selected media content and transmit all or a portion of the media content to other devices in the bonded zone. In another example, the playback device 102 is a coordinator of a group and is configured to transmit and receive timing information from one or more other devices in the group. The other one or more devices in the group can receive the selected media content from the computing device 106, and begin playback of the selected media content in response to a message from the playback device 102 such that all of the devices in the group play back the selected media content in synchrony.

III. Defining Areas and Creating Groups

As described in the foregoing sections, a user may pre-define saved groups (referred to areas) and then form groups using these areas and then create groups using individual zones and/or areas. Within examples, the control devices 104 (FIG. 4) may facilitate commands to define areas and group the playback devices 102 in the media playback system 100 (FIGS. 1A and 1B). As discussed above in connection with FIG. 4, the controller device 104 includes a user interface 440 that is generally configured to facilitate user access and control of the MPS 100. Further, the user interface 440 may include a touch-screen display or other physical interface configured to provide various graphical controller interfaces, such as the controller interfaces 540a and 540b shown in FIGS. 5A and 5B.

FIGS. 7A and 7B illustrate further example control interfaces to facilitate various grouping controls. FIG. 7A illustrates an example controller interface 740a to facilitate defining pre-saved groups referred to herein as areas. FIG. 7B illustrates an example controller interface 740b to facilitate selecting zones and areas when creating a grouping.

In particular, the controller interface 740a of FIG. 7A includes an area name region 741 to select a name of a new area being defined. In the area name region 741, a user may select one of the pre-defined area names (e.g., using touch input) or enter a string representing a custom area name in a custom area name control 742 (e.g., using an on-screen keyboard). Here, a pre-defined area name ("Downstairs") is selected by way of example.

The controller interface 740a also includes a zone selection region 743 to select the zones (corresponding to individual playback devices 102 or bonded playback devices (FIGS. 3B-3E)) to include in the area. As shown, each zone has a corresponding control to select that zone for inclusion in the area. Here, by way of example, controls corresponding to the living room 101f, the dining room 101g, the office 101e, and the kitchen 101h are selected to include in the "downstairs" area. Once the desired zones are selected, selection of the create area control 744 causes creation of the area.

In some examples, an area may include a zone group. As shown in FIG. 7A, the zone selection region 743 lists a zone group "Patio+Kitchen" and a corresponding control to select that zone group for inclusion in the area. In this example, the zone selection region 743 also lists the constituent zones individually, so that the area can be created with one or more constituent zones of the zone group without necessarily including each zone in the zone group. Alternatively, the zone selection region 743 might not show the individual group members until a zone is removed from the zone group.

While the controller interface 740a is shown as an illustrative interface for defining areas, other types of interfaces may be utilized as well. For instance, using a voice user interface, a user may speak a voice input such as "<wake word>, please set Nick's Room and master bathroom as the master area." From this input, the VAS 190 may determine that the intent is to createArea( ) with parameters <areaName>="master" and <zones>=["Nick's Room", "Master Bedroom"]. Ultimately, this intent may be translated into one or more commands to define an area in the media playback system 100.

FIG. 7B illustrates another example controller interface 740b to facilitate selecting zones and areas when creating a grouping. The controller interface 740b includes a selection region 745 to select the zones and areas to include in a zone group. As shown, each zone and area has a corresponding control to select that zone for inclusion in the area. In this manner, zones and areas for a group can be selected using the same user interface. Here, by way of example, controls corresponding to the "downstairs" area and the patio 101i are selected in the selection region 745. Once the desired zones are selected, selection of the create group control 747 causes creation of the synchrony group. Alternatively, toggling the everywhere control 746 creates a zone group that includes every zone in the media playback system 100.

As discussed above, in connection with FIG. 2A, the playback devices 102 may maintain or have access to state variables that describe the state of the media playback system. This state information, as a whole may be represented in a state table or other data structure. The state variables maintained by each playback device 102 may describe not only the state of the respective playback device 102, but the states of the other playback devices 102 in the media playback system 100. This state information may include identifiers to indicate that a zone is a member of an area.

In particular, when an areas are defined (e.g., using the controller interface 740a), the media playback system 100 may create or assign that area an area identifier ("areaID"). In an example, the areaID may include an array (or other data structure) of the playback device identifiers ("playerIDs"), which identify respective zones. Recall that a zone may include an individual playback device 102 or a bonded zone of playback devices 102, which function as a single logical playback device 102. The playerIDs themselves may be any suitable data type, such as a string. In this manner, the areaID indicates the constituent zones of the area. Further, the areaID can be updated with additional or fewer playerIDs when changes to the area are made.

FIG. 8A illustrates an example area creation function 860a ("createArea( )"). As shown, createArea takes in playerIDs as arguments (corresponding to the selected zones in the zone selection region 743) (FIG. 7A). The area creation function 860a returns an areaID 862a corresponding to the downstairs area created in the example controller interface 740a (FIG. 7A). The areaID 862a includes an array of playerIDs 861 indicating the zones in the area. In particular, the areaID 862a includes playerIDs 861f, 861g, 861e, and 861h corresponding to the living room 101f, the dining room 101g, the office 101e, and the kitchen 101h, respectively. Similar playerIDs 861 are associated with the other zones 101 in the media playback system 100 (e.g., the master bathroom 101a has an associated playerID 861a). PlayerIDs 861 may be added or removed from the array when the area is modified.

When the create area control 744 is selected, the controller device 104 calls the area creation function 860a. A playback device 102 in the media playback system 100 may carry out the function. Carrying out the function may involve modifying the state information maintained by the playback device 102 with the areaID 862a. This change to the state information is then propagated to other playback devices 102 in the media playback system 100.

Alternatively, the playback device 102 may instruct another device in the media playback system 100 to update the state information. For instance, the playback device 102 may instruct a playback device 102 in the saved area to update the state information. This change may then be propagated to other playback devices 102 in the media playback system 100, as well as the cloud. As another example, the playback device 102 may instruct one or more platform servers to update the state information, which may then propagate changes back down through the media playback system 100.

When a group is created (FIG. 7B), the media playback system 100 may perform a group creation function 860b (e.g., "createGroup( )"), as illustrated in FIG. 8B. The controller 104 processes the input (e.g., the zone and area selections in the selection region 745) and builds the appropriate set of playback devices 102 in the group. This set of players is the union of the set of individual playerIDs and playerIDs represented in areaIDs.

The group creation function 860b may take as arguments playerIDs and areaIDs, among other possible arguments. The playerIDs 861 may be represented as a data structure indicating each zone 101 to include in the zone group. The areaID is included as an argument so that knowledge of the area used to form the group can be maintained, as explained in further detail below. In FIG. 8B, the group creation function 860b takes an array of playerIDs 861 as a arguments and also the areaID 862a, which correspond to the selections made in the selection region 745 (FIG. 7B).

A playback device 102 in the media playback system 100 may carry out the group creation function 860b. Like the area creation function 860a, this function may be carried out by any playback device 102 in the media playback system 100. This is possible since all playback devices 102 maintain state information representing the state of the media playback system 100. By modifying this state information, a playback device 102 may effect state changes to itself or to other playback devices 102, as changes are propagated throughout the playback devices 102 of the media playback system 100. One result of this architecture is that a playback device 102 carrying out a grouping function is not necessarily part of the group. The playback device 102 carrying out a function is referred to herein as a point-of-contact (POC) playback device.

While the POC playback device 102 is described herein by way of example as carrying out the group creation function 860b, as well as other example functions, in an alternative implementation, these functions may be carried out in the cloud. For instance, one or more platform servers may carry out the group creation function 860b. Alternatively, the platform servers and the POC playback device may coordinate in carrying out certain functions.

The group creation function 860b returns a group object 863a-1 that represents the created group at a first instance. The group object 863a-1 includes playerIDs 864, which is a data structure indicating the zones 101 in the group. The group object 863a-1 also includes a groupID 865 identifying the created group, which is used to refer to the group and distinguish the group from other groups. Additionally, the group object 863a-1 includes a groupName 866 (here, "Downstairs+Patio"), which is a human-readable name that can be displayed in controller interfaces by the controller device 104 and which the user can use to refer to the group in voice inputs.

As noted above, changes to state information, such as the creation of a group, are propagated through the media playback system 100. The media playback system may implement one or more mechanisms to propagate state information. One mechanism may involve propagating state information changes using event-based messaging. In particular, playback devices 102 may generate events when changes to state information are made. Subscribers to these events (e.g., other playback devices 102 and controller devices 104) are notified of these events and receive information representing these state changes via the event over the LAN 111. For example, subscribers to a groups namespace may receive events when group information is updated in the media playback system 100. Alternatively, one or more platform servers may first update state information maintained by the platform servers, and then these changes are propagated through devices of the media playback system 100.

When a group is created, the media playback system 100 may select a group coordinator for the group. The group coordinator is a particular playback device 102 within the group responsible for distributing playback and timing information for synchronous playback over the LAN 111 to the other playback devices 102 within the group. The POC playback device 102 carrying out the grouping command may select the group coordinator on behalf of the media playback system 100.

Selecting the group coordinator may involve determining whether there are any existing groups within the playback devices to be grouped. If so, the POC playback device 102 identifies the existing group in the household which is the largest subset of the desired group to be formed. This existing group is modified to add or remove playback devices 102 until the desired group is formed. This process maintains the group coordinator. Alternatively, if a subset is not found, the POC playback device 102 may select the first playback device 102 selected for inclusion in the group as the group coordinator.

Alternatively, the group coordinator may be selected based on one or more parameters. Example parameters include device capabilities such as processor speed, memory, network interface transmission speed. Generally, newer generation playback devices 102 may have increased device capabilities relative to older generation devices. Other example parameters include power type (e.g., wall power preferred over battery) or network connection type (e.g., wired preferred over wireless). Example techniques for selecting a group coordinator based on parameters are disclosed in U.S. patent application Ser. No. 14/041,989, filed on Sep. 30, 2013, titled "Group Coordinator Device Selection", and issued as U.S. Pat. No. 9,654,545, and U.S. patent application Ser. No. 14/042,001, filed on Sep. 30, 2013, titled "Coordinator Device for Paired or Consolidated Players," and issued as U.S. Pat. No. 9,288,596, which are each incorporated by reference herein in their entirety.

Within examples, the POC playback device 102 may be selected in a similar manner. For instance, the POC playback device 102 may be selected based on one or more parameters. Alternatively, in some examples, each controller device 104 in the media playback system 100 forms a one-to-one relationship with a playback device 102 for sending commands and receiving status updates. For instance, the controller device 104a may form a relationship with the playback device 102a. Then, for commands originating from the controller device 104a, the playback device 102a operates as the POC playback device 102.

As noted above, the controller 104 disambiguates the areaID 862 into constituent playerIDs 861 before calling the group creation function 860b. To avoid losing information on which constituent areas in the group, the group coordinator maintains an area source variable indicating the areas in the group. Area source variables within the media playback system may be referred to collectively as sourceAreaIDs 867. A set function may be called to set this area source variable in connection with group formation or modification.

Figure 8C:
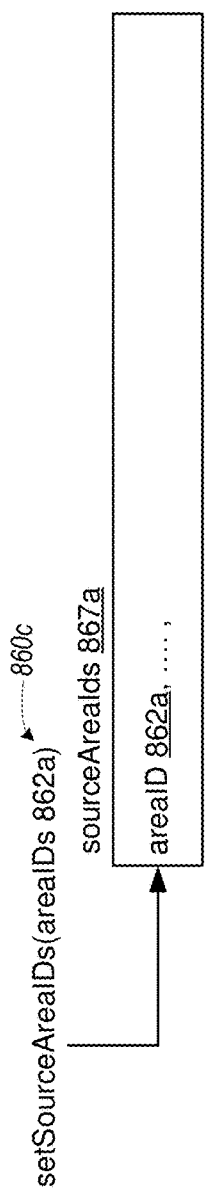

To illustrate, FIG. 8C illustrates an example set area source function 860c ("setSourceAreaIDs( )"). This function, by way of example, takes a list of areaIDs as an argument and uses this list to set sourceAreaIDs 867a, which representing the areaIDs associated with the new group created by the group creation function 860b. Within examples, sourceAreaIds 867 may be implemented as a comma-separated string of areaIDs within a group. In this example, areaID 862a is represented in the sourceAreaIds 867. When a group is modified (e.g., by adding or removing group members, or changing the group coordinator), the group coordinator clears its source AreaIds 867 by calling the set area source function 860c (e.g., with no areaIDs 862).

Executing the set area source function 860c sets the source AreaIds 867a for the new group on the group coordinator of the group, which acts as a "source-of-truth" on behalf of the group. The POC playback device 102 may call this function in connection with carrying out the group creation function 860b (or a group modification function to add or remove zones 101 from the group), as the POC playback device 102 knows the group coordinator of the new group. To avoid inconsistencies, executing the set area source function 860c on group members is prohibited and returns an error code if attempted.

When the group coordinator updates the source AreaIds 867a to indicate the areaID 862a, the group coordinator sends out a group management event indicating the latest value of the source AreaIds 867a. Other playback devices 102 in the media playback system 100 receive this group management event and store the source AreaIds 867a in the state information corresponding to the group coordinator. Then, all playback devices 102 are aware of the sourceAreaIds 867a of the group coordinator for the new group.

At various times, such as when group information is updated or queried, the group coordinator generates a group event indicating the group status using a groupObject 863. The group event propagates the current group status to subscribers of the group event in the media playback system, which may include other playback devices 102 in the media playback system 100 and controller devices 104, among other possible devices (e.g., the NMDs 103).

Figure 8D:
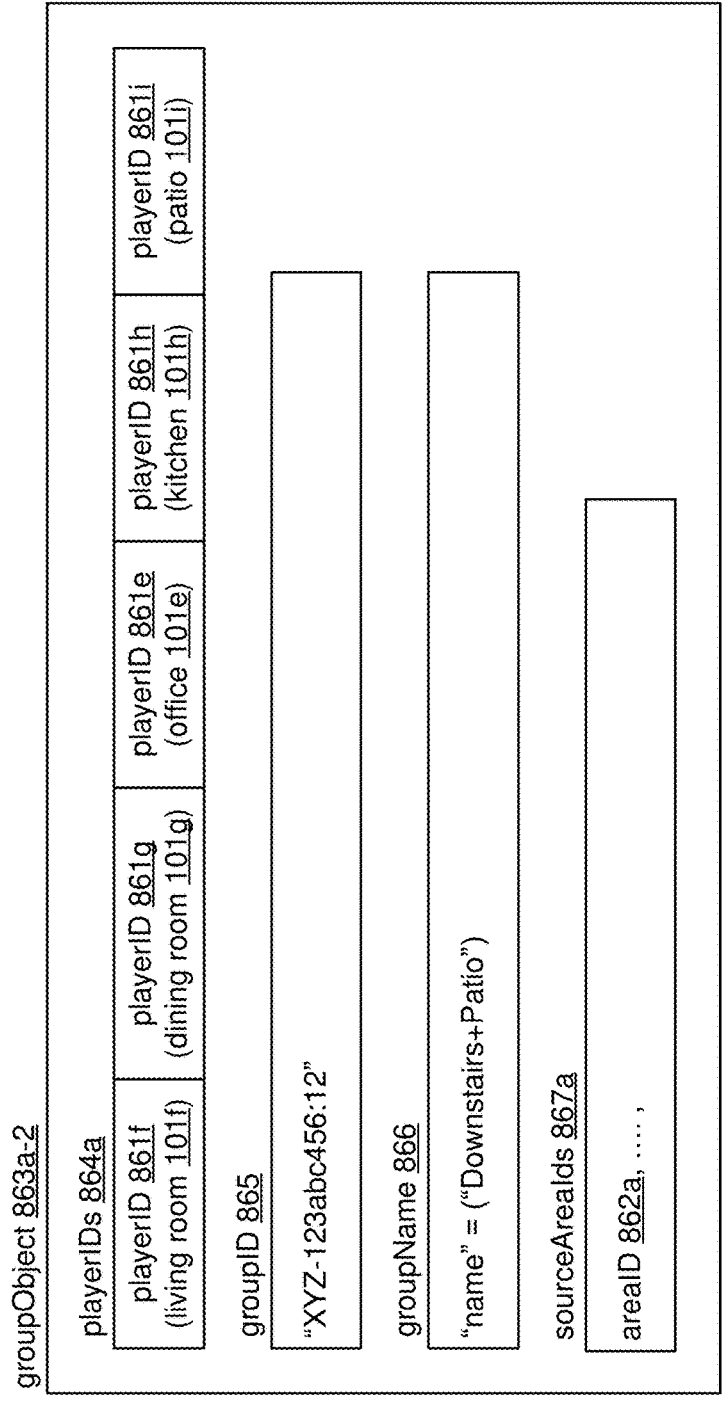

This groupObject 863 includes the source AreaIds 867 for the group. To populate the source AreaIds 867 for the groupObject 863, the group coordinator may determine a current source AreaIds 867 for the group. For instance, to determine a current source AreaIds 867a for the group, the group coordinator may parse the saved sourceAreaIds 867a into constituent areaIDs 862, remove any invalid areaIDs 862 (e.g., areaIDs corresponding to areas that have been deleted as saved groups), and then generate a current sourceAreaIds 867a for a new groupObject 863a. FIG. 8D illustrates a groupObject 863a-2, which includes current sourceAreaIds 867a, representing the status of the group at a second instance.

After receiving a groupObject 863 in a group event, each playback device 102 may store the information in groupObject 863. In this way, each playback device 102 in the media playback system 100 has knowledge of the sourceAreaIds 867 of the other playback devices 102. When a group coordinator updates its sourceAreaIds, the group coordinator sends out a group event including the current sourceAreaIds, which causes the other playback devices 102 in the media playback system to update their saved state information for that playback device 102.

To avoid inconsistencies, certain variables in the state information may be associated with version counters. For example, each sourceAreaIds may be associated with a respective version counter. When, for instance, the sourceAreaIds 867a is updated, the version counter is incremented. When the updated sourceAreaIds 867a is evented, the version is sent with the updated state information. If a playback device 102 receives an unexpected version number, it may generate an error.

After a group is created, the controller devices 104 can obtain group information including the sourceAreaIds 867 by subscribing to group events or by calling a function to query the group information (e.g., "getGroups( )"), among other examples. In either case, the controller devices 104 may receive group information indicating the current state of the groups in the media playback system (e.g., one or more groupObjects 863, including the groupObject 863a), which may include the sourceAreaIds for each group. For instance, the groupObject 863a includes the sourceAreaIds 867a for the "Downstairs+Patio" zone group).

Since all playback devices 102 maintain state information, including group state information, any playback device 102 may generate a groupObject 863 representing a group. For instance, when a controller device 104 calls getGroups( ) any playback device 102 can generate one or more groupObjects 863 representing the groups presently configured in the media playback system 100 and transmit data representing this object to the controller device 104. As noted above, controller devices 104 may form a one-to-one relationship with a controller device for sending commands and receiving status information. In such examples, when a controller device 104a calls getGroups( ) the paired playback device 102a may generate one or more groupObjects 863 representing the groups presently configured in the media playback system 100 and transmit data representing this object to the controller device 104a.

The controller devices 104 may use the group information to display information related to each group. For instance, FIG. 9A illustrates an example controller interface 940a, which is similar to the controller interface 540b (FIG. 5B).

The controller interface 940a includes a playback zone region 943, which include representations of playback zones within the MPS 100.

The controller interface 940a includes a particular representation 949 of the new group ("Downstairs+Patio"). The representation 949 includes a group control 969. Selection of this control causes the controller device 104 to display an interface to modify the grouping.

Figures 9A, 9B:
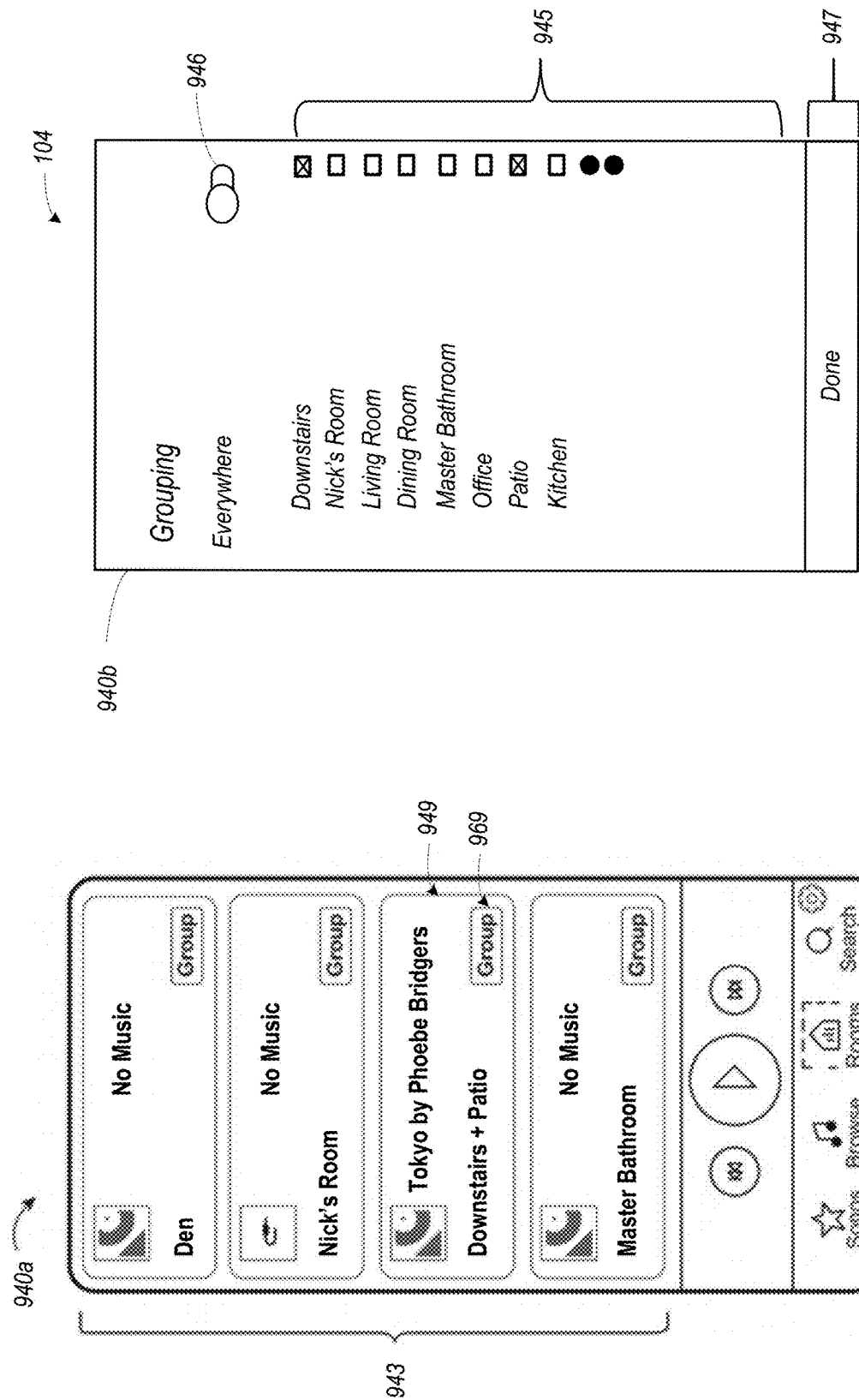
FIGS. 9A and 9B are example controller interfaces in accordance with aspects of the disclosure.

To illustrate, FIG. 9B illustrates an example controller interface 940b, which may be the same or similar to the controller interface 740b (FIG. 7B). When the controller interface 940b is opened, the controls corresponding to the zones 101 and area(s) in the selection region 945 are populated based on the information in the groupObjects 863a). By selecting or deselecting the controls corresponding to the zones 101 and area(s) in the selection region 945, these zones 101 or areas may be added or removed from the group.

In particular, since the sourceAreaID 867a indicates that the "Downstairs+Patio" zone group was formed from downstairs area (areaID 862a), the control corresponding to the downstairs area in the selection region 945 is shown as checked. Note that the controller interface 940b could be displayed by any controller device 104 in the media playback system 100, not just the controller device 104 that was used to create the "Downstairs+Patio" zone group. By maintaining the sourceAreaID 867a in the state information on the playback devices 102 (and not on the controller device 104 used to create the group), the areas that were used to create the group can be displayed later by any controller device 104 in the media playback system 100.

IV. Example Cloud-Based Architecture

Example techniques described herein relate to a cloud-based architecture to facilitate control of a media playback system including playback devices and other smart devices. The architecture involves platform servers in the cloud and a point-of-contact (POC) playback device at the edge. The platform servers are configured to receive commands from various sources, such as third-party cloud services. The POC playback device is configured to determine how to implement the commands in the media playback system.

a. Introduction to the Cloud-Based Architecture

Figure 10A:
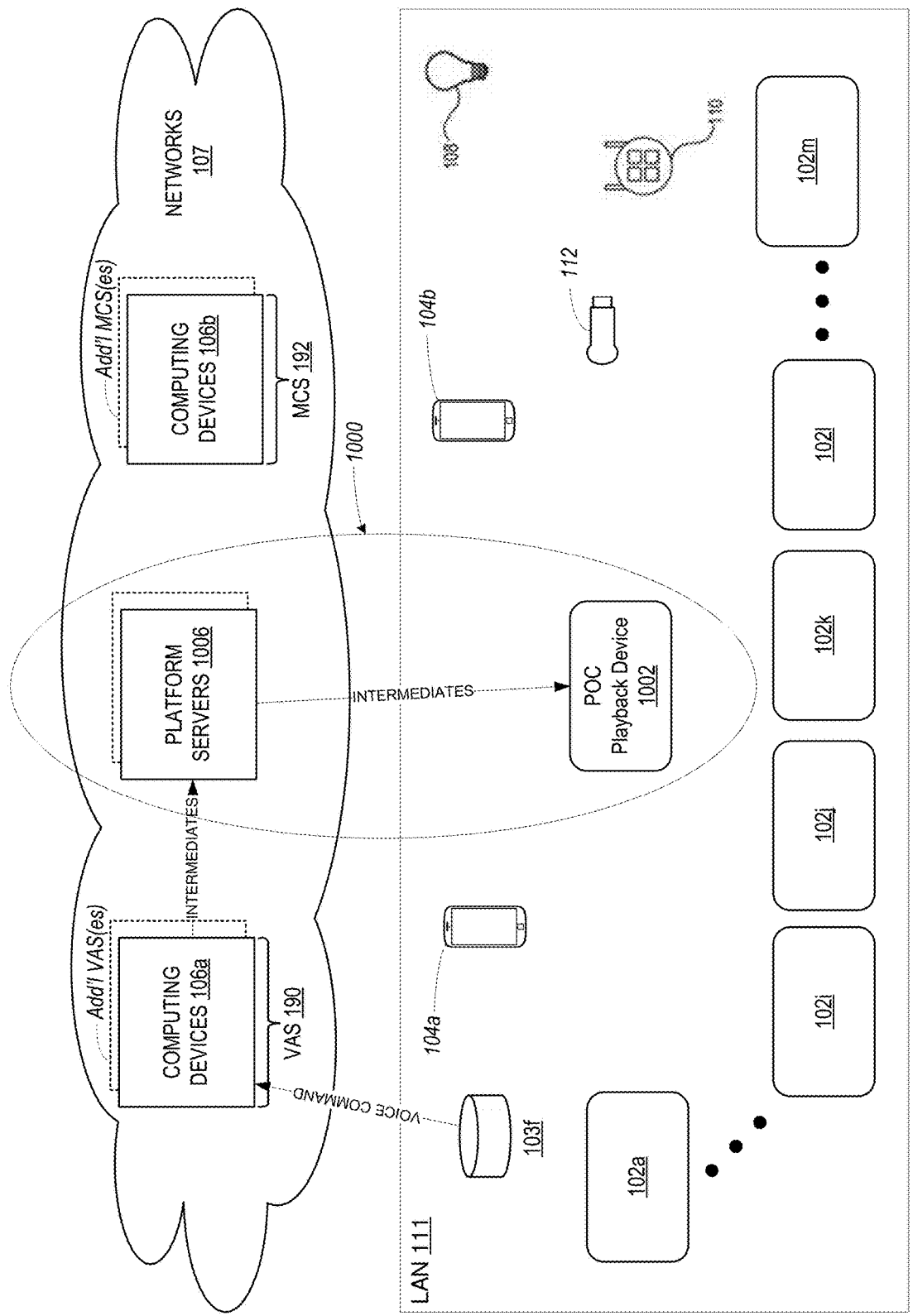
FIG. 10A is a functional block diagram illustrating an example cloud-based architecture to facilitate control of the media playback system in accordance with aspects of the disclosed technology.

FIG. 10A is a functional block diagram illustrating a cloud-based control architecture 1000 ("cloud 1000") to facilitate control functions of a media playback system, such as the media playback system 100 (FIGS. 1A and 1B). The cloud 1000 includes a POC playback device 1002 and one or more platform servers 1006. As shown in FIG. 10A, the platform servers are in the cloud (i.e., connected to the networks 107) while the POC playback device is at the edge (i.e., connected to the LAN 111).

In addition, a subset of playback devices 102 in the media playback system 100 (FIGS. 1A and 1B) are shown by way of example. Other media playback systems may include additional or fewer playback devices 102. At minimum, the media playback system 100 includes one playback device 102, but the architecture is scalable from one to many playback devices 102. Further, although the cloud 1000 and associated examples are described by showing the media playback system 100 in a single family home, the media playback system 100 may be implemented in various residential environments, such as condos, apartments, dormitories, and mobile/modular homes, among other examples. Further, the media playback system 100 may also be implemented in commercial environments, such as retail stores, restaurants, hotels, salons, professional offices, and the like.

Similarly, the NMD 103i and the control devices 104a and 104b are shown to provide illustrative examples of these types of devices interacting in and with respect to the cloud 1000. The one or more platforms servers 1006 are connected to the network 107 along with the computing devices 106a and computing devices 106b (FIG. 1B). The one or more platforms servers 1006 may be the same or similar to the computing devices 106c (e.g., a subset of).

Further, the cloud-based control architecture 1000 may integrate with various smart devices for the purpose of control. The smart illumination devices 108 and smart thermostat(s) 110 (FIG. 1B) are representative, but not limiting as to the types of smart devices that could be integrated with the cloud-based control architecture 1000. Example smart devices include home security devices (e.g., cameras, door/window sensors, glass break sensors), doorbells, thermostats, smart plugs and switches, "smart" appliances (e.g., refrigerators, microwaves, ovens, dishwashers, washing machines, hot water heaters), sensors, and the like. These smart devices may integrate with the cloud-based control architecture 1000 using one or more APIs, such as an API of a cloud service provided by the manufacturer or support provided via a voice assistant service (e.g., via a "skill" corresponding to the smart device).

Yet further, the cloud-based control architecture 1000 may integrate with video playback devices. As a streaming video player, the dongle 112 is intended to be representative of video playback devices, but not limiting as to the types of video playback devices that could be integrated with the cloud-based control architecture 1000. Example video playback devices include smart televisions, playbars (e.g., with integrated video streaming functionality), video game consoles, disc players, and the like. Like the smart devices, these video playback devices may integrate with the cloud-based control architecture 1000 using one or more APIs, such as an API of a cloud service provided by the manufacturer or support provided via a voice assistant service (e.g., via a "skill" corresponding to the video playback device).

Under this cloud-based architecture, the one or more platform servers 1006 operate as a cloud-based hub to receive commands natively (e.g., via a controller device 104) and/or from third-party services (e.g., the VAS 190 or the MCS 192). In this manner, the one or more platform servers 1006 can be considered to provide a platform service for the media playback system 100. Like the playback devices 102, the one or more platform servers 1006 may maintain state information indicating the current state of each playback device 102 in the media playback system 100. In providing a cloud-based platform service, the one or more platform servers 1006 may operate as a cloud-based hub for a plurality of media playback systems 100 (e.g., with unique household identifiers, which may be registered to different users and/or located in different households), as well as other types of "smart home" systems and platforms.

The one or more platform servers 1006 may support an externally-facing platform API, by which the media playback system 100 and/or third-party services may send commands and receive status updates. Further, the one or more platform servers 1006 may be configured to support one or more third-party APIs, such as an intent-based API of the VAS 190 or a streaming protocol API of the MCS 192. Additionally or alternatively, the POC playback device 1002 may support an externally-facing platform API and/or one or more third-party APIDs, so as to facilitate direct interfacing with third-party services. To enable interaction over the networks 107, such APIs may be based on the hypertext transfer protocol (http).

The POC playback device 1002 is a particular one of the playback devices 102 in the media playback system 100, which is configured to determine how to implement commands received from the cloud 1000 in the media playback system 100. That is, in operation, the POC playback device 1002 receives data representing one or more commands and one or more parameters according to the platform API and/or the one or more third-party APIs. This data may be referred to as command intermediates as it represents commands and parameters, but not necessarily in the form that the commands will be carried out in the media playback system 100.

Based on these command intermediates, the POC playback device 1002 may determine one or more media playback system commands to implement the command intermediates in the media playback system. For instance, if the POC playback device 1002 receives an intermediate play command originating from the NMD 103 and the VAS 190, determining how to implement this play command received in the media playback system 100 may involve various determinations as to where, what, and how to play media. For instance, the POC playback device 1002 may determine where to play this command (i.e., the target playback devices). As further examples, the POC playback device 1002 may determine what to play (e.g., the content and/or the source of the content) and/or how to play it (e.g., at what volume or with what timing).

Notably, in the described examples, any functions described as being performed by the cloud 1000 or its constituent devices (e.g., the platform servers 1006 and the POC playback device 1002) may be performed by any device in the cloud 1000 or divided among the devices in the cloud 1000. Further, while many examples are described for the purpose of illustration as relating to media playback, the cloud-based architecture 1000 is intended to be an example of an architecture that could be implemented using a wide variety of smart devices and associated cloud servers.

Further, in other examples, a different smart device in the media playback system 100 (such as a smart hub) may perform the features of the POC playback device 1002. That is, instead of a playback device 102 operating with the additional functions of the POC playback device 1002, these functions are implemented by a smart hub device that is not necessary a playback device 102. In some examples, such a smart hub device may include increased computing resources (e.g., additional and/or faster processors, more memory) relative to some playback devices 102 (e.g., all playback devices 102, or a subset, such as less expensive or older generation playback devices 102) to facilitate the functions of the POC playback device 1002. Being not necessarily configured for audio playback, a smart hub device may exclude speakers, amplifiers, and associated playback components or may include less powerful playback components (e.g., similar to those on a standalone network microphone device 103). Such a smart hub may be an optional component of the media playback system 100.

In one example, such a smart hub may perform the features of the POC playback device 1002 and interface with the platform servers 1006 operating as a "hub" themselves to receive commands themselves from third-party services, as noted above. In other examples, the smart hub may perform features of both the POC playback device 1002 and the platform servers 1006. That is, the smart hub may perform local command determination as well as integrate directly with third-party services. Other arrangements are contemplated as well.

b. Platform API

As noted above, the platform servers 1006 may support an externally-facing platform API, by which the media playback system 100 and/or third-party services, such as the VAS 190 and the MCS 192, may send commands and receive status updates. Generally, to effectively control of a media playback system, a third-party service must know the state of the system. The media playback system 100 may update third parties using an event/subscriber model, whereby each subscriber maintains state information and subscribers receive events representing current status when status changes occur. However, as the number of smart devices and their complexity grows, the amount of state information that must be transferred can become unwieldy and expensive in terms of network resources, as millions of users may each have their own system(s) which can each include dozens of devices having dozens or hundreds of respective parameters each with a corresponding status.

Instead of providing an interface to control every aspect of the media playback system and its constituent devices, the platform API provides an interface for the external entity to tell the cloud 1000 what the user wants to do with the burden shifted to the cloud 1000 to determine how to actually implement. Since the cloud 1000 is managing the details of implementation, the external entity does not need to manage every detail of the media playback system 100 (or even know the details exist). Instead, the external entity can tell the cloud 1000 what the user wants to do and trust the cloud 1000 to carry it out.

For instance, as described above, the playback devices 102 in the media playback system 100 may be capable of forming synchrony groups with a group coordinator managing aspects of the synchrony group. Instead of the external entity assigning and managing the group coordinator, the cloud 1000 may determine the group coordinator and manage its status. The external entity does not need to know that the group coordinator even exists. Instead, the platform API can update the external entity with a more simplified status indicating merely that the group exists.

As indicated above, the POC playback device 1002 may receive command intermediates including one or more intermediate commands and one or more intermediate parameters. In some examples, these command intermediates are in the form of one or more function calls to the command API. The functions exposed by the platform API are not in the form that will eventually be performed by the media playback system 100. Instead, they are designed to convey what the third party knows about what the user wants to do.

Figure 10B:
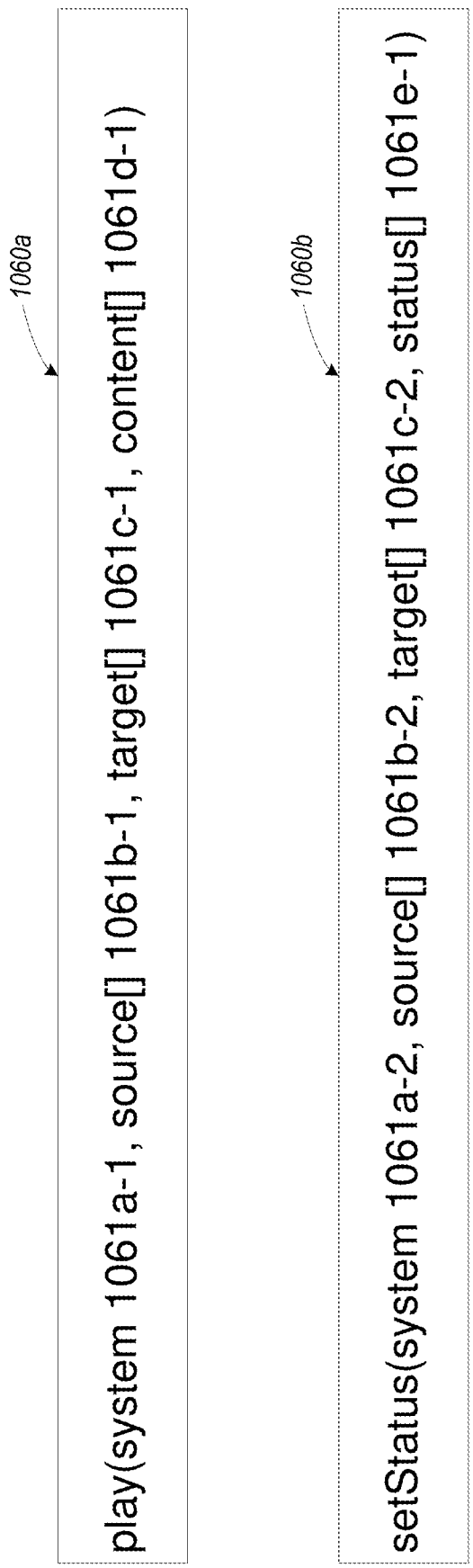
FIG. 10B is a diagram illustrating example functions of an example platform application programming interface in accordance with aspects of the disclosed technology.

To illustrate, FIG. 10B shows an example play( ) function 1060*a* according to the platform API. The play function 1060*a* includes one or more parameters 1061 including a first parameter 1061*a*-1 ("system 1061*a*-1") representing the media playback system 100. Notably, under the example cloud-based control architecture, the external entity does not need to communicate directly with the playback devices 102 being controlled. Instead, they can merely indicate the media playback system 100, perhaps by way of a URI. The play function 1060*a* also includes a second parameter 1061*b*-1 ("source[ ] 1061*b*-1") representing the sources of the user input. For instance, for a voice input, the source[ ] 1061*b*-1 may indicate the NMD(s) 103 that detected the voice input.

The play function 1060*a* also includes a third parameter 1061*c*-1 indicating explicit targets ("target[ ] 1061*c*-1") and a fourth parameter 861*d*-1 indicating content ("content[ ]

1061*d*-1"). Note that since the cloud 1000 is determining how to carry out this command, the parameters need not specifically identify a device or content (e.g., by IP address or MAC address) or by URI (indicating particular content at a particular source). Instead, the parameters can indicate the targets and content more generically, such as by reference to a target name (e.g., "dining room," or "upstairs") or metadata (e.g., artist, album, or song title, among other examples). The cloud 1000 may then determine which specific target(s) correspond to the name and which specific content and source to use to carry out the play function. Further, either of these parameters might not have any data or might have generic data not indicating any particular target or content (e.g. as may result from a voice input such as "Play some music").

FIG. 10B also shows an example setStatus( ) function 1060*b* according to the platform API. The setStatus( ) function 1060*b* may be used to convey a user's intent to change the status of a smart device, such as to toggle the smart illumination device 108 on or to set the temperature of the smart thermostat(s) 110. Like the play( ) function 1060*a*, the setStatus( ) function 1060*b* includes a first parameter 1061*a*-2 ("system 1061*a*-2") representing the media playback system 100 and a second parameter 1061*b*-2 ("source[ ] 1061*b*-2") representing the sources of the user input. The setStatus( ) function 1060*b* also includes third parameter 1061*c*-2 indicating explicit targets ("target[ ] 1061*b*-2") and a fourth parameter 861*e*-1 indicating status(es) ("status[ ] 1061*c*-1") to set.

The functions 1060*a* and 1060*b* are merely representative of functions and parameters that an example platform API could expose facilitate exchange of information on what a user would like to do between a third-party service and the cloud 1000.

c. Selecting the POC Playback Device

In some examples, the POC playback device 1002 is selected from among the playback devices 102 in the media playback system 100 arbitrarily. This is possible since the playback devices 102 may in some respects be more or less equally situated, as they may have similar hardware (FIG. 2A) and software. For instance, the media playback system 100 may select a particular playback device 102 to operate as the POC playback device 1002 based on the particular playback device 102 being first in a list or other data structure indicating the playback devices 102 in the media playback system 100.

Alternatively, in other examples, the POC playback device 1002 may be selected on the basis of one or more parameters indicating that it may be preferable as a POC playback device, including parameters involving stability and/or capability. Operating as the POC playback device 1002 is an additional task on top of the typical playback operation for a playback device 102, so playback devices 102 with additional processing capabilities (processor speed and memory) may be preferred. Further, stable playback devices (e.g., those with a long uptime, and consistent network connections) are preferred, as selecting such devices may promote stability in the connection with the platform servers 1006.

While the playback devices 102 may have similar hardware, this hardware can differ in capabilities. For instance, some playback devices 102 may have faster processors or more memory relative to other playback devices 102 in the media playback system. Similarly, some playback devices 102 may have faster network interfaces (e.g., which are compatible with newer IEEE 802.11 standards, such as WiFi 6) relative to other playback devices 102 in the media playback system (which may be compatible with older IEEE 802.11 standards). Generally, to avoid stressing the hardware when performing the additional functions of the POC playback device 1002, playback devices 102 with more capable (i.e., faster) hardware are selected over playback devices 102 with slower (typically older or more portable) hardware.

At the same time, playback devices 102 with similar hardware may be utilized differently within the media playback system 100. Some playback devices 102 may be connected to the LAN 111 using a wired (IEEE 802.3) connection while other playback devices are connected via wireless (IEEE 802.11) connections. Wired connections may be assumed to be more stable than wireless, so a first playback device 102 with a wired network connection may be selected over a second playback device 102 with a wireless network connection. Further, some playback devices 102 may be operating on battery power while other playback devices 102 are operating on wall power. To avoid extra power draw (and associated battery drain) on battery-powered playback devices 102, a wall-powered playback device 102 may be selected over a battery-powered playback device 102 to operate as the POC playback device 1002.

Within examples, techniques for selecting a group coordinator may be utilized in selecting the POC playback device 1002. Example techniques for selecting the group coordinator are disclosed in U.S. patent application Ser. No. 14/041,989, filed on Sep. 30, 2013, titled "Group Coordinator Device Selection", and issued as U.S. Pat. No. 9,654,545, and U.S. patent application Ser. No. 14/042,001, filed on Sep. 30, 2013, titled "Coordinator Device for Paired or Consolidated Players," and issued as U.S. Pat. No. 9,288,596, which were previously incorporated by reference in their entirety.

In an example, the media playback system 100 may identify a subset of playback devices 102 that meet certain requirements, and then select the POC playback device 1002. For instance, the media playback system 100 may identify the playback devices 102 in the media playback system having (i) at least minimum processing capabilities, (ii) wall-power, and (iii) a wired connection or a wireless connection with at least a threshold signal strength. Then, among this set, the media playback system 100 may select the POC playback device 1002 arbitrarily (e.g., as the first playback device 102 listed among this capable subset).

In another example, the POC playback device 1002 role may be cycled among all (or eligible playback devices 102) in the media playback system 100. For instance, during a time period, the media playback system 100 (and/or the one or more platform servers 1006) may maintain a record, log, or other data structure representing respective performance of each playback device 102 and/or the media playback system 100 as a whole in performing the role. Then, the playback device 102 having the "best" (e.g., most consistent) performance can be selected as the POC playback device 1002 for operation after the time period. This performance may be re-evaluated in subsequent time periods.

Since any playback device 102 can operate as the POC playback device 1002, the POC playback device 1002 for the media playback system 100 is not necessarily static. Rather, the POC playback device 1002 for the media playback system 100 may change based on various factors and under various conditions. For instance, adding or removing playback devices 102 from the media playback system 100 may cause the media playback system 100 to change the POC playback device 1002. Yet further, the POC playback device 1002 may change based on changes to the network configuration. Other examples are possible as well.

As noted above, in a further example, a smart hub device may perform the operations of the POC playback device 1002. When a smart hub is present in the media playback system 100, this smart hub may be selected to operate as the POC playback device 1002 based on its availability. Further examples and techniques related to a smart hub device are described in U.S. application Ser. No. 15/009,319 filed Jan. 28, 2016, titled "Systems and Methods of Distributing Audio To One Or More Playback Devices," and issued as U.S. Pat. No. 9,886,234 which is incorporated herein by reference in its entirety.

d. Determining One or More Media Playback System Commands

Figure 11A:
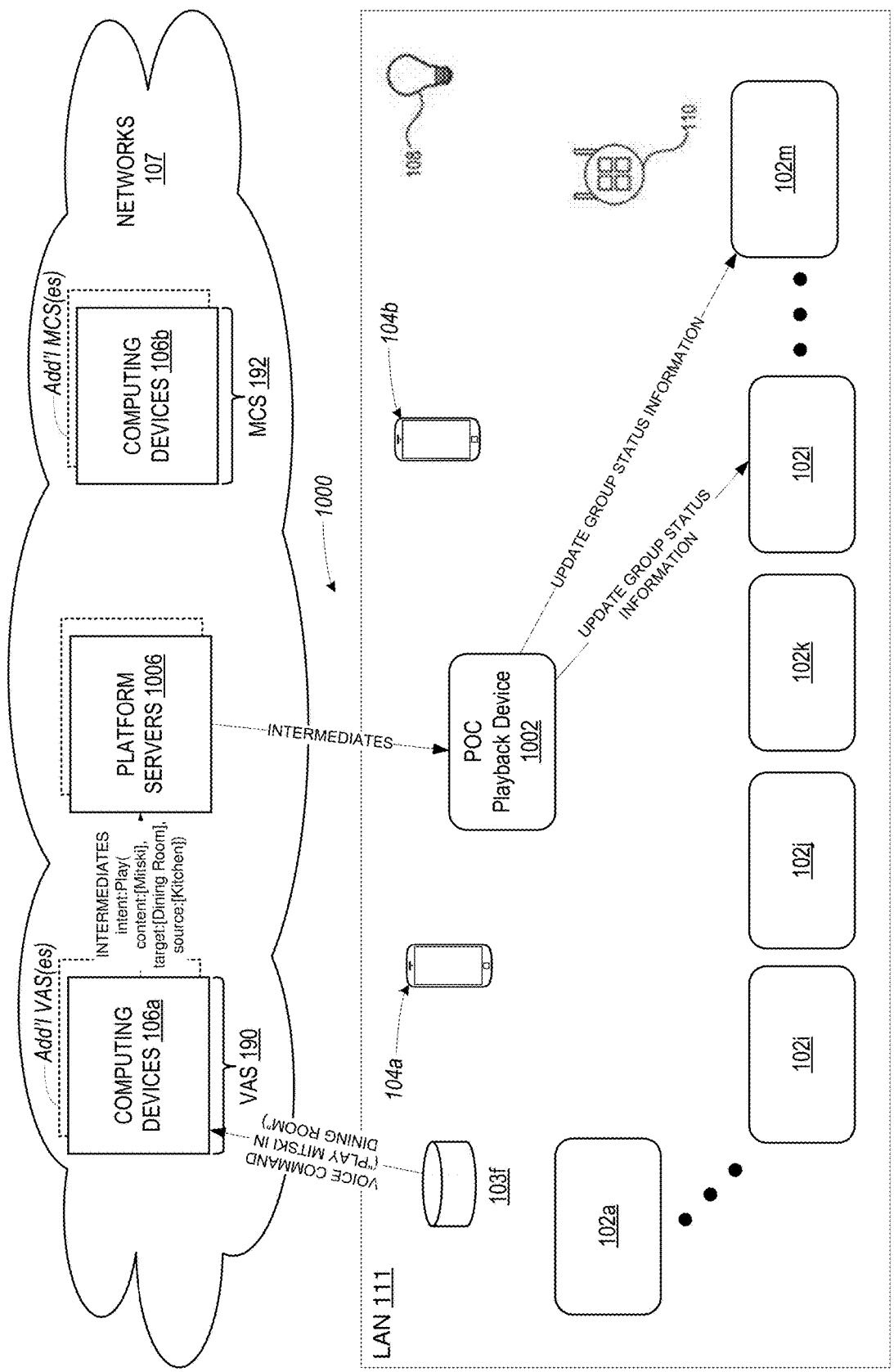
FIGS. 11A, 11B, 11C, and 11D are functional block diagrams illustrating example processing of user input in the cloud-based architecture in accordance with aspects of the disclosed technology.

As noted above, the cloud 1000 is configured to determine one or more media playback system commands (and corresponding parameters) to implement intermediate command (s) in the media playback system 100. FIG. 11A illustrates an example where the POC playback device 1002 determines one or more media playback system commands to carry out what the user wants to do. The POC playback device 1002 may determine the media playback system commands based on the command intermediates, which may include one or more intermediate commands and one or more intermediate parameters.

In some cases, another entity from the POC playback device 1002 may perform a first command determination on a user input to determine the command intermediates. When the user input originates in a third-party domain such as a voice assistant service or a streaming audio service, a third-party cloud service, such as the VAS 190 or the MCS 192, may perform the first command determination. Alternatively, the platform servers 1006 may perform the first command determination. Yet further, two or more entities, such as the platform servers 1006 and one of the third-party cloud services, may determine a portion of the command intermediates, which is collectively considered the first command determination. The determination(s) by the POC playback device 1002 on how to implement the command intermediates in the media playback system 100 may then be considered a second command determination.

In an example, the media playback system commands are commands native to the media playback system 100 that will be carried out to implement the intermediate command in the media playback system 100. Generally, the set of media playback system commands supported by the media playback system 100 are more extensive and detailed than those commands supported by an externally-facing platform API of the platform service or third-party APIs such as an intent-based API of the VAS 190. That is, as discussed above in subsection b, in an effort to make an external API easier to consume, a platform API might not expose all details of the media playback system 100. Yet, to carry out the various functions of the media playback system 100, the media playback system 100 may implement these details as media playback system commands or corresponding parameters.

In some examples, such as when the user input is a voice input, performing the first command determination involves determining an intent of the user input. As described above in connection with FIG. 1B, voice assistant services, such as the VAS 190, may determine an intent from a voice input using automatic speech recognition. In determining intent, the VAS 190 may determine that the intent corresponds to one or more commands and one or more parameters, which may be referred to as one or more intermediate command and one or more intermediate parameters.

In the FIG. 11A example, a user speaks a voice input to the NMD 103*f*, which in this example is "Play Mitski in the Dining Room." The NMD 103*f* in the kitchen 101*h* may transmit data representing this voice input to the computing devices 106*a* of the VAS 190, which determine an intent of the voice input. In particular, the determined intent is to play audio tracks by the artist Mitski in the Dining Room.

After determining the intent, the computing devices 106*a* of the VAS 190 may send data representing the intent to the media playback system 100. As noted above, this data is referred to as the command intermediates, and may include, for instance, an intermediate command (e.g., play( ) 860*a*) and one or more intermediate parameters (e.g., the parameters 861). As shown in FIG. 11A, the computing devices 106*a* may provide the command intermediates to the platform servers 1006, which in turn send the data to the POC playback device 1002. Alternatively, the computing devices 106*a* may send the data to the POC playback device 1002 using a different network path (e.g., a path not involving the platform servers 1006).

The command intermediates may be provided to the POC playback device in various forms. As another example, the command intermediates may be in the form of an intent and one or more parameters according to an intent-based API of the VAS 190. For instance, the computing devices 106*a* may determine that the intent is to playMusic with parameters <content>=["Mitski"] and <target>=["Dining Room"]. Here, the intermediate command is playMusic and the intermediate parameters are the content and target parameters. Alternatively, such data maybe in the form of one or more API calls to an externally-facing control API of the platform service, such as a play( ) function. The play( ) function may take content (i.e., "Mitski") and targets (i.e., Dining Room) as arguments, which may be considered the intermediate command and intermediate parameters, respectively. Other arguments are possible as well.

Within examples, the computing devices 106*a* may also provide other contextual information to the media playback system 100, perhaps in the form of additional intermediate parameters. For instance, as shown in FIG. 11A, the command intermediates may include an intermediate parameter indicating the source of the user input (source: [Kitchen]), similar to the source[ ] 861*b*-2 parameter (FIG. 10B). Another example intermediate parameter may include a user account of a user that provided the user input (e.g., a user account of the VAS 190, which may be linked to a user profile of the media playback system 100). Further exemplary intermediate parameters include a type of device that detected the user input (e.g., a dedicated NMD, an NMD implemented in device having a different primary function than voice control, such as a playback device or smart appliance, or a mobile device) and/or a time of day that the user input was detected, among other examples. Some or all of these intermediate parameters may be used by the POC playback device 1002 in determining how to implement the command in the media playback system 100.

In further examples, the media playback system 100 may provide, to the POC playback device 1002, additional or alternative contextual information corresponding to the user input. Since the voice input was provided to the NMD 103*i* on the LAN 111, the media playback system 100 may be able to provide contextual data on the user input. In some cases, the intermediate parameters may be similar to the contextual intermediate parameters provided to the playback device 1002 by the VAS 190, and may be provided to the POC playback device 1002 by the media playback system 100 in addition to or as an alternative of, by the VAS 190. Further examples related to contextual information are discussed in further detail in a subsequent section.

In some cases, determining the one or more media playback system commands may involve the POC playback device 1002 identifying a media playback system command corresponding to the intermediate command. For instance, if the intermediate command was to playMusic in an intent-based API of the VAS 190 as shown in FIG. 11A, the POC playback device 1002 may determine that the one or more media playback system commands should include a native play command. Notably, even where there is a media playback system command corresponding to the intermediate command, the POC playback device 1002 may determine different arguments to the media playback system command as compared with the intermediate command so as to implement the intermediate command and intermediate parameters in the media playback system 100.

In some examples, the command determination performed by the computing devices 106a is considered a primary intent determination and the command determination performed by the POC playback device 1002 is considered a secondary intent determination. That is, the POC playback device 1002 may modify or supplement an intent determination performed by the VAS 190 with a secondary intent determination. Such a secondary intent determination may take the form of modifying one or more of the intermediate parameters to modify the intent.

For instance, in the FIG. 11A example, the VAS 190 may determine that the reference to the artist "Mitski" in the voice input (without reference to specific albums or tracks) is an intent to play top tracks by the artist "Mitski" from a default streaming audio service. The intermediate parameters may indicate this content via one or more URIs representing the source of this content. The POC playback device may recognize this content as being different from the user's favorite Mitski playlist, and substitute this content for the user's favorite Mitski playlist in the one or more media playback system commands.

As indicated above, the POC playback device 1002 may base this secondary intent determination based on additional data available to the media playback system 100. This additional data may include additional state information (e.g., state variables) indicating various states of the playback devices 102 or other devices integrated with the media playback system 100. Further, this additional data may include user data from other cloud services (such as streaming audio services and smart device cloud services) that is shared with the media playback system 100 (e.g., via the platform servers 1006) and not necessarily shared or considered by the VAS 190 in performing the primary intent determination.

As another example, the POC playback device 1002 may modify intermediate commands to more closely match the capabilities of the media playback system 100. For instance, the media playback system may support a "true mute" state that can be toggled on and off while maintaining a volume setting that is restored after disabling mute. The VAS 190 may receive a voice input to "Mute the Dining Room." The VAS 190 may determine that the intent of this voice input is to set the volume level of the playback device 102l to zero, which corresponds to a particular intermediate command. In an example, the POC playback device 1002 may modify the intermediate command to set the volume level of the playback device 102l to zero as a media playback system command to enable the true mute state.

Performing the second command determination may further involve determining one or more target devices from among the smart devices in the media playback system 100. For instance, performing the second command determination may involve determining one or more target playback devices from among the plurality of playback devices 102 in the media playback system 100. Alternatively, determining the target devices may involve determining one or more smart IoT devices (such as the smart illumination device 108 or smart thermostat 110). In some cases, the target devices may include different types of devices, such as a playback device 102 and a smart IoT device or two or more different types of IoT devices, among other examples.

The command intermediates may indicate target device(s) either explicitly or implicitly. Further, the POC playback device 1002 may determine that certain devices were implicitly targeted based on various states of the media playback system 100 that existed when the command intermediates were received, such as pre-existing groups or pre-configured groupings (e.g., areas). That is, the POC playback device 1002 may determine target devices that were not necessarily explicitly or implicitly targeted by the command intermediates, but rather based on state and/or device information not necessarily known to the source of the command intermediates. In the following, various examples of explicit and implicit device targeting are provided with respect to the playback devices 102, but such examples also apply to targeting of smart IoT devices integrated in the media playback system 100.

As noted above, a user input may indicate one or more playback devices explicitly. Returning to the FIG. 11A example, the user explicitly targets the playback device 102l in the dining room 101g by referring to the "Dining Room" by name in their voice input. In some examples, the VAS 190 may recognize this speech as corresponding to the dining room 101g and explicitly indicate this target playback device in the command intermediates (e.g., as a target argument to a play command). In other examples, the VAS 190 might recognize the portion of the voice input corresponding to the user speaking "Dining Room" as speech speaking the words "Dining" and "Room" or the phrase "Dining Room" but not recognize the speech as corresponding to the dining room 101g in the media playback system 100. In this case, the VAS 190 may represent this portion of the voice input as one or more intermediate parameters that are not necessarily target parameters. The POC playback device may then determine that the parameter(s) correspond to the playback device 102l (by referring to the dining room 101g).

In addition to voice inputs, a user input may also explicitly target one or more playback devices 102 using a GUI. For instance, a user may select one or more target playback devices using a GUI on a control device 104. Yet further, a user may navigate within a control application to a control interface or set of control interfaces that include controls corresponding to a particular playback device or set of playback devices. Commands entered using these controls may explicitly target the corresponding playback device or set of playback devices. Other examples are possible as well.

A user input may also indicate one or more target playback devices implicitly. A user may implicitly target a playback device 102 by speaking a command to an NMD 103 associated with the playback device 102. In other words, a user may target a device or device(s) in a room by speaking to the NMD(s) 103 in that room. An NMD 103 may be associated with a particular playback device 102 by being physically implemented in the particular playback device 102 (i.e., in the same housing or enclosure). Alternatively, an NMD 103 may be associated with a particular playback device 102 using a functional association. The media playback system 100 may maintain or have access to data representing associations between NMD 103 and playback device(s) 102 in the media playback system 100. For instance, the NMD 103*i* may be associated with the playback device 102*l* as part of the dining room 101*g*.

In the FIG. 11A example, since the user spoke to the NMD 103*f* in the kitchen 101*h*, there may be an assumption that the user targeted the playback device 102*i* also in the kitchen 101*h*. However, this assumption may be negated by explicit targeting of the dining room 110*g* in the voice input. If the user had instead not indicated an explicit target, the POC playback device may have instead identified the playback device 102*i* also in the kitchen 101*h* as a target playback device. Notably, in some cases, the POC playback device 102 may have to adjust or override a default on the NMD 103*f* to play Mitski on the NMD 103*f* itself, which may be less capable at audio playback compared with the playback devices 102.

In some cases, the command intermediates may indicate the controller that detected an input, perhaps via an intermediate parameter. For instance, the VAS 190 may include an intermediate parameter indicating the NMD 103 that captured a voice input. In further examples, a zone may be associated with a remote control in a persistent one-to-one arrangement (as contrasted with the controller 104, which may selectively control any zone in the media playback system 100). A user input provided via such a remote may be routed over the LAN 111 and/or the networks 107 to the POC playback device 102. The identity of the remote may then be used by the POC playback device 102 to identify target playback device(s) associated with the remote.

In further examples, a user input may target one or more particular playback devices 102 by reference to a saved group, or area. As discussed above in connection with FIG. 3A, a user may pre-define saved groups (referred to areas) then create groups using individual zones and/or areas. Like zones, these areas may be associated with names (e.g. "upstairs" and "downstairs"), which may be referenced in one or more intermediate parameters. The POC playback device 1002 may disambiguate the areas into constituent zones to determine the target playback device(s). In some cases, the POC playback device 102 maintains state information indicating the zones associated with each pre-defined area.

In some implementations, saved groups as areas may include constituent smart devices associated with the constituent zones of an area. For instance, smart illumination devices in the master bathroom 101*a* and master bedroom 101*b* may be referenced using an area identifier (e.g. "turn on the lights in the master"). Similar to the playback devices 102, the playback device 1002 may disambiguate the areas into constituent zones to determine the target smart device(s).

In some cases, an explicitly or implicitly targeted playback device 102 is already in a group with one or more additional playback devices 102 that were not necessarily targeted. For instance, in the FIG. 11A example, the playback device 102*l* in the dining room 101*g* may already be in a synchrony group with the playback device 102*m* in the living room 101*f* when the user speaks the voice input "Play Mitski in Dining Room." In this case, the VAS 190 might or might not be aware of this pre-existing grouping, depending on whether the VAS 190 maintains grouping state information and also whether this state was up-to-date at the time of the user input. As such, the playback device 102*m* in the living room 101*f* might not be indicated in the command intermediates.

On the other hand, the POC playback device 1002 maintains state information indicating the current groupings in the media playback system 100. The POC playback device 1002 may identify additional playback devices in the pre-existing groups with the explicitly or implicitly targeted playback devices 102 based on this state information. For instance, in the FIG. 11A example, the POC playback device 1002 may determine the playback device 102*m* in the living room 101*f* as one of the one or more target playback devices.

Yet, in some cases, the user might not intend to target these additional playback devices. For instance, if the user created a group that included the master bedroom 101*b* and the master bathroom 101*a*, they might not intend to target the master bedroom 101*b* the next morning when explicitly targeting the master bathroom 101*a* (perhaps because their partner is sleeping in the master bedroom 101*b*). On the other hand, the user may be aware of this grouping (having previously created the grouping, or be otherwise aware of its existence, e.g., via a GUI on the control device 104) and desire to target the additional playback devices.

As such, in some examples, the POC playback device 1002 may use contextual information to determine whether to include additional playback devices 102 that were not necessarily targeted. Such contextual information may include a time of day that the user input was received (e.g., whether the request was received during daytime hours or at night), other contemporaneous interaction with the group using voice or other input (which would indicate intent to target the group), length of time since the group was created, and/or presence of other users in the zones corresponding to the additional playback devices 102. Other examples are possible as well.

In further examples, the POC playback device 1002 may determine whether to include implicitly targeted playback devices in the set of one or more target playback devices based on status of the implicitly targeted playback devices. In particular, the POC playback device 1002 may determine to include implicitly targeted playback devices in the set of one or more target playback devices when the implicitly targeted playback devices are in a state where the intermediate command or the one or more media playback system commands could be carried out. For instance, when the intermediate command is a volume adjustment command, the POC playback device 1002 may determine to include implicitly targeted playback devices in the set of one or more target playback devices when the implicitly targeted playback devices are currently playing audio. The assumption behind this determination may be that the user is not likely to use voice to adjust volume of playback device(s) that are not presently in use. Similar status determinations may be made for other types of commands.

When the POC playback device 1002 identifies multiple target playback devices, the one or more media playback system commands may include a grouping command. Notably, the POC playback device 1002 may determine that the one or more media playback system commands include a grouping command without the user input explicitly requesting grouping. In other words, since the user input explicitly and/or implicitly targeted multiple playback devices 1002, carrying out the command intermediates in the media playback system 100 involves determining an additional command of grouping the multiple playback devices 1002.

Example grouping commands may form various types of groups. For instance, in some cases, a grouping command may cause two or more playback devices to form a synchrony group. As another example, a grouping command may form a functional group of multiple IoT devices, such as a group of multiple smart thermostats 110 in the media playback system 100 or a group of the smart illumination devices 108 in an area (e.g., upstairs)). In other examples, a grouping command may form a group of two or more different kinds of devices, such as a playback device 102 and a smart IoT device or two or more different kinds of smart IoT devices.

To illustrate, in the FIG. 11A example, the POC playback device 1002 may determine that the target one or more playback devices include the playback device 102*l* in the dining room 101*g* (as it was explicitly targeted) and the playback device 102*m* in the living room 101*f* (as it was in a pre-existing group with the playback device 102*l*). The POC playback device 1002 may determine a grouping command that, when carried out, constructs a group from the target playback devices. This may involve determining which particular playback device 102 will operate as group coordinator, and constructing the grouping command such that this particular playback device 102 will operate as the group coordinator. Notably, these details might not exposed to the VAS 190 (even though the VAS 190 was the source of the command intermediates), as the details are handled internally by the POC playback device 102.

If some playback devices are already in a group, the POC playback device 1002 may utilize this pre-existing group in the grouping command, which may minimize disruption to the media playback system 100. For instance, the POC playback device 1002 may identify the largest subset of target playback devices, then modify that group as necessary to include all of the target playback devices. Other examples are possible as well.

Groups formed as part of implementing a command may be ephemeral. That is, may two or more target devices may form a group temporarily to carry out the determined command(s), which may then be ungrouped after the command(s) are carried out. If the target devices are playback devices, this grouping may be a synchrony group, which may remain in place for a duration of a playback session. In some cases, determining the media playback system commands (and corresponding parameters) to implement intermediate command(s) may involve determining an ungrouping command to ungroup the target playback devices after the determined command(s) are carried out. In further examples, certain devices may be configured to automatically un-group under certain conditions (e.g., a period of inactivity).

In some examples, the command intermediates may explicitly or implicitly target a playback device 102, but that playback device 102 is unavailable or unreachable (e.g., via the LAN 111 or networks 107). For instance, a user may speak a user input such as "play some Whitney on the patio," which explicitly targets the portable, battery-powered playback device 102*c*. However, if the playback device 102*c* is powered off, disconnected from the LAN 111, or otherwise unavailable, the POC playback device 102 may be unable to carry out the determined media playback system commands on the playback device 102*c*.

In an example, the POC playback device may determine that the one or more intermediate parameters explicitly indicate a particular playback device (e.g., a portable playback device, such as the playback device 102*c*) and further determine that the particular playback device is not currently available in the media playbacks system 100. Within examples, the POC playback device 1002 may make this determination based on any suitable techniques, such as an attempt to ping or otherwise communicate with the particular playback device.

Based on these determinations, the POC playback device 1002 may identify one or more alternate playback devices as the one or more target playback devices. The alternate playback devices may be playback devices that are in proximity to the user, or in proximity to the unavailable playback device, among other examples. Further, the alternate playback devices may be the NMD 103 that received the user input. Other examples are possible as well.

e. Carrying Out the Determined Media Playback System Command(s)

After determining the one or more media playback system commands, the cloud 1000 may cause the determined media playback system command(s) to be performed or carried out. For instance, the POC playback device 1002 may itself carry out the determined media playback system command(s). Alternatively, the POC playback device 1002 may send, to one or more of the target playback devices, data representing instructions to performed the determined media playback system command(s). In yet further examples, the POC playback device 1002 may send data representing the determined media playback system command(s) to the platform server(s) 106, which in turn cause the determined media playback system command(s) to be performed or carried out on the one or more target playback devices. Other examples are possible as well.

As noted above, in some cases, the POC playback device 1002 playback device may carry out the determined media playback system command(s) on behalf of the target playback devices. As noted above, the POC playback device 1002 maintains state information for itself and other playback devices 102 in the media playback system 100. The POC playback device 1002 may modify its state information according to the determined media playback system command(s).

For instance, continuing the grouping command of the FIG. 11A example, the POC playback device 1002 may update state information for the playback device 102*l* and the playback device 102*m* to indicate their membership and respective roles as group coordinator and group member in the new group. These changes may then be propagated over the LAN 111 to the playback device 102*l* and the playback device 102*m*, which update the respective state information maintained by the playback device 102*l* and the playback device 102*m*. This update effectively forms the group as the playback device 102*l* and the playback device 102*m* begin to operate according to their new states as group coordinator and group member in the new group.

After the group is formed, the POC playback device 1002 may carry out a play command to finishing implementing the user's intent to "play Mitksi." In particular, the POC playback device 1002 may updates state information for the new group to indicate that the group is currently playing the user's Mitski playlist. Like the grouping command, this updated state information may then be propagated over the LAN 111 to the playback device 102*l* and the playback device 102*m*, which begin playing the user's Mitski playlist.

Figure 11B:
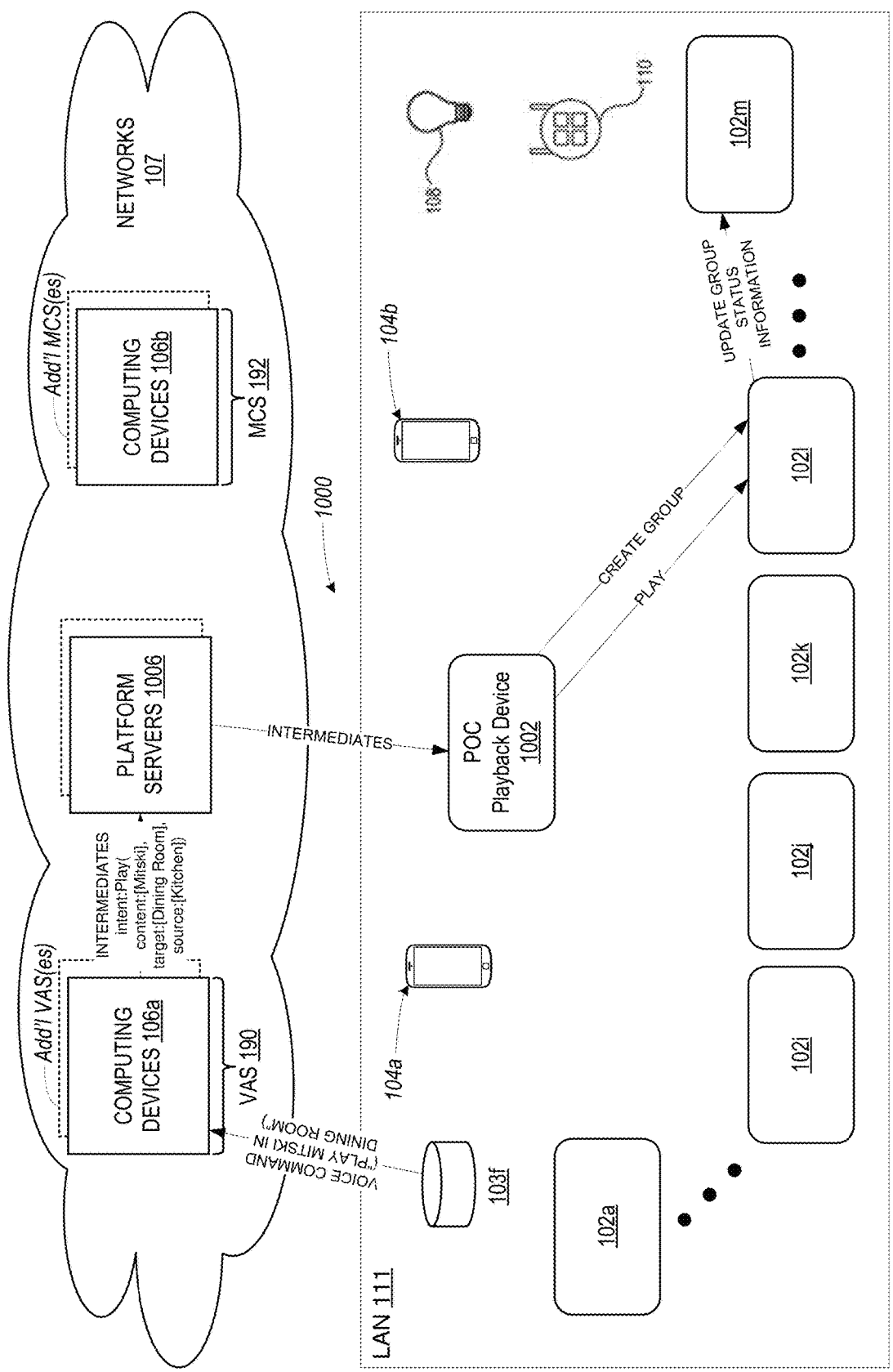

Alternatively, the POC playback device 1002 may send, to one or more of the target playback devices, data representing instructions to carry out the determined media playback system command(s). FIG. 11B illustrates an example where the POC playback device 1002 sends, to the group coordinator (playback device 102*l*), instructions to create the new group and also instructions to play back the Mitski playlist. The playback device 102*l* receives these instructions, updates its state information for grouping and playback to indicates its new role and playback status. Further, the playback device 102*l* updates the state information on the group member (playback device 102*m*) to cause the playback device 102*m* to join the new group and engage in synchronous playback with the playback device 102*l*.

Figure 11C:
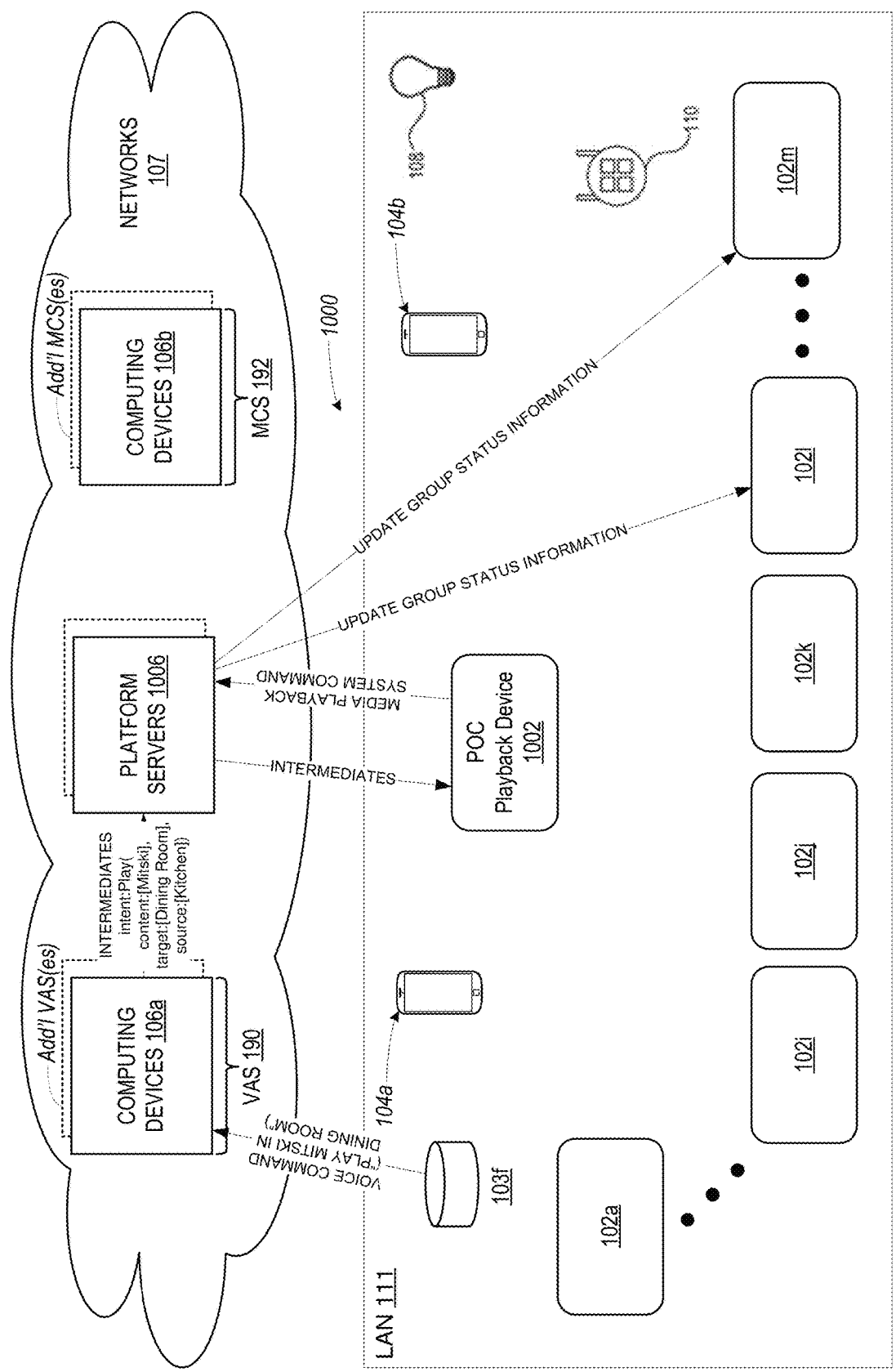

In some implementations, as shown in FIG. 11C, the POC playback device 1002 may send data representing the determined media playback system command(s) to the platform servers 1006. Similar to the POC playback device 720, the platform servers 1006 may carry out the determined media playback system command(s) on behalf of the target playback devices. For instance, the platform servers 1006 may update state information according to the determined media playback system command(s) and then propagate these changes to the target playback device(s), as shown in FIG. 11C. Alternatively, the platform servers 1006 may send, to one or more of the target playback devices, data representing instructions to carry out the determined media playback system commands. Other examples are possible as well.

f. Updating Media Playback System Status

In some examples, after causing the determined media playback system command(s) to be performed or carried out, the cloud 1000 may facilitate update status information maintained by the media playback system 100 and external entities (e.g., the VAS 190 and the MCS 192) to be updated to indicate the updated statuses of the target playback device(s). As noted above, in some cases, the cloud 1000 may implement an event/subscriber model. In an event/subscriber model, subscribers to a particular namespace (e.g., a groups namespace or a playback namespace, among other examples) receive events representing status updates when such status updates occur to this namespace. Alternatively, the cloud 1000 may implement a query model, whereby devices may query the cloud 1000 for status updates.

Figure 11D:
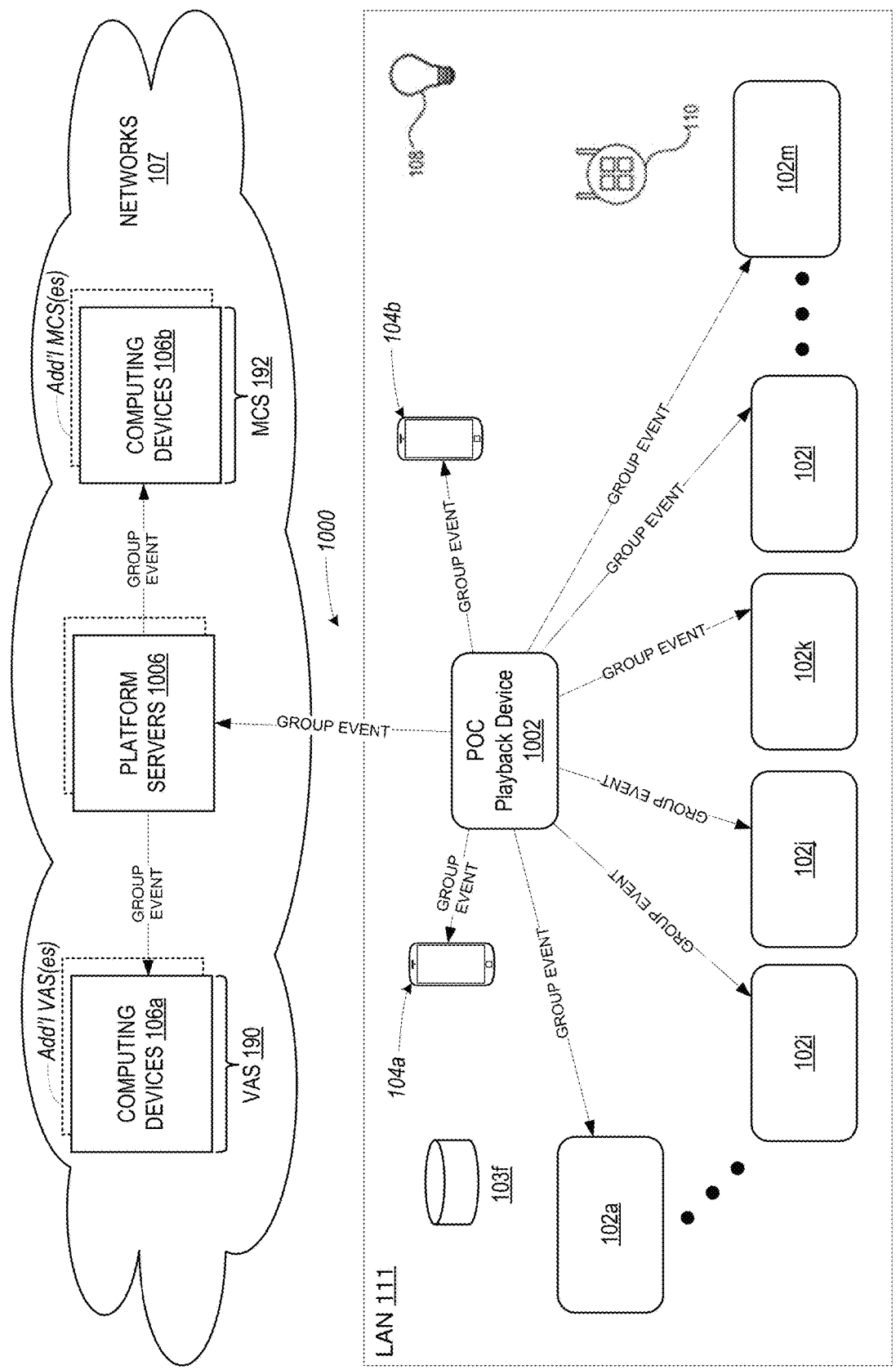

For instance, as shown in FIG. 11D, to propagate the group information on the newly created group ("Dining Room+Living Room"), the POC playback device 1002 may generate a group event with a groupObject representing the newly created group. A groupObject is propagated to subscribers of the group event, which may include the one or more platform servers 1006 and the controller devices 104*a* and 104*b*, among other devices in the media playback system. Further, the platform servers 1006 may forward or generate group events to the third-party service subscribing to the group events.

In some implementations, third party services, such as the VAS 190 and the MCS 192, may subscribe to a different type of namespace, which includes less state information as compared with the namespaces subscribed to by the playback devices 102 and platform servers 106. This might be a namespaces implemented by the platform API (as compared with a namespace implemented by an internal API). For instance, a groups namespace of the platform API might include information about a new group and its members, but not include state information about the group coordinator. This allows the third party services to manage (or even be concerned with) relatively less state information.

g. Example Commands

FIGS. 12A, 12B, 12C, and 12D are functional block diagrams illustrating the cloud 1000 processing various example commands. These commands, as well as other commands described herein, are intended to be illustrative of the wide variety of commands that could be carried out in the example media playback system 100. Those having skill in the art will appreciate that the examples and techniques described herein may be applied to many different types of commands to control various target devices such as playback devices 102 and other types of smart devices.

Figure 12A:
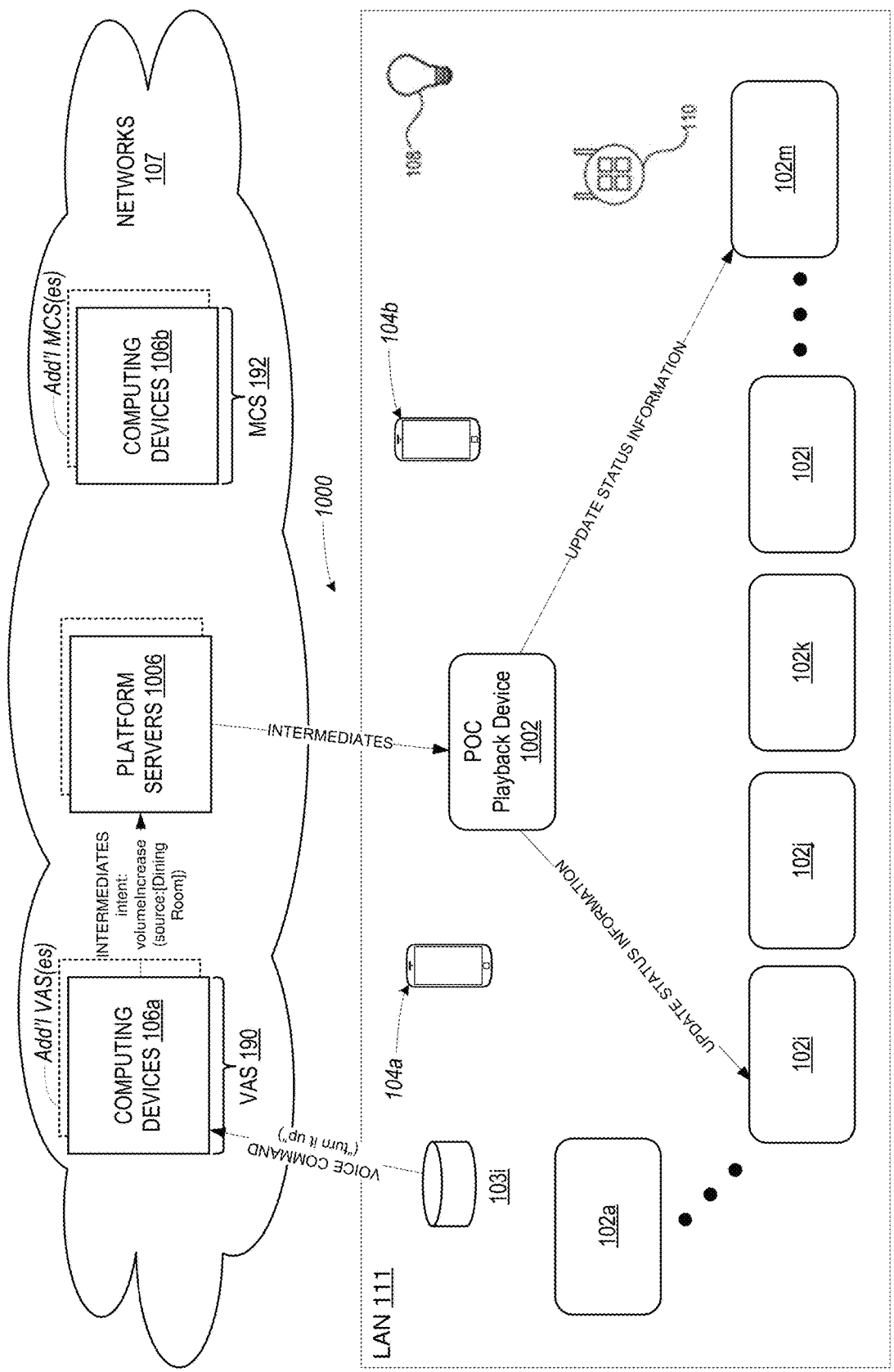
FIGS. 12A, 12B, 12C, 12D, and 12E are functional block diagrams illustrating example processing of user input in the cloud-based architecture in accordance with aspects of the disclosed technology.

In FIG. 12A, the user speaks a voice input ("Turn it up") to the NMD 103*i* in the dining room 101*g*. The VAS 190 performs a first command determination on this voice input, which results in a determination that this voice input has an intent to perform an upwards volume adjustment. The VAS 190 passes command intermediates representing this intent to the POC playback device 1002 via the platform servers 1006.

In turn, the POC playback device 1002 determines one or more media playback system commands to implement the command intermediates and one or more target playback devices for the one or more media playback system commands. Here, the user input did not explicitly indicate any target playback devices. Instead, the POC playback device 1002 identifies the playback device 102*l* and the playback device 102*m* based on implicit targeting. In particular, by speaking to the NMD 103*i* in the dining room 101*g*, the user implicitly targeted the playback device 102*l*. The POC playback device 1002 identifies the playback device 102*l* as a target playback device based on an intermediate parameter indicating the NMD 103*i* as the source of the user input and further based on an association between the NMD 103*i* and the playback device 102*l* (i.e., that both are in the dining room 101*g*). As noted above, such associations may be maintained in state information.

Further, since the playback device 102*m* is in a group with playback device 102*i*, the POC playback device 1002 also identifies the playback device 102*m* as a target playback device. In other words, the POC playback device 1002 identifies one or more additional playback devices (i.e., the playback device 102*m*) as being in the set of one or more target playback devices based on at least one particular playback device (i.e., the playback device 102*i*) being in a group with the one or more additional playback devices (i.e., the playback device 102*m*).

Figure 12B:
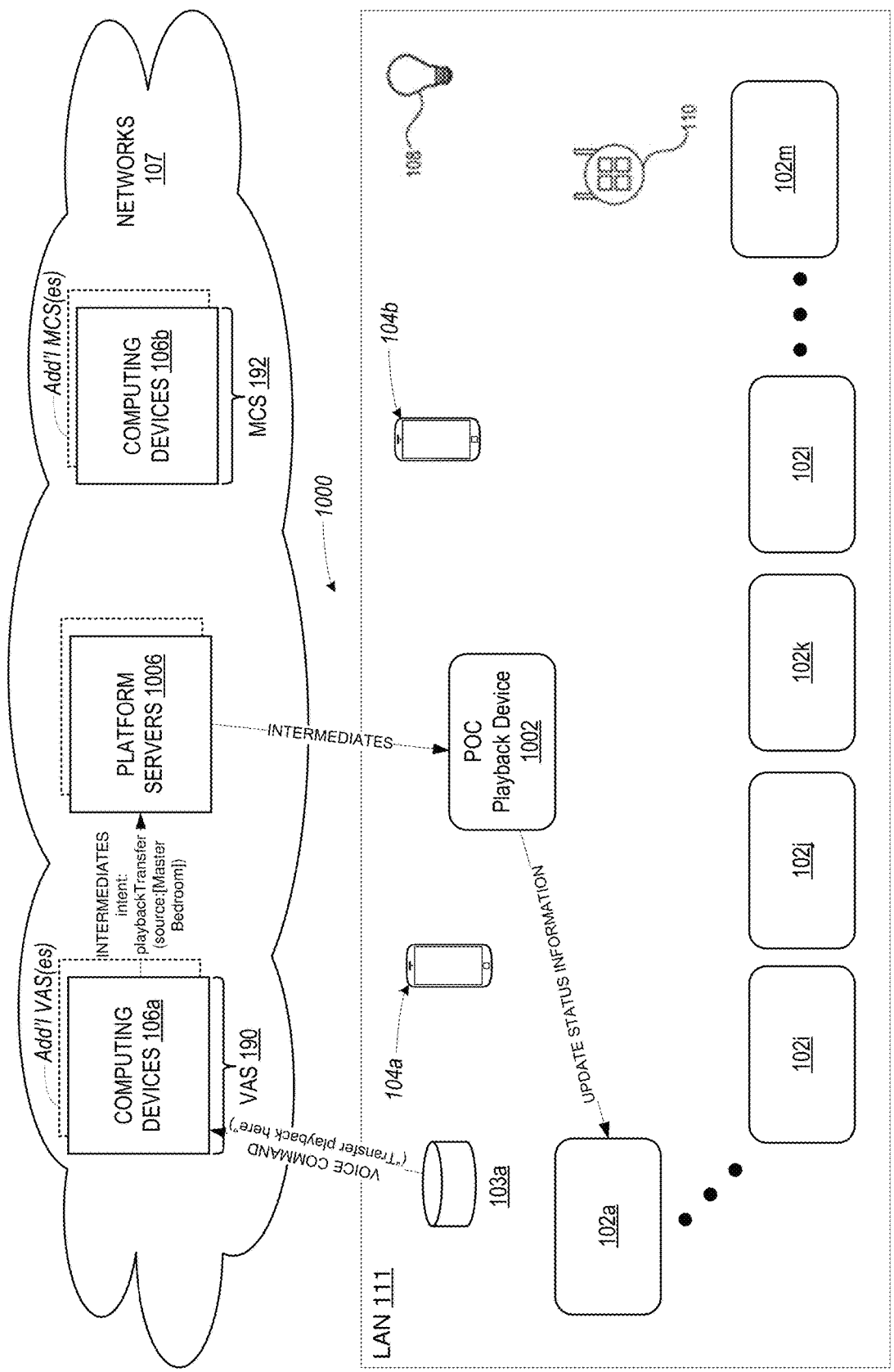

In FIG. 12B, the user speaks a voice input ("transfer playback here") to the NMD 103*a* in the den 101*d*. The VAS 190 performs a first command determination on this voice input, which results in a determination that this voice input has an intent to perform a playback transfer. The VAS 190 passes command intermediates representing this intent to the POC playback device 1002 via the platform servers 1006.

After receiving these command intermediates, the POC playback device 1002 determines one or more media playback system commands to implement the command intermediates and one or more target playback devices for the one or more media playback system commands. Here, the user input did not explicitly indicate any target playback devices. Instead, the POC playback device 1002 identifies the playback device 102*a* based on implicit targeting. In particular, by speaking to the NMD 103*a*, which is implemented in the playback device 102*a*, the user implicitly targeted the playback device 102*a*. The POC playback device 1002 identifies the playback device 102*a* as a target playback device based contextual information in the media playback system 100 indicating the NMD 103*a* as the source of the user input and further based on the association between the NMD 103*a* and the playback device 102*a*.

Further, the POC playback device 1002 identifies particular audio content that is currently playing on one or more source playback devices to transfer to the one or more target playback devices (i.e., the playback device 102*a*). The POC playback device 1002 may identify source playback devices and the particular audio content based on a playback status of the one or more source playback devices indicating that the one or more source playback devices device are currently playing audio. As described in foregoing sections, the POC playback device 1002 may maintain or have access to state information indicating various states, such as playback state, of the playback devices 102. The POC playback device 1002 may reference this information to determine which playback devices 102 are currently playing audio content, and further what audio content is currently playing. For instance, the POC playback device 1002 may identify the Mitski playlist playing on the playback device 102*l* and the playback device 102*m* as the particular audio content and source playback devices.

The POC playback device 1002 may determine a sequence of media playback system commands to effect the playback system. The sequence of media playback system commands may include a play command to initiate playback on the target playback device(s) (i.e., the playback device 102*a*), which may include as a parameter an offset indicating the current play position on the source playback device(s) (i.e., the group including the playback device 102*l* and the playback device 102*m*). The play command may instruct the target playback device(s) to start playback at the offset. Further, the sequence of media playback system commands may include a command to stop playback on the source playback devices.

In various implementations, the cloud 1000 may use any suitable technique to transfer playback, such as the techniques to transfer playback described in U.S. application Ser. No. 16/745,910 filed Jan. 17, 2020, and titled "Playback Session Transitions Across Different Platforms," which is herein incorporated by reference in its entirety. Further, as described in connection with the FIG. 11A-11C examples, the functions described herein as being performed by the POC playback device 1002 may also be performed by the platform servers 1006, or may be divided between the POC playback device 1002 and platform servers 1006, as well as other devices in the media playback system 100.

Figure 12C:
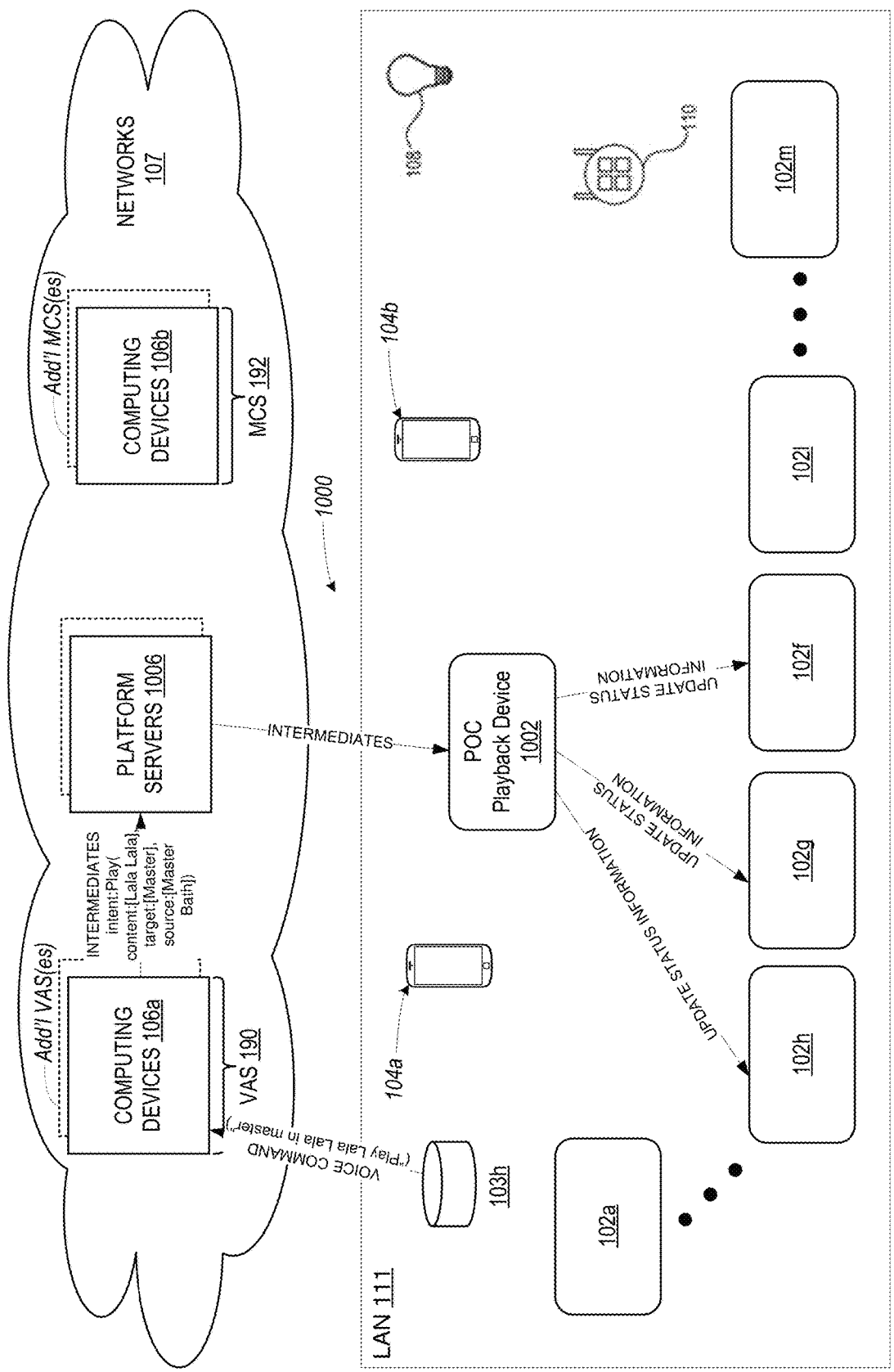

In FIG. 12C, the user speaks a voice input ("play Lala Lala in master") to the NMD 103*h* in the master bathroom 101*a*. The VAS 190 performs a first command determination on this voice input, which results in a determination that this voice input has an intent to play music by the artist Lala Lala in the master. The VAS 190 passes command intermediates representing this intent to the POC playback device 1002 via the platform servers 1006.

In turn, the POC playback device 1002 determines one or more media playback system commands to implement the command intermediates and one or more target playback devices for the one or more media playback system commands. Here, the POC playback device 1002 may determine that an intermediate parameter indicating "master" indicates an area identifier ("master"), which as described above, corresponds to an area pre-configured to include two or more constituent zones or rooms when instantiated. The POC playback device 1002 may disambiguate the area into constituent rooms or zones (e.g., the master bathroom 101*a* and master bedroom 101*b*) and identify the playback device 102*h* in the master bathroom 101*a*, as well as the playback devices 102*f* and 102*g* as target playback devices.

Further, the POC playback device 1002 may determine that the one or more media playback system commands required to carry out the command intermediates involve a group creation command to group the two or more playback devices in a synchrony group to play back audio content in synchrony in the media playback system (so as to play "Lala Lala" in all zones of the "master" area). In determining the group creation command, the POC playback device 1002 may select a group coordinator for the new group, which may perform various functions to facilitate synchronous playback, such as distributing timing information to other playback devices in the synchrony group.

In some cases, user inputs may originate from third-party controllers, such as streaming media service apps. As discussed above in connection with FIG. 4, a controller device may be a network device on which media playback system controller application software may be installed, such as for example, an iPhone™, iPad™ or any other smart phone, tablet, or network device (e.g., a networked computer such as a PC or Mac™). Such network devices may also or alternatively run streaming media service apps, which a user may use to select and stream media to the network device. Such devices may also allow the playback target to be changed from the network device to one or more playback devices using a streaming protocol. Exemplary streaming protocols include APPLE® AIRPLAY® AND SPOTIFY® CONNECT®.

Figure 12D:
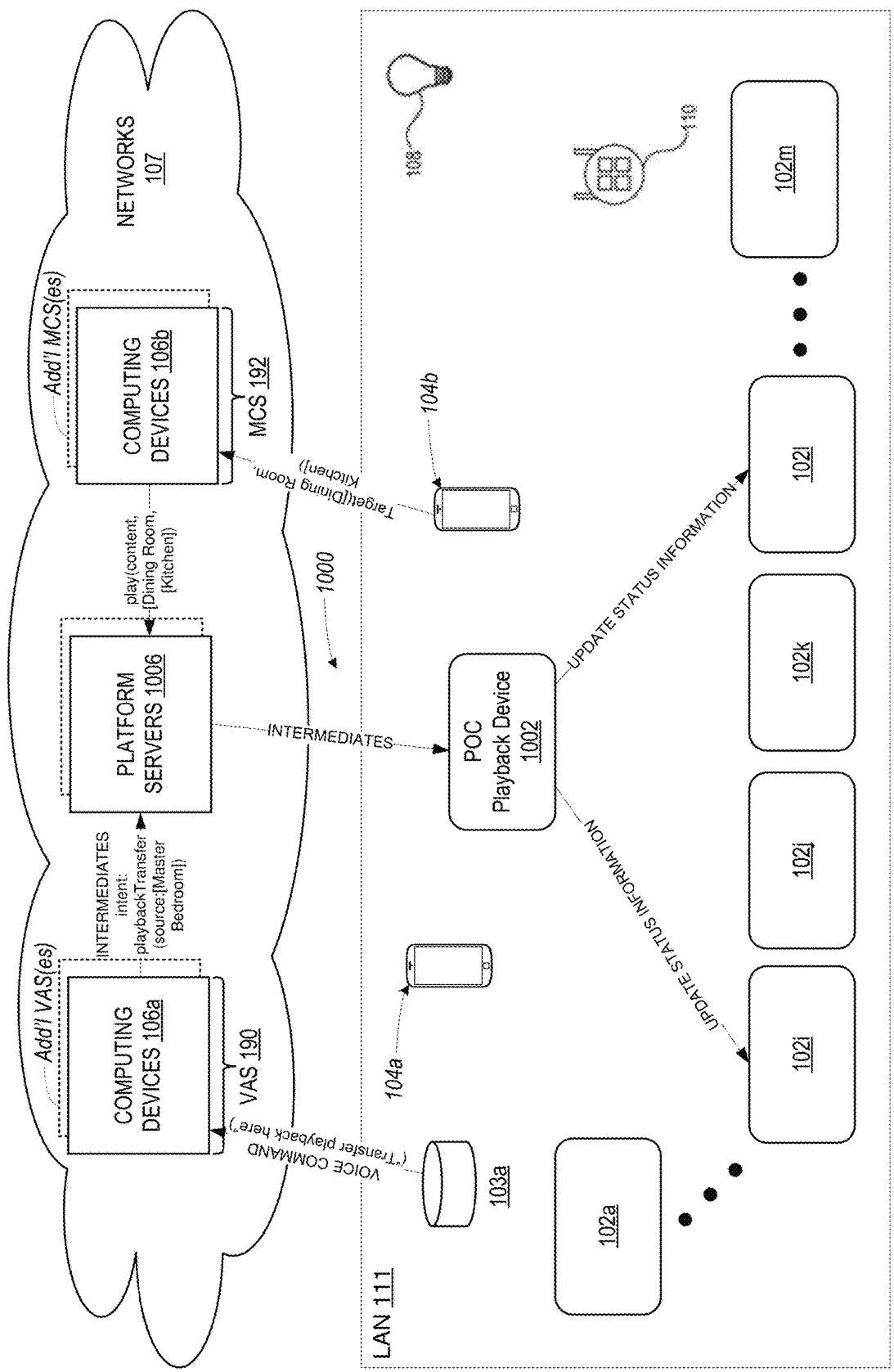

In FIG. 12D, the user may start playing audio content on the controller device 104*b* using a streaming media service app using earbuds. Desiring to play the music out loud while preparing dinner, the user uses the streaming media service app corresponding to a particular streaming audio service (i.e., the MCS 192) to change the playback target from the controller device 104*b* to the Dining Room and Kitchen. This causes the streaming media service app to send one or more commands to the computing devices 106*b*. These commands are formed according to a streaming protocol of the streaming audio service.

Upon receiving these commands, the computing devices 106*b* send one or more commands to the one or more platform servers 1006. These commands may be in the form of an API call according to the streaming protocol of the streaming audio service. For instance, a streaming protocol play( ) function may take content (i.e., a URI or array of URIs (e.g., a playlist) indicating currently playing content at the controller device 104*b*) and targets (i.e., Dining Room and Kitchen) as arguments. The platform servers 1006 may implement streaming protocol so as to be configured to accept API calls according to the streaming protocol of the streaming audio service. Alternatively, the computing devices 106*b* of the MCS 192 may be configured to call into the platform API of the media playback system 100.

The platform service 1006 may pass the streaming protocol play( ) function and arguments to the POC playback device 1002 as command intermediates. From these command intermediates, the POC playback device 1002 may determine one or more media playback system commands, including a play command to start playing content on the target playback devices. The POC playback device 1002 may use an intermediate parameter indicating the URI(s) indicating currently playing content at the controller device 104*b* to construct the media playback system play command.

Further, the POC playback device 1002 may identify the playback device 102*i* in the kitchen 101*h* and the playback device 102*l* as the target playback devices for the play command. The POC playback device 1002 may determine that these playback devices are ungrouped, and based on these determinations, determine that the one or more media playback system commands needed to implement the command intermediates in the media playback system 100 include a group creation command (i.e., to group the playback device 102*i* in the kitchen 101*h* and the playback device 102*l*) in the dining room 101*g*.

Example techniques relating to playback transfer and voice control are described in U.S. patent application Ser. No. 15/223,218 filed Jul. 29, 2016, titled "Voice Control of a Media Playback System," and issued as U.S. Pat. No. 9,947,316, which is herein incorporated by reference in its entirety.

Figure 12E:
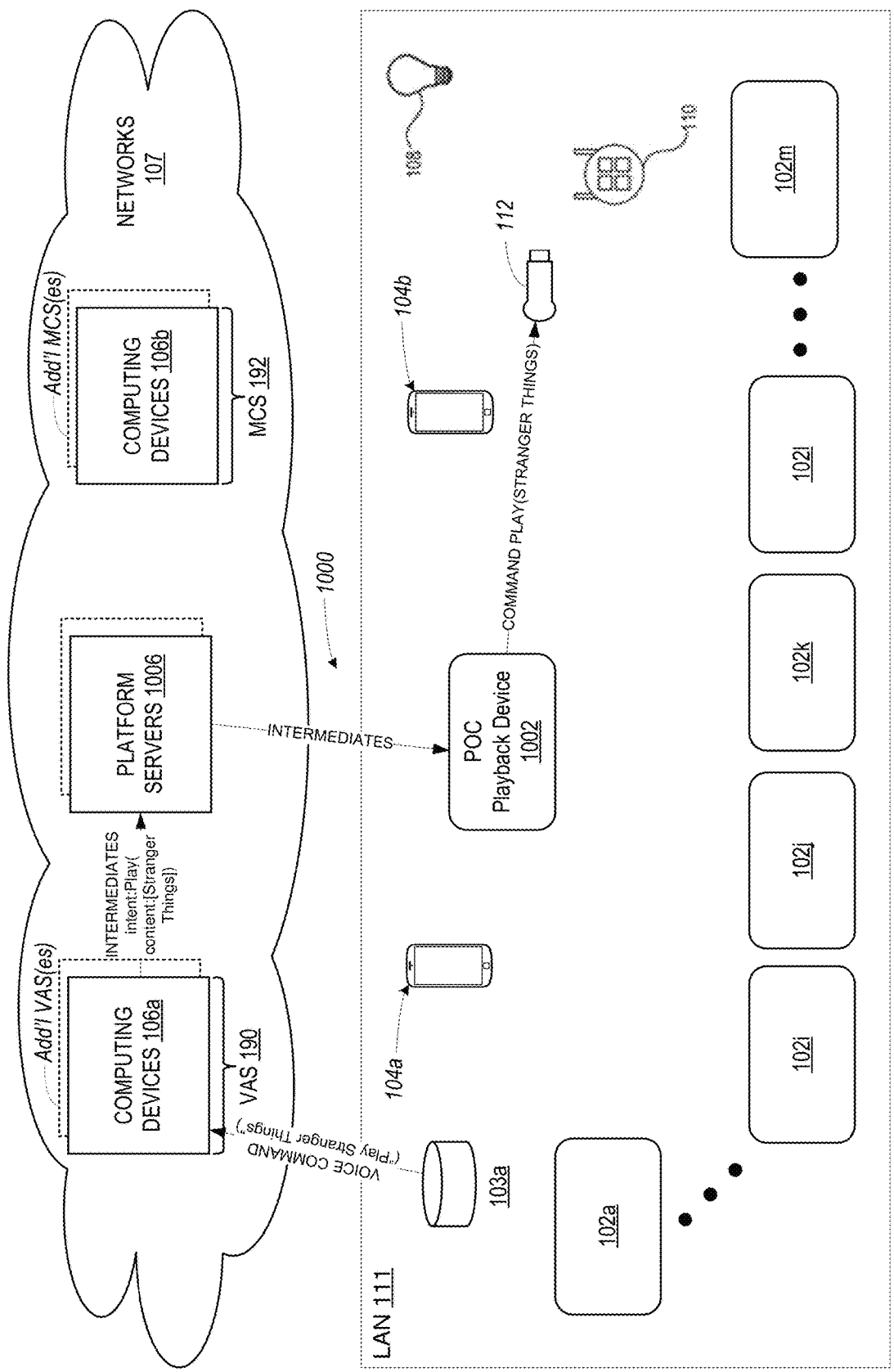

The POC playback device may perform similar command determination for commands targeted at video playback devices, such as the dongle 112. In FIG. 12E, the user speaks a voice input ("play Stranger Things") to the NMD 103*a* in the den 101*d*. The VAS 190 performs a first command determination on this voice input, which results in a determination that this voice input has an intent to resume playback of Stranger Things® on Netflix®. The VAS 190 passes command intermediates representing this intent to the POC playback device 1002 via the platform servers 1006. In this example, the command intermediates include a URI pointing to episode three of season 2 of the series Stranger Things® on Netflix®.

In turn, the POC playback device 1002 determines one or more commands to implement the command intermediates and/or one or more target playback devices for the one or more commands. Here, since an explicit video playback target was not specified, the POC playback device 1002 may determine that the target video playback device is the dongle 112 based on the dongle 112 being associated with the den 101*d* and the voice input being spoken to the NMD 103*a* in the den 101*d*. The POC playback device 1002 may determine a command to implement this intent (e.g., a play( ) command according to an API of a streaming video service (i.e., Netflix®).

The POC playback device 1002 may cause implementation of this command. For instance, as shown in FIG. 12E, the POC playback device may send data representing the command to the dongle 112, which the dongle 112 may use to perform the play( ) command according to the API of a streaming video service. Alternatively, the POC playback device may send data representing the command to one or more computing devices 106*b* associated with the streaming video service, which cause the one or more computing devices 106*b* to stream the requested video to the dongle 112 for playback.

h. Contextual and Status Information

As noted above in the foregoing sections, the POC playback device 1002 may determine the one or more media playback system commands based on contextual information (in addition to, or as an alternative to, the command intermediates). This contextual information may include information that is available to the cloud 1000, but not necessarily available to third-party cloud services such as the VAS 190 and the MCS 192. As such, having access to this contextual information may improve the ability of the POC playback device 1002 to determine how to implement the command intermediates in the media playback system 100.

In another example, the cloud 1000 may maintain or have access to user preference (e.g., user favorites, tracked artists, or starred songs, among other examples) and/or playback history data from a plurality of streaming audio services. A user may register respective user accounts of different streaming audio services (e.g., SPOTIFY, APPLE MUSIC, PANDORA, BANDCAMP, etc.) to enable playback from those services on the media playback system 100. Further, the user may opt-in to share playback data from these services with the cloud 1000 to improve music discovery and determinations, including playback from these services that occurs on the playback devices 102 as well as on other devices (e.g., mobile devices).

Figure 13:
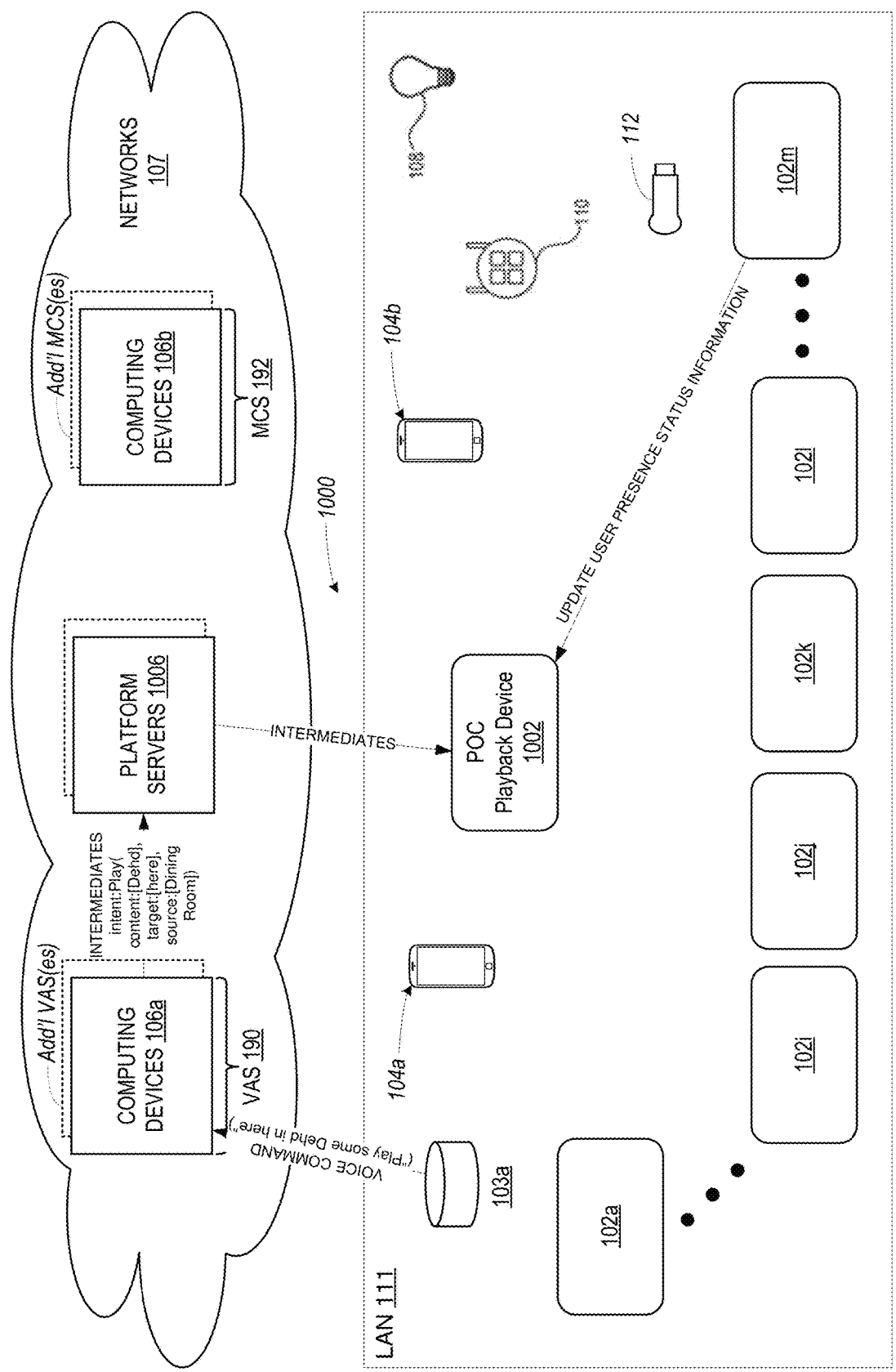
FIG. 13 is a functional block diagram illustrating example processing of user input in the cloud-based architecture in accordance with aspects of the disclosed technology.

The cloud 1000 may use this data to determine content for play commands. For instance, referring to FIG. 13, if the user speaks a voice input such as "play some Dehd in here," the VAS 190 may attempt to identify content from the artist "Dehd" based on a default streaming audio service. In contrast, the cloud 1000 may supplement or modify this determination based on the user's interactions with multiple streaming audio services, which may provide a more relevant selection of content as compared with the VAS 190.

Further, the media playback system 100 may gather information based on user presence and/or activity. For example, the playback devices 102 located throughout the household (FIG. 1A) may include sensors to assist with listener localization (e.g., to determine that users are present in certain zones or rooms). This listener localization information may be shared with the cloud 1000 via the LAN 111 and/or the networks 107. For example, the playback device 102*m* in the living room 101*f* may detect a user in the living room 101*f*, and responsively generate an event in the user location namespace to indicate this presence, thereby providing subscribers to the user location namespace (such as the cloud 1000) with this information.

The media playback system 100 may use any suitable technique for listener localization. Several example techniques are described in the following: U.S. application Ser. No. 13/340,126 filed on Dec. 29, 2011, titled "Sound Field Calibration Using Listener Localization," and issued as U.S. Pat. No. 9,084,058; U.S. application Ser. No. 13/568,993 filed on Aug. 7, 2012, titled "Acoustic Signatures in a Playback System," and issued as U.S. Pat. No. 8,930,005; and U.S. application Ser. No. 14/475,191 filed on Sep. 2, 2014, titled "Zone Recognition," and issued as U.S. Pat. No. 10,275,138, which are each incorporated herein by reference in their entirety. Further example techniques are described in the following: U.S. application Ser. No. 16/672,271 filed on Nov. 1, 2019, titled "Systems and Methods for Device Localization;" U.S. application Ser. No. 16/672,280 filed on Nov. 1, 2019, titled "Systems and Methods for Target Device Prediction;" and U.S. application Ser. No. 16/775,212 filed on Jan. 28, 2020, titled "Systems and Methods for Playback Device Management." Other example techniques are described in U.S. Application No. 63/072,888 filed Aug. 31, 2020, and titled "Ultrasonic Transmission for Presence Detection," which is herein incorporated by reference in its entirety.

The cloud 1000 may use this information to identify target playback devices. For instance, the cloud 1000 may use listener presence in the living room to identify that zone as being in the set of target playback devices. Alternatively, the cloud 1000 may use listener presence in a zone to identify that zone as being not in the set of target playback devices. For instance, the bedroom 101*c* has a user present at night, the cloud 1000 may use the listener presence in the bedroom 101*c* to exclude the playback device 102*e* from the set of target playback devices (perhaps despite other factors indicating that this zone should be included, such as a pre-existing zone).

In some cases, a user may opt to share biometric data with the media playback system, which may provide indications of user activity. For instance, data from a wearable device, such as a smart watch, may assist in determining activity (e.g., sleeping, exercising, relaxing, etc.). This data may be used to determine content for play command, or whether to include certain playback devices as target playback devices, among other examples.

The cloud 1000 may further use time of day in various manners. Time of day may influence mood and/or activity, which may be used to guide content selection when determining how to implement a play command in the media playback system 100 for example. The cloud 1000 may maintain or have access to a time data from a server (e.g., using network time protocol).

Further, multiple pieces of contextual information may be used in conjunction to make predictions on user activity. For example, various contextual data, such user preferences, types of zones, and type of day may be used to predict a user activity (e.g., from a set of pre-defined activities). For instance, if the user is located in the kitchen 101*h* between 5 μm and 7 μm and is active, the cloud 1000 may predict that the user is cooking and the determine particular audio content corresponding to that activity.

i. Interactions with Third Party Controllers

Figure 14A:
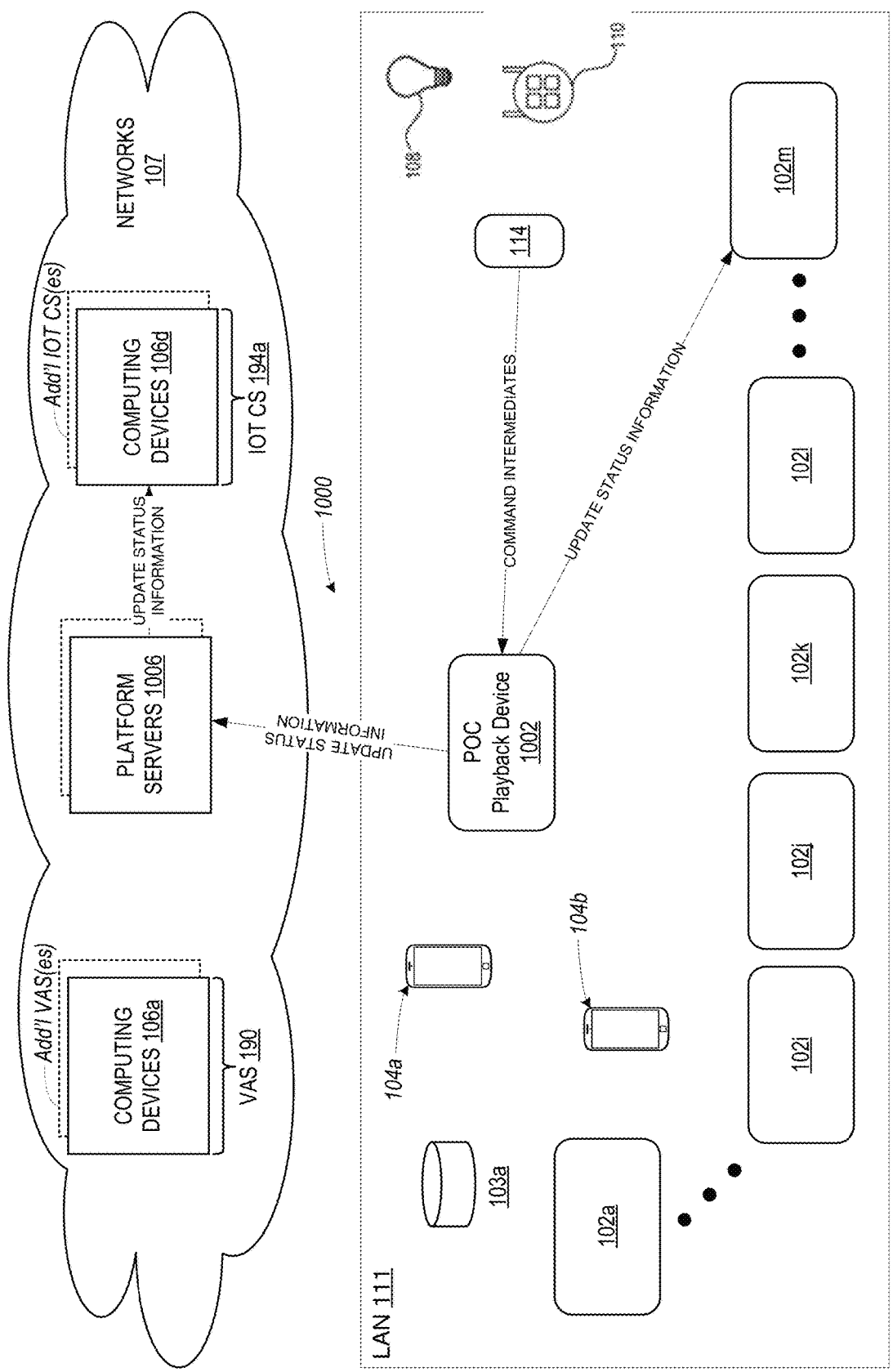
FIGS. 14A and 14B are functional block diagrams illustrating example processing of user input in the cloud-based architecture in accordance with aspects of the disclosed technology.
Figure 14B:
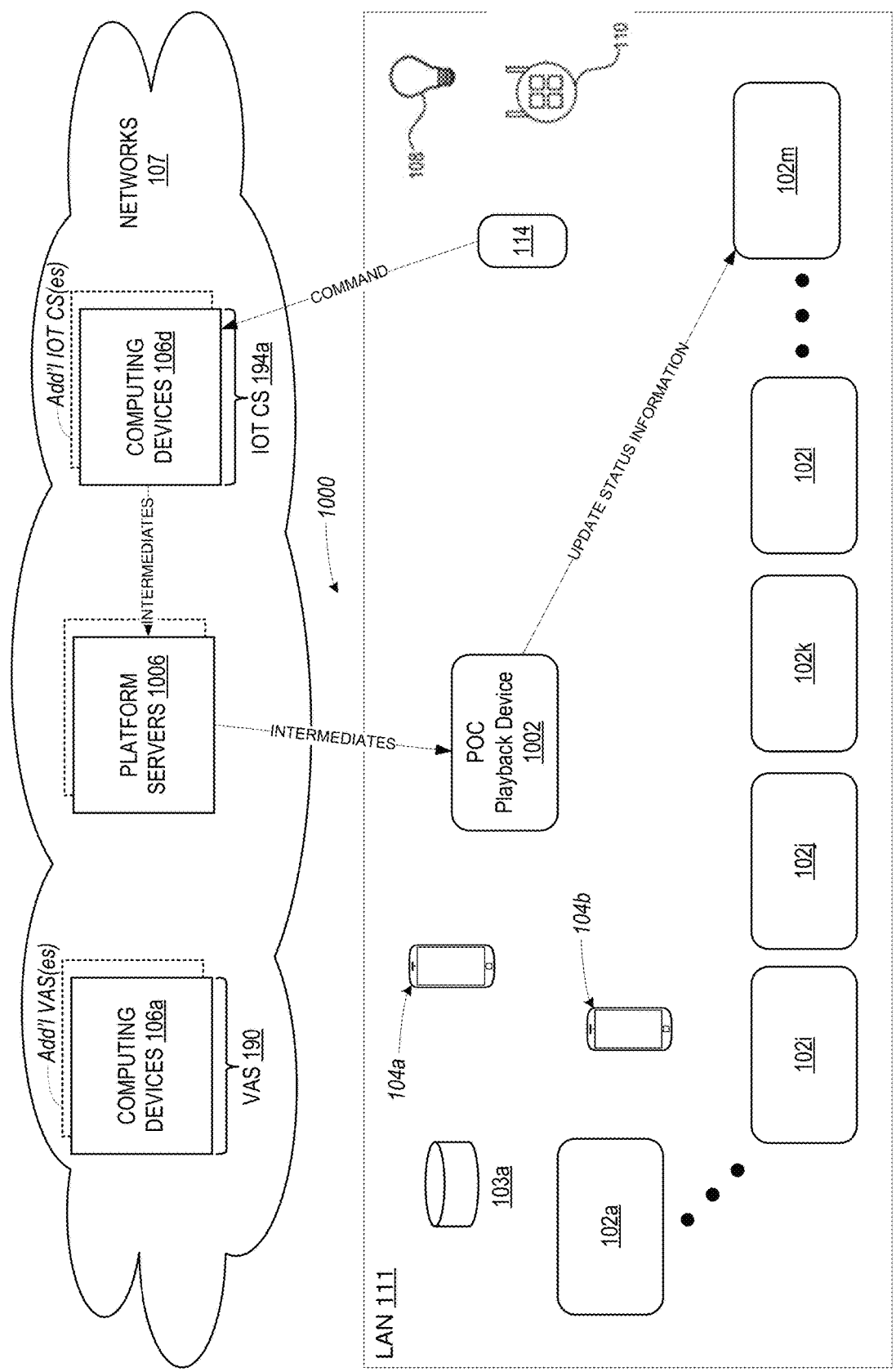

FIGS. 14A and 14B are functional block diagrams illustrating the cloud 1000 interacting with various third party controllers. One type of third-party controller may be a "dedicated" remote control, such as a remote control with transport and volume control configured to control playback and volume of a particular room or zone. Another type of third-party controller is integrated controls on a smart device (e.g., controls on the smart thermostat 110). When changes are made via a third party controller, the cloud 1000 may facilitate updating status corresponding to these changes. Further, the cloud 1000 may facilitate informing the third party controllers of changes made via the cloud 1000.

FIG. 14A illustrates an example where a dedicated remote control 114 is configured to control playback and volume of the living room 101*f* (i.e., the playback device 102*m*). In particular, the remote control 114 includes a play/pause control selectable to start and stop playback on the playback device 102*m*, as well as a volume control selectable to adjust volume on the playback device 102*m*. Other controls are possible as well. This zone may be configured during a set-up procedure of the remote control 114.

Also shown in FIG. 14A is an Internet-of-Things (IoT) cloud service 194*a* including one or more computing devices 106*d*. The IoT cloud service 194*a* may support the remote control 114. Further, the cloud 1000 may integrate with the IoT cloud server 194*a* via the platform API and/or an API of the cloud service 194*a*.

In the FIG. 14A example, when a control on the remote control 114 is selected, the remote control 114 sends data representing the selected control to the POC playback device 1002. In some cases, this data may be considered command intermediates, as the command may be according to the platform API. The POC playback device 1002 may then determine media playback system commands to implement the selected control in the media playback system, and then cause the targeted playback device(s) (e.g., the playback device 102*m*) to carry out the determined media playback system commands.

Alternatively, the remote control may send data representing the selected control to the POC playback device 1002 already in the form of the media playback system commands. In such an example, the POC playback device may determine the target playback devices, which may include additional playback devices to the playback device 102*m* (e.g., if the playback device 102*m* is in a pre-existing group). The POC playback device 1002 may then cause the target playback devices to carry out the media playback system commands represented by the data received from the remote control 114.

FIG. 14B illustrates another example where the dedicated remote control 114 is configured to control playback and volume of the living room 101*f* (i.e., the playback device 102*m*). In this example, the remote control 114 communicates with the cloud 1000 via the IoT cloud service 194*a*. As shown in FIG. 14B, the computing devices 106*d* may send data representing command intermediates to the platform servers 1006, which in turn send data representing the command intermediates to the POC playback device 1002. The POC playback device may determine media playback system commands and/or target playback devices from the command intermediates, and then cause the target playback devices to carry out the determined media playback system commands.

V. Example Techniques to Process Command Intermediates

Figure 15:
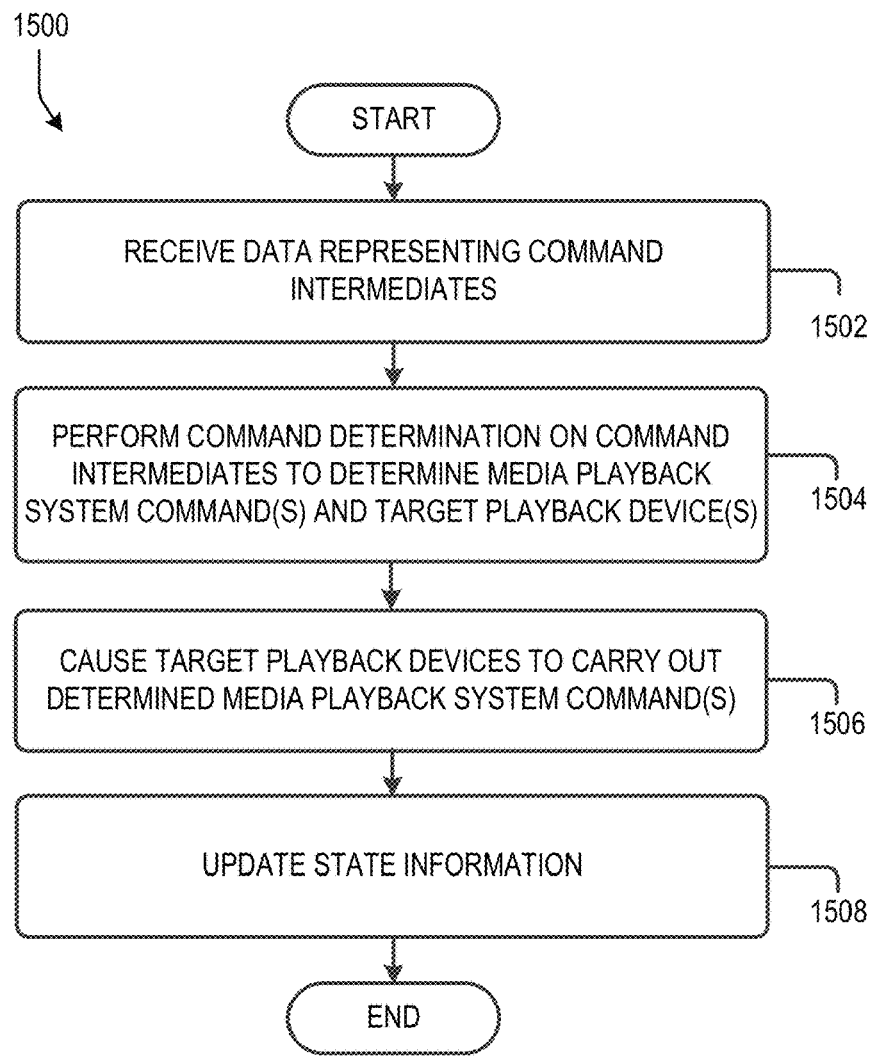
FIG. 15 is a flow diagram of an example method to process command intermediates in accordance with aspects of the disclosed technology.

FIG. 15 is a flow diagram showing an example method 1500 to process command intermediates. The method 1500 may be performed by a system including the cloud 1000, such as the one or more platform servers 1006 and the POC playback device 1002 (FIG. 10A). Alternatively, the method 1500 may be performed by any suitable device or by a system of devices, such as the playback devices 102, NMDs 103, control devices 104, computing devices 105 computing devices 106, or by smart IoT devices (such as the smart illumination device 108 or smart thermostat 110). For the purposes of illustration, certain features are described as being performed by the POC playback device 1002.

At block 1502, the method 1500 involves receiving data representing command intermediates comprising (i) an intermediate command and (ii) one or more intermediate parameters. For instance, a POC playback device 1002 (FIG. 10A) in the media playback system 100 (FIGS. 1A and 1B) may receive, via the network interface from one or more servers of a cloud service, data representing command intermediates including (i) an intermediate command and (ii) one or more intermediate parameters. Examples of command intermediates are described above in section III.

The command intermediates may be based on a first command determination performed on a user input. For instance, a cloud service, such as voice assistant service, a streaming audio service, an IoT service, or a platform service, may perform a first command determination on a user input to determine the command intermediates. Examples of performing a first command determination to determine command intermediates are described above in section III.

At block 1504, the method 1500 involves perform a second command determination on the command intermediates to determine (i) one or more media playback system commands and (ii) one or more target playback devices from among the plurality of playback devices in the media playback system. For instance, the POC playback device 1002 may determine one or more media playback system commands based on the command intermediates, and perhaps based on additional information, such as contextual information. Examples of determining media playback system commands are described above in section III Further, the POC playback device 1002 may determine one or more target playback devices from among the plurality of playback devices 102 in the media playback system 100. As indicated above, in various implementations, the POC playback device 1002 may additionally or alternatively determine target devices that are not necessarily playback devices, such as various smart devices (e.g., the smart illumination device 108 or smart thermostat 110). Examples of determining target playback devices are described above in section III.

At block 1506, the method 1500 involves causing the determined one or more target playback devices to perform the determined one or more media playback system commands. For example, the POC playback device 1002 may cause the one or more target playback devices to perform the determined one or more media playback system commands by updating state information; examples of such an implementation are described above in section III. In other examples, the POC playback device 1002 may cause the one or more target playback devices to perform the determined one or more media playback system commands by sending data representing instructions to perform the determined one or more media playback system commands to one or more of the target playback devices, as described above in section III. Yet further, in additional examples, the POC playback device 1002 may cause the one or more target playback devices to perform the determined one or more media playback system commands by sending data representing the determined one or more media playback system commands and the one or more target devices to the platform servers 1006, as also described above in section III.

At block 1508, the method 1500 involves updating state information. For example, the POC playback device 1002 may update state information maintained by the POC playback device 1002 according to the determined one or more media playback system commands. Yet further, the POC playback device 1002 may cause other devices to update their state information. For instance, the POC playback device 1002 may generate a state update event for state event subscribers, which is propagated over the LAN 111 and/or networks 111 (FIG. 10A). Accordingly, the state event subscribers may receive, via respective network interfaces, a state object comprising state information modified by carrying out the determined one or more media playback system commands and then update respective state information representing the state information modified by carrying out the determined one or more media playback system commands.

Further variations and functions that may be performed as part of the method 1500 are described throughout this disclosure, including in the foregoing sections I, II, III, and IV, as well as the following sections.

VI. Example Grouping Techniques

Figure 16A:
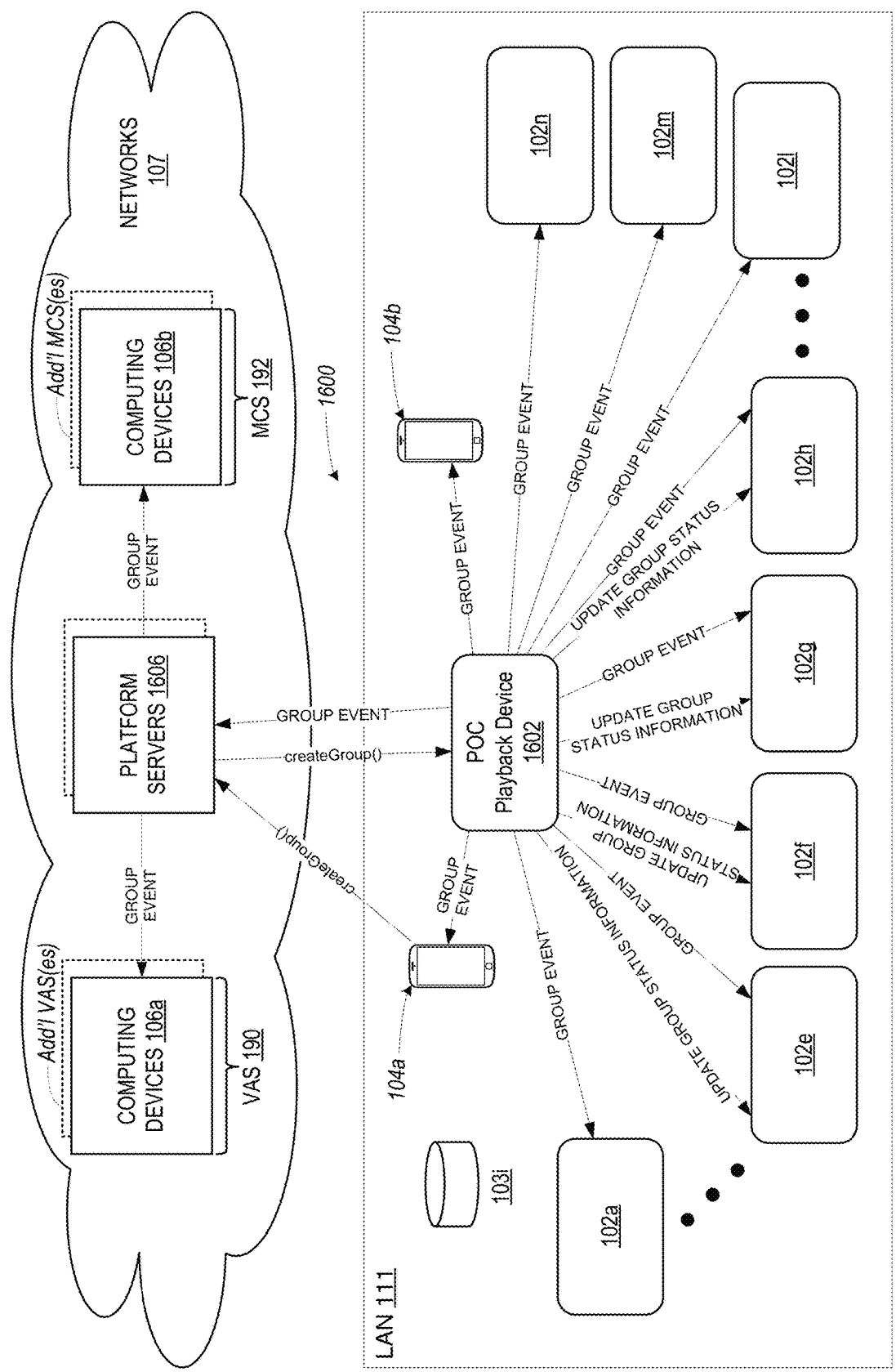
FIGS. 16A, 16B, and 16C are functional block diagrams illustrating an example cloud-based architecture to facilitate control of the media playback system.
Figure 16B:
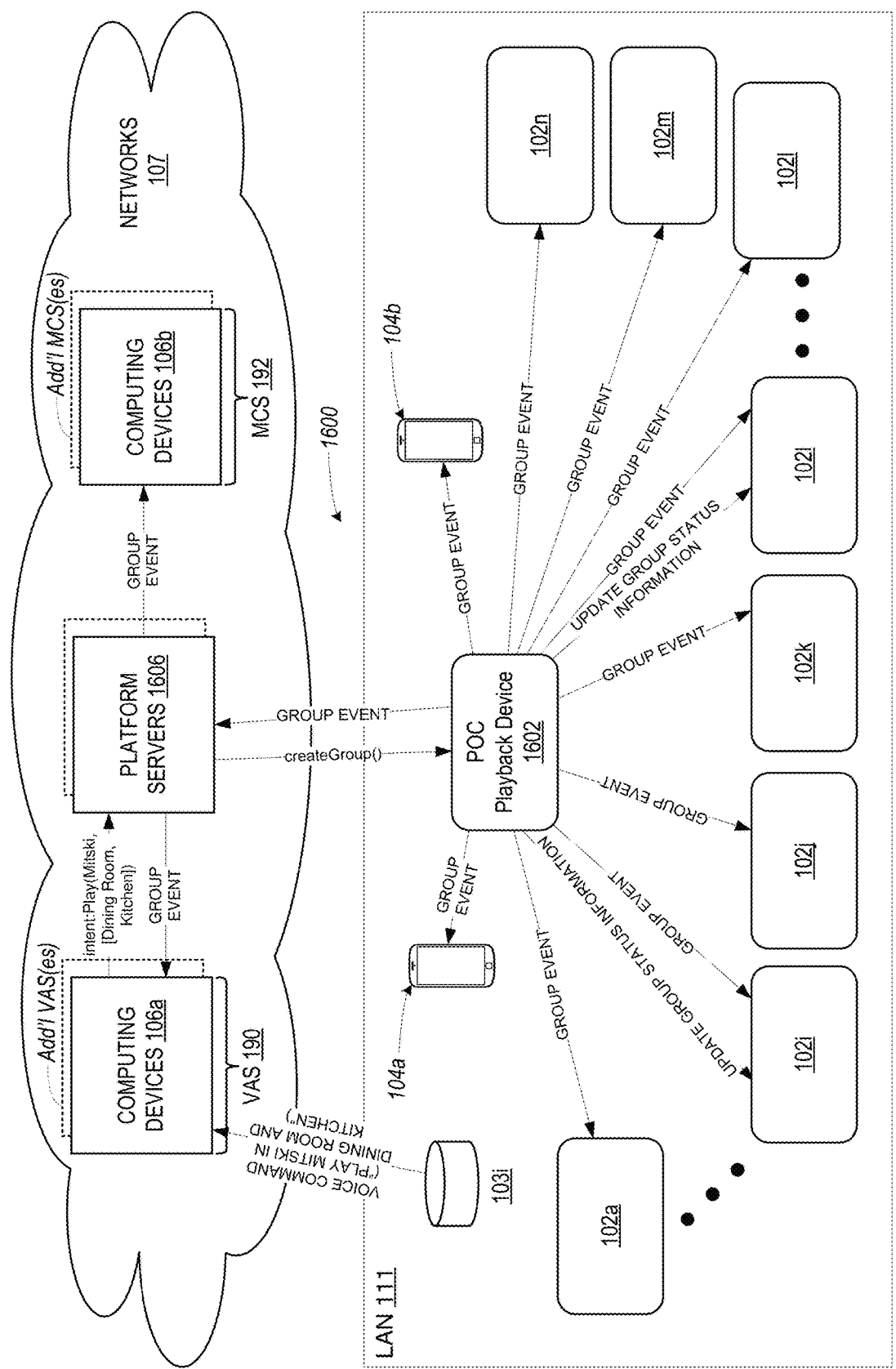
Figure 16C:
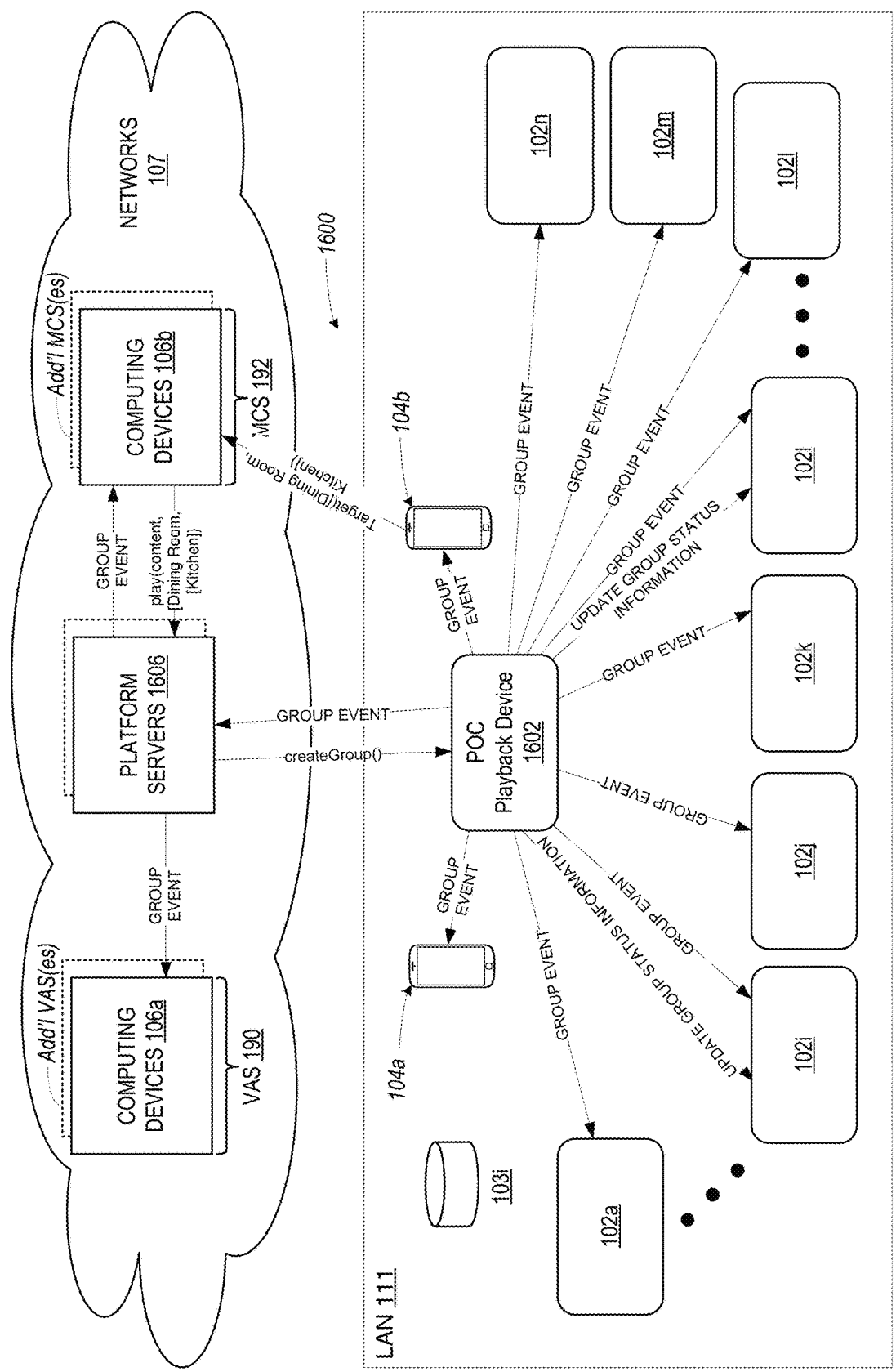

As noted above, example techniques described herein involve cloud-based architectures to facilitate various playback operations, such as grouping and other control functions of a media playback system. FIGS. 16A, 16B, and 16C are functional block diagram illustrating a cloud-based architecture 1600 comprising a POC playback device 1602 and one or more platform servers 1606. In addition, a subset of playback devices 102 in the media playback system 100 (FIGS. 1A and 1B) are shown by way of example. Similarly, the NMD 103i and the control devices 104a and 104b are shown to provide illustrative examples of these types of devices interacting in and with respect to the cloud-based architecture 1600. The one or more platforms servers 1606 are connected to the network 107 along with the computing devices 106a and computing devices 106b (FIG. 1B). The one or more platforms servers 1606 may be the same or similar to the computing devices 106c (e.g., a subset of).

Under this cloud-based architecture, the one or more platform servers 1606 operate as a cloud-based hub to receive commands natively (e.g., via a controller device 104) and from third-party services (e.g., the VAS 190 or the MCS 192). In this manner, the one or more platform servers 1606 can be considered to provide a platform service for the media playback system 100. Like the playback devices 102, the one or more platform servers 1606 may maintain state information indicating the current state of each playback device 102 in the media playback system 100. In providing a cloud-based platform service, the one or more platform servers 1606 may operate as a cloud-based hub for a plurality of media playback systems 100 (e.g., with unique household identifiers, which may be registered to different users and/or located in different households), as well as other types of "smart home" systems and platforms.

The one or more platform servers 1606 may support a control API, by which the media playback system 100 and/or third-party services may send commands and receive status updates. Further, the one or more platform servers 1606 may be configured to support one or more third-party APIs, such as an intent-based API of the VAS 190 or a streaming protocol API of the MCS 192. To enable interaction over the networks 107, such APIs may be based on the hypertext transfer protocol (http).

The POC playback device 1602 is a particular one of the playback devices 102 in the media playback system 100 which is configured to carry out commands received from the platform servers 1606c. Since, as discussed above, each playback device 102 maintains state information for itself and the other playback devices 102 in the media playback system 100, any playback device 102 in the media playback system 100 may operate as the POC playback device 1602.

In some examples, the POC playback device 1602 is selected from among the playback devices 102 in the media playback system 100 arbitrarily. This is possible since the playback devices 102 may in some respects be more or less equally situated, as they may have similar hardware (FIG. 2A) and software. For instance, the media playback system 100 may select a particular playback device 102 to operate as the POC playback device 1602 based on the particular playback device 102 being first in a list or other data structure indicating the playback devices 102 in the media playback system 100.

Alternatively, in other examples, the POC playback device 1602 may be selected on the basis of one or more parameters indicating that it may be preferable as a POC playback device, including parameters involving stability and/or capability. Operating as the POC playback device 1602 is an additional task on top of the typical playback operation for a playback device 102, so playback devices 102 with additional processing capabilities (processor speed and memory) may be preferred. Further, stable playback devices (e.g., those with a long uptime, and consistent network connections) are preferred, as selecting such devices may promote stability in the connection with the platform servers 1606.

While the playback devices 102 may have similar hardware, this hardware can differ in capabilities. For instance, some playback devices 102 may have faster processors or more memory relative to other playback devices 102 in the media playback system. Similarly, some playback devices 102 may have faster network interfaces (e.g., which are compatible with newer IEEE 802.11 standards, such as WiFi 6) relative to other playback devices 102 in the media playback system (which may be compatible with older IEEE 802.11 standards). Generally, to avoid stressing the hardware when performing the additional functions of the POC playback devices 1602, playback devices 102 with more capable (i.e., faster) hardware are selected over playback devices 102 with slower (typically older) hardware.

At the same time, playback devices with similar hardware may be utilized differently within the media playback system 100. Some playback devices 102 may be connected to the LAN 111 using a wired (IEEE 802.3) connection while other playback devices are connected via wireless (IEEE 802.11) connections. Wired connections may be assumed to be more stable than wireless, so a playback device 102 with a wired network connection may be selected over a playback device with a wireless network connection. Further, some playback devices 102 may be operating on battery power while other playback devices 102 are operating on wall power. To avoid extra power draw (and associated battery drain) on battery-powered playback devices 102, a wall-powered playback device 102 may be selected over a battery-powered playback device 102 to operate as the POC playback device 1602.

Within examples, techniques for selecting a group coordinator may be utilized in selecting the POC playback device 1602. Example techniques for selecting the group coordinator are disclosed in U.S. patent application Ser. No. 14/041,989, filed on Sep. 30, 2013, titled "Group Coordinator Device Selection", and issued as U.S. Pat. No. 9,654,545, and U.S. patent application Ser. No. 14/042,001, filed on Sep. 30, 2013, titled "Coordinator Device for Paired or Consolidated Players," and issued as U.S. Pat. No. 9,288,596, which were previously incorporated by reference in their entirety.

In an example, the media playback system 100 may identify a subset of playback devices 102 that meet certain requirements, and then select the POC playback device 1602. For instance, the media playback system 100 may identify the playback devices 102 in the media playback system having (i) at least minimum processing capabilities, (ii) wall-power, and (iii) a wired connection or a wireless connection with at least a threshold signal strength. Then, among this set, the media playback system 100 may select the POC playback device arbitrarily (e.g., as the first playback device 102 listed among this capable subset).

In another example, the POC playback device 1602 role may be cycled among all (or eligible playback devices 102) in the media playback system 100. For instance, during a time period, the media playback system 100 (and/or the one or more platform servers 1606) may maintain a record, log, or other data structure representing respective performance of each playback device 102 and/or the media playback system 100 as a whole in performing the role. Then, the playback device 102 having the "best" (e.g., most consistent) performance can be selected as the POC playback device 1602 for operation after the time period. This performance may be re-evaluated in subsequent time periods.

Since any playback device 102 can operate as the POC playback device 1602, the POC playback device 1602 for the media playback system 100 is not necessarily static. Rather, the POC playback device 1602 for the media playback system 100 may change based on various factors and under various conditions. For instance, adding or removing playback devices 102 from the media playback system 100 may cause the media playback system 100 to change the POC playback device 1602. Yet further, the POC playback device 1602 may change based on changes to the network configuration. Other examples are possible as well.

In FIG. 16A, using the controller device 104a on the LAN 111, a user may select two or more playback devices 102 to group using the user interface 440 (FIG. 4). For instance, a user may select one or more zones area and/or one or more areas using a controller interface such as controller interface 740b. In an example, a user of the media playback system 100 may have pre-configured an area called "master" which includes the master bedroom 101b and the master bathroom 101a. After this change, the controller interface 740b will include list the master area in addition to the downstairs area (provided that the downstairs area hasn't been removed by the user). Further, the user may desire some music throughout the bedrooms upstairs while performing chores or some other activity. As such, the user may select the bedroom 101c and the master area in the controller interface 740b.

After receiving user input representing a request to group two or more playback devices 102, the controller device 104a may call the group creation function 860b (shown as "createGroup( )") (FIG. 8B). In connection with calling the createGroup( ) function, the controller device 104a may disambiguate any areas in the group into constituent devices, as described section III. In particular, referring to the example introduced above, the controller device 104a may disambiguate the "master" area into the master bedroom 101b and the master bathroom 101a. While the controller device 104a calls the group creation function 860b, the controller device 104a does not carry out the operations itself.

Rather, data representing this function call and its arguments is passed to the one or more platform servers 1606, as shown in FIG. 16A. In some examples, the one or more platform servers 1606 receive this data and forward the data representing the createGroup( ) function call and its arguments to the POC playback device 1602. This command routing involving the one or more platform servers 1606 contrasts with local command routing, which would involve routing the function call and its arguments locally over the LAN 111 to a POC playback device 102 instead of through the cloud (i.e., the platform servers 1606).

The POC playback device 1602 carries out the createGroup( ) function call. The POC playback device 1602 may carry out the createGroup( ) function call in a similar manner as described in the preceding section with respect to the POC playback device 102. That is, the POC playback device 1602 may select a group coordinator and update state information for group coordinator and group members to indicate their roles in the new group. In particular, as shown in FIG. 16A, the POC playback device 1602 updates state information for the playback device 102c (in the bedroom 101c), the playback devices 102f and 102g (in the master bedroom 101b), and playback device 102h (in the master bathroom 101a).

Note that the playback devices 102f and 102g are configured in a bonded zone (i.e., a stereo pair). In some implementations, since the media playback system 100 treats the bonded zone as a single logical playback device, the POC playback device 1602 communicates with the coordinator of the bonded zone instead of communicates with each playback device in the bonded zone. Then, the coordinator of the bonded zone updates the group members as necessary.

Further, the POC playback device 1602 may call the set area source function 860c (FIG. 8C) to set the sourceAreaIds 867 string on the group coordinator of the new group. In this example, the sourceAreaIds 867 for the "Master+Bedroom" group will indicate the master area, which will be set in the state information of the group coordinator.

To propagate the group information on the newly created group, the POC playback device 1602 may generate a group event with a groupObject 863 representing the newly created group (FIG. 8D). This groupObject 863 is propagated to subscribers of the group event, which may include the one or more platform servers 1606 and the controller device 104*a*, among other devices in the media playback system. The sourceAreaIds 867 may be propagated to the other devices in the groupObject 863 along with the other group information, as described in the preceding section.

To propagate the group information to third-party services, the one or more platform servers 1606 generate events, which one or more of the VAS 190 and the MCS 192 can subscribe to receive state information for the media playback system 100. For instance, after the new group is generated, the platform servers 1606 can generate or forward the group events to the one or more computing devices 106*a* of the VAS 190 and/or the one or more computing devices 106*b* of the MCS 190.

More broadly, using eventing and/or querying (e.g., get-Groups( )), third-party services such as the VAS 190 and the MCS 192, may maintain the state information maintained on the playback devices 102 (or a subset thereof). This allows the third-party services to form API calls to the one or more platform services using the state information. For instance, after a user defines an area, the existence of this area may be propagated to the state information maintained by the VAS 190, which allows the VAS 190 to recognize refers to the area when determining intent of voice inputs.

Grouping commands may also originate from third-party services, such as voice assistants. Turning to FIG. 16B, the user may speak a voice command to the NMD 103*i*, such as "Play Mitski in the Dining Room and Kitchen." The NMD 103*i* may transmit data representing this voice input to the computing devices 106*a* of the VAS 190, which determine an intent of the voice command. In particular, the intent is to play the artist Mitski in the Dining Room and Kitchen.

The computing devices 106*a* transmit data representing this intent to the platform servers 1606. This data may be in the form of an intent and one or more parameters according to an intent-based API of the VAS 190. For instance, the computing devices 106*a* may determine that the intent is to playMusic with parameters <content>="Mitski" and <target>=["Dining Room", "Kitchen"]. Alternatively, such data maybe in the form of one or more API calls to the control API of the platform service, such as a play( ) function. The play( ) function may take content (i.e., "Mitski") and targets (i.e., Dining Room and Kitchen) as arguments. Other arguments are possible as well.

Although the voice input did not explicitly request grouping, since the voice input indicated two targets for playback, effecting the user's intent may require forming a group. Upon receiving such an intent, the one or more platform servers 1606 may determine whether the listed playback targets (i.e., Living Room and Dining Room) need to be grouped based on the state information (including group state information) for the media playback system 100 maintained by the one or more platform servers 1606. Then the one or more platform servers 1606 may call the group creation function 860*b*.

More broadly, the platform servers 1606 may translate data received from third party services into commands that correspond to a control API of the platform service. For instance, the platform servers 1606 may receive intent-based data from the computing devices 106*a* of the VAS 190 and translate this intent-based data into one or more commands according to the control API of the platform service. For instance, the platform servers 1606 may translate this intent-based data to a play( ) function and a createGroup( ) function.

In some cases, such translation is split upon between the platform servers 1606 and the media playback system. For instance, the platform servers 1606 may translate the data received from third party services into one or more commands with arguments. Then, the POC playback device 1602 may make the ultimate determinations on how to translate the arguments into state changes in the media playback system. Other examples are possible as well.

If the data from the VAS 190 includes a reference to an area as a playback target, the one or more platform servers 1606 may disambiguate the area into constituent groups. This operation may be similar to the disambiguation performed by the controller 104 in earlier examples. Similar to the earlier examples, the one or more platform servers 1606 may maintain the areaIDs used to create the group (e.g., by including them in an argument to the group creation function 860*b*, which are then used in the set area source function 860*c* by the POC playback device 1602).

Alternatively, the media playback system 100 may determine the necessary groupings. For example, the one or more platforms servers 1606 may call the createGroup( ) function with all playback targets indicated in the voice input. Then, in carrying out the createGroup( ) function, the POC playback device 1602 may determine how to construct a group from the indicated playback targets. For instance, the POC playback device 1602 may identify the largest subset of grouped playback devices who are indicated as targets, then modify that group as necessary to match the intent.

Similar to the FIG. 16A example, the POC playback device 1602 carries out the createGroup( ) function call. The POC playback device 1602 may carry out the createGroup( ) function call in a similar manner as described in the preceding section with respect to the POC playback device 102. That is, the POC playback device 1602 may select a group coordinator and update state information for group coordinator and group members to indicate their roles in the new group. In particular, as shown in FIG. 16B, the POC playback device 1602 updates state information for the playback device 102*i* (in the kitchen 102*i*) and the playback device 102*l* (in the dining room 101*g*).

To propagate the group information on the newly created group ("Dining Room+Kitchen"), the POC playback device 1602 may generate a group event with a groupObject 863 representing the newly created group (FIG. 8D). This groupObject 863 is propagated to subscribers of the group event, which may include the one or more platform servers 1606 and the controller devices 104*a* and 104*b*, among other devices in the media playback system. Further, the platform servers 1606 may forward or generate group events to the third-party service subscribing to the group events.

In some cases, grouping commands may originate from third-party controllers, such as streaming media service apps. As discussed above in connection with FIG. 4, a controller device may be a network device on which media playback system controller application software may be installed, such as for example, an iPhone™, iPad™ or any other smart phone, tablet, or network device (e.g., a networked computer such as a PC or Mac™). Such network devices may also or alternatively run streaming media service apps, which a user may use to select and stream media to the network device. Such devices may also allow the playback target to be changed from the network device to one or more playback devices using a streaming protocol.

Exemplary streaming protocols include APPLE® AIR-PLAY® AND SPOTIFY® CONNECT®.

In FIG. 16C, the user may start playing audio content on the controller device 104b using a streaming media service app using earbuds. Desiring to play the music out loud while preparing dinner, the user uses the streaming media service app corresponding to a particular streaming audio service (i.e., the MCS 192) to change the playback target from the controller device 104b to the Dining Room and Kitchen. This causes the streaming media service app to send one or more commands to the computing devices 106b. These commands are formed according to a streaming protocol of the streaming audio service.

Upon receiving these commands, the computing devices 106b send one or more commands to the one or more platform servers 1606. These commands may be in the form of an API call according to the streaming protocol of the streaming audio service. For instance, a streaming protocol play( ) function may take content (i.e., a URI indicating currently playing content at the controller device 104b) and targets (i.e., Dining Room and Kitchen) as arguments. The platform servers 1606 may implement streaming protocol so as to be configured to accept API calls according to the streaming protocol of the streaming audio service. Alternatively, the computing devices 106b of the MCS 192 may be configured to call into the control API of the media playback system 100.

Similar to the FIG. 16B example, although the play command did not specifically request grouping, since the voice input indicated two targets for playback, effecting the user's intent may require forming a group. Upon receiving such an intent, the one or more platform servers 1606 may determine whether the listed playback targets (i.e., Living Room and Dining Room) need to be grouped based on the state information (including group state information) for the media playback system 100 maintained by the one or more platform servers 1606. Then the one or more platform servers 1606 may call the group creation function 860b.

If the data from the MCS 192 includes a reference to an area as a playback target, the one or more platform servers 1606 may disambiguate the area into constituent groups. This operation may be similar to the disambiguation performed by the controller 104 in earlier examples. Similar to the earlier examples, the one or more platform servers 1606 may maintain the areaIDs used to create the group (e.g., by including them in an argument to the group creation function 860b, which are then used in the set area source function 860c by the POC playback device 1602). Alternatively, the media playback system 100 may determine the necessary groupings.

Similar to the FIGS. 16A and 16B examples, the POC playback device 1002 carries out the createGroup( ) function call. That is, the POC playback device 1002 may select a group coordinator and update state information for group coordinator and group members to indicate their roles in the new group. In particular, as shown in FIG. 16C, the POC playback device 1002 updates state information for the playback device 102i (in the kitchen 102i) and the playback device 102l (in the dining room 101g).

To propagate the group information on the newly created group ("Dining Room+Kitchen"), the POC playback device 1002 may generate a group event with a groupObject 863 representing the newly created group (FIG. 8D). This groupObject 863 is propagated to subscribers of the group event, which may include the one or more platform servers 1006 and the controller devices 104a and 104b, among other devices in the media playback system. Further, the platform servers 1006 may forward or generate group events to the third-party service subscribing to the group events.

Figure 17:
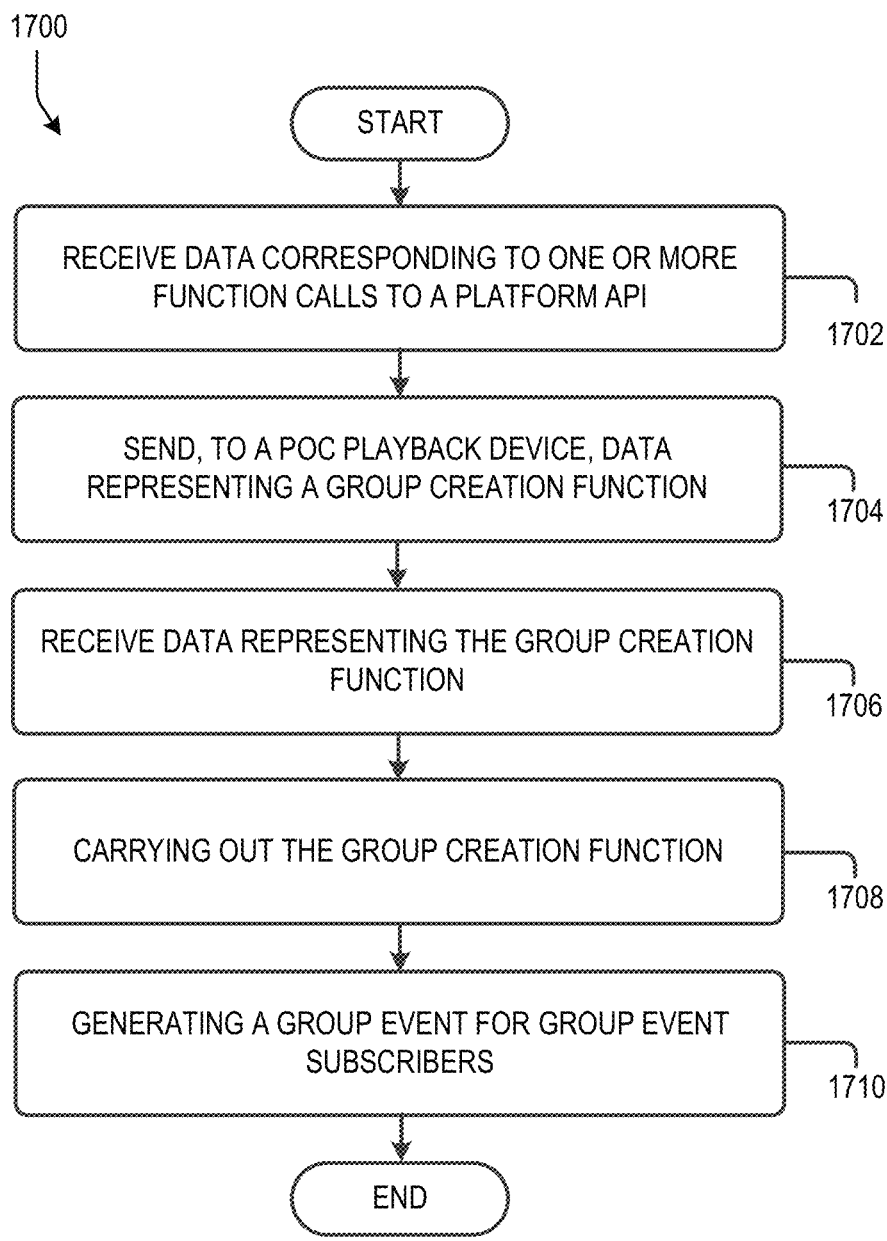
FIG. 17 is a flow diagram of an example method to create a synchrony group in the media playback system.

FIG. 17 is a flow diagram showing an example method 1700 to create a group in a media playback system via a cloud-based architecture. The method 1700 may be performed by a system including the one or more platform servers 1606 and a POC playback device 1602 (FIGS. 16A-16C). Alternatively, the method 1600 may be performed by any suitable device or by a system of devices, such as the playback devices 102, NMDs 103, control devices 104, computing devices 105 or computing devices 106.

At block 1702, the method 1700 involves receiving data corresponding to one or more function calls to a platform API. For example, the one or more platform servers 1606 may receive, via one or more network interfaces over a wide area network (e.g., the networks 107), data corresponding to one or more function calls to a platform API. The one or more function calls include a group creation function (e.g., the group creation function 860a of FIG. 8B) indicating, as one or more arguments (e.g., the playerIDs 861), two or more playback devices to group within the media playback system. The one or more arguments may also indicate an area identifier (e.g., the areaID 862 (FIG. 8A)), which represents an area pre-configured to include two or more constituent zones of the media playback system when instantiated.

In some cases, the one or more platform servers 1606 receive the data corresponding to one or more function calls from a first controller device of the media playback system. For instance, the controller device 104 may call the group creation function 860a (FIG. 16A). A user may select zones or areas for including in the group in a controller interface, such as controller interface 740b (FIG. 7B) or the controller interface 940b (FIG. 9B).

When an area is selected in a controller interface of a controller device 104, the method 1700 may involve the controller device 104 disambiguating the area indicated by the area identifier into zone identifiers representing the two or more constituent zones. A first argument of the group creation function may include a plurality of zone identifiers including the constituent zones, such as the playerIDs 861 [ ] (FIG. 8B). A second argument of the create group creation function may indicate the area identifier, such as the areaID 862a (FIG. 8B).

Alternatively, the one or more platform servers 1606 receive the data corresponding to one or more function calls from a third-party service. For instance, the one or more platform servers 1606 receive the data corresponding to one or more function calls from a server of a voice assistant service, such as the computing device 106a of the VAS 190 (FIG. 16B). As another example, the one or more platform servers 1606 receive the data corresponding to one or more function calls from a server of a streaming audio service, such as the computing device 106c of the MCS 192 (FIG. 16C). In such cases, the one or more platform servers may disambiguate the area indicated by the area identifier into zone identifiers representing the two or more constituent zones.

In some examples, the method 1700 involves translating from another API to the one or more function calls of the platform API. For instance, the one or more platform servers 1606 may translate data representing an intent determined from a voice input received from the VAS 190 to the one or more function calls of the platform API (FIG. 16B). As another example, the one or more platform servers 1606 may translate the one or more function calls of a streaming protocol API to the one or more function calls of the platform API (FIG. 16C).

At block 1704, the method 1700 involves sending, to a point-of-contact (POC) playback device, data representing the group creation function. For instance, the one or more platform servers 1606 may send to the POC playback device 1602 data representing the group creation function 860b. This data may represent a particular call of the function, including particular arguments, as discussed in connection with FIG. 8B. Such sending is illustrated in FIGS. 16A, 16B, and 16C.

At block 1706, the method 1700 involves receiving the data representing the group creation function. For example, the POC playback device 1602 may receive the data representing the group creation function 860b. Such sending is illustrated in FIGS. 16A, 16B, and 16C.

At block 1708, the method 1700 involves carrying out the group creation function. For instance, the POC playback device 1602 may carry out the group creation function, as discussed in connection with FIG. 8B, as well as FIGS. 16A, 16B, and 16C. As discussed in earlier sections, any playback device 102 in the media playback system 100 is capable of operating as the POC playback device 1602. However, in some implementations, the POC playback device 1602 is selected based on various parameters.

Carrying out the group creation function may involve selecting a group coordinator from among the two or more playback devices. The group coordinator distributes playback and timing information to the other playback devices in the synchrony group. The POC playback device 1602 may select group coordinator arbitrarily or based on one or more factors, as discussed in connection with FIG. 8B.

Carrying out the group creation function may involve setting state information of the selected group coordinator to indicate this role in the synchrony group. For instance, the POC playback device 1602 may modify state information of itself, the group coordinator, or a group member. These changes may be propagated through the group, as well as throughout the media playback system 100.

Carrying out the group creation function may also involve storing an indication of the areas which were designated in creating the groups. For instance, the POC playback device 1602 may set a source area identifier string on the group coordinator to indicate that the synchrony group includes the area via the area identifier. FIG. 8C illustrates an example set source area identifiers function 860c to set such a source area identifier string.

At block 1710, the method 1700 involves generating a group event for group event subscribers. For example, the POC playback device 1602 may generate a first group event for group event subscribers. Generating the event causes the group event subscribers to receive, via respective network interfaces, a first group object (such as the groupObject 863a-2 (FIG. 8D)). The first group object includes group state information corresponding to the synchrony group. Based on receiving the first group object, the group event subscribers update respective state information representing the synchrony group according to the first group object, as discussed above in connection with FIGS. 8D and 16A-16C, among other sections.

As noted above, in some examples, the group includes an area. In such examples, the first group object indicates the source area identifier string. Subscribers can use this areaIDs in the source area identifier string to populate controller interfaces (FIG. 9B).

Within examples, the POC playback device 1602 generates a second group event for group event subscribers. Generates a second group event may involve parsing the source area identifier string stored on the group coordinator into a set of area identifiers. Note that the POC playback device maintains also state information representing the source area identifier string, but the group coordinator stores the most recent version and operates as a source-of-truth for this string.

The POC playback device 1602 filters the one or more area identifiers corresponding to area that have been removed from the zone group from the set of area identifiers and generates a second group object comprising group state information corresponding to the synchrony group. The second group object includes a source area identifier string representing the filtered set. Generating the second group event causes the group event subscribers to receive, via respective network interfaces, the second group object and to update respective state information representing the synchrony group based on the second group object (FIG. 16A).

In further examples, the method 1700 involves storing data defining one or more areas. For instance, before receiving the data corresponding to one or more function calls, the POC playback device 1602 may receive, from a controller device, data representing a command to define a particular area (i.e., a saved group). When instantiated, the particular area includes one or more zones of the media playback system. Generally, the area includes two or more zones, as an area with one zone could be referred to by the zone itself. When a new area is defined, this change may be propagated through the media playback system using a event (e.g., an update event for update event subscribers), which causes update event subscribers to update respective state information to represent the particular area.

Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A method to be performed by a system comprising a point-of-contact (POC) playback device in a media playback system comprising a plurality of playback devices connected to a local area network connected to a local area network, the method comprising: receiving, via the network interface from one or more servers of a cloud service, data representing command intermediates comprising (i) an intermediate command and (ii) one or more intermediate parameters, wherein the command intermediates are based on a first command determination performed on a user input; performing a second command determination on the command intermediates to determine (i) one or more media playback system commands and (ii) one or more target playback devices from among the plurality of playback devices in the media playback system; and causing the determined one or more target playback devices to perform the determined one or more media playback system commands.

Example 2: The method of Example 1, wherein causing the determined one or more target playback devices to perform the determined one or more media playback system commands comprises updating state information on at least one target playback device according to the determined one or more media playback system commands; and generating a state update event for state event subscribers, wherein generating the state update event causes the state event subscribers to (i) receive, via respective network interfaces, a state object comprising state information modified by carrying out the determined one or more media playback system commands and (ii) update respective state information representing the state information modified by carrying out the determined one or more media playback system commands.

Example 3: The method of any of Examples 1-2, wherein the user input comprises a voice command, wherein the one or more intermediate parameters comprise a parameter indicating a network microphone device (NMD) that detected the voice command, and wherein performing the second command determination on the command intermediates comprises identifying at least one particular playback device as the one or more target playback devices based on the parameter indicating the NMD that detected the voice command.

Example 4: The method of Example 3, wherein the intermediate command is a volume adjustment command, and wherein identifying the one or more target playback devices comprises identifying the at least one particular playback device as the one or more target playback devices based on (i) an association between the NMD and the at least one particular playback device Example 5: The method of Example 4, wherein identifying the one or more target playback devices comprises identify one or more additional playback devices as the one or more target playback devices based on the at least one particular playback device being in a group with the one or more additional playback devices.

Example 6: The method of Example 3, wherein the intermediate command is a playback transfer command, and where performing the second command determination on the command intermediates comprises identifying the at least one particular playback device as the one or more target playback devices based on (i) an association between the NMD and the at least one particular playback device; and identifying particular audio content that is currently playing on one or more source playback devices to transfer to the one or more target playback devices based on a playback status of the one or more source playback devices indicating that the one or more source playback devices device are currently playing audio.

Example 7: The method of any preceding example, wherein the intermediate command comprises a playback command, and wherein performing the second command determination comprises: determining that the one or more intermediate parameters indicate a first target playback device and a second target playback device for the playback command; determining that the first target playback device and the second target playback device are ungrouped; and based on (i) the determination that the one or more intermediate parameters indicate the first target playback device and the second target playback device for the playback command and (ii) the determination that the first target playback device and the second target playback device are ungrouped, determine that the one or more media playback system commands include a group creation command to group the first target playback device and the second target playback device in a synchrony group to play back audio content in synchrony.

Example 8: The method of Example 7, wherein determining that the one or more intermediate parameters indicate the first target playback device and the second target playback device for the playback command comprises determining that a particular intermediate parameter represents an area identifier, the area identifier corresponding to an area pre-configured to include two or more constituent zones of the media playback system when instantiated, wherein the two or more zones comprise a first zone comprising the first playback device and a second zone comprising the second playback device.

Example 9: The method of any preceding Example, wherein performing the second command determination on the command intermediates comprises determine that the one or more media playback system commands comprise a group creation command to group the two or more playback devices in a synchrony group to play back audio content in synchrony in the media playback system, and wherein causing the determined one or more target playback devices to perform the determined one or more media playback system commands comprises selecting a group coordinator from among the two or more playback devices to distribute timing information to the other playback devices in the synchrony group; and updating state information on the group coordinator to indicate that the group coordinator is the group coordinator of the synchrony group.

Example 10: The method of Example 9, further comprising: before receiving the data corresponding to one or more function calls, the POC playback device receiving, from a controller device, data representing a command to define a particular area, wherein, when instantiated, the particular area comprises one or more zones of the media playback system; and the POC playback device generating an update event for update event subscribers, the update event causing update event subscribers to update respective state information to represent the particular area.

Example 11: The method of any preceding Example, wherein the intermediate command comprises a playback command, and wherein performing the second command determination on the command intermediates comprises determining that a particular user account is associated with the user input; and determining particular audio content for the playback command based on one or more of (i) one or more preferences of the user account and (ii) one or more zones that include the one or more target playback devices, and (iii) a time of day that the user input was received.

Example 12: The method of Example 11, wherein determining the particular audio content for the playback command comprises predicting a user activity based on one or more of (i) the one or more preferences of the user account and (ii) the one or more zones that include the one or more target playback devices, and (iii) the time of day that the user input was received; and determining the particular audio content based on the predicted user activity.

Example 13: The method of any preceding Example, wherein performing the second command determination on the command intermediates comprises: determining that the one or more intermediate parameters explicitly indicate a portable playback device; determining that the portable playback device is not currently available in the media playback system; and identifying one or more alternative playback devices as the one or more target playback devices.

Example 14: The method of any preceding Example, further comprising: updating status information in the media playback system to indicate status' of the one or more target playback devices after carrying out the determined one or more media playback system commands; and sending, via the network interface to the one or more servers of the cloud service, data representing a subset of the updated status information.

Example 15: The method of any preceding Example, wherein performing the second command determination comprises performing a secondary intent determination, wherein the one or more servers of the cloud service performed a primary intent determination on the user input.

Example 16: The method of any preceding Example, wherein the POC playback device is not one of the one or more target playback devices.

Example 17: A tangible, non-transitory, computer-readable medium having instructions stored thereon that are executable by one or more processors to cause a system to perform the method of any one of Examples 1-16.

Example 18: A device comprising a network interface, one or more processors, and a tangible, non-tangible computer-readable medium having instructions stored thereon that are executable by the one or more processors to cause the system to perform the method of any of Examples 1-16.

Example 19: A system comprising a network interface, one or more processors, and a tangible, non-tangible computer-readable medium having instructions stored thereon that are executable by the one or more processors to cause the system to perform the method of any of Examples 1-16.

Example 20: A system comprising one or more devices comprising a network interface, one or more processors, and a tangible, non-tangible computer-readable medium having instructions stored thereon that are executable by the one or more processors to cause the system to perform the method of any of Examples 1-16.

Example 21: A method to be performed by a system comprising one or more platform servers of a platform service and a point-of-contact (POC) playback device in a media playback system comprising a plurality of playback devices connected to a local area network, the method comprising: the one or more platform servers receiving, via one or more network interfaces from a first computing device over a wide area network, data corresponding to one or more function calls to a platform application programming interface (API), wherein the one or more function calls comprise a group creation function indicating, as one or more arguments, identifiers corresponding to two or more playback devices to group within the media playback system; the one or more platform servers, sending, via the one or more network interfaces to the POC playback device, data representing the group creation function; the POC playback device receiving, the data representing the group creation function; the POC playback device carrying out the group creation function to group the two or more playback devices in a synchrony group to play back audio content in synchrony in the media playback system, wherein carrying out the group creation function comprises: selecting a group coordinator from among the two or more playback devices to distribute playback and timing information to the other playback devices in the synchrony group; and updating state information on the group coordinator to indicate that the group coordinator is the group coordinator of the synchrony group; and the POC playback device generating a first group event for group event subscribers, wherein generating the first group event causes the group event subscribers to (i) receive, via respective network interfaces, a first group object comprising group state information corresponding to the synchrony group and (ii) update respective state information representing the synchrony group according to the first group object.

Example 22: The method of Example 20, wherein the one or more arguments of the group creation function indicate an area identifier, the identifier representing an area pre-configured to include two or more constituent zones of the media playback system when instantiated, each zone comprising one or more respective playback devices, and wherein carrying out the group creation function further comprises: the POC playback device setting a source area identifier string on the group coordinator to indicate that the synchrony group includes the area via the area identifier.

Example 23: The method of Example 22, wherein the first computing device is a first controller device of the media playback system, and wherein first controller device disambiguates the area indicated by the area identifier into zone identifiers representing the two or more constituent zones, and wherein a first argument of the group creation function indicates a plurality of zone identifiers comprising the two or more constituent zones and wherein a second argument of the group creation function indicates the area identifier Example 24: The method of Example 23, wherein the group event subscribers comprise a first controller device, wherein the group object indicates the source area identifier string, and wherein the first controller device displays a controller interface comprising an indication that the synchrony group includes the area via the area identifier in the source area identifier string Example 25: The method of any of Examples 22-24, wherein the method further comprises: the POC playback device generating a second group event for group event subscribers, wherein generating the second group event comprises: parsing the source area identifier string stored on the group coordinator into a set of area identifiers, wherein the POC playback device maintains state information representing the source area identifier string; filtering one or more area identifiers corresponding to area that have been removed from the zone group from the set of area identifiers; and generating a second group object comprising group state information corresponding to the synchrony group, the group state information comprising a source area identifier string representing the filtered set, and wherein generating the second group event causes the group event subscribers to (i) receive, via respective network interfaces, the second group object and (ii) update respective state information representing the synchrony group based on the second group object.

Example 26: The method of any of Examples 22-25, wherein the first computing device is a server of a voice assistant service, wherein the data representing one or more function calls to the platform API comprises data representing an intent determined from a voice input, and wherein the method further comprises: the one or more platform servers translating the intent to the one or more function calls of the platform API.

Example 27: The method of Example 26, wherein the method further comprises: the one or more platform servers disambiguating the area indicated by the area identifier into zone identifiers representing the two or more constituent zones.

Example 28: The method of any of Examples 22-27, wherein the first computing device is a server of a streaming audio service, and wherein data representing the one or more functions calls to the API comprises data representing one or more function calls to a streaming protocol API, and wherein the method further comprises translating the one or more function calls of the streaming protocol API to the one or more function calls of the platform API Example 29: The method of any of Examples 22-28, wherein the POC playback device is not one of the two or more playback devices in the synchrony group.

Example 30: The method of any of Examples 22-29, further comprising: before receiving the data corresponding to one or more function calls, the POC playback device receiving, from a controller device, data representing a command to define a particular area, wherein, when instantiated, the particular area comprises one or more zones of the media playback system; and the POC playback device generating an update event for update event subscribers, the update event causing update event subscribers to update respective state information to represent the particular area.

Example 31: A tangible, non-transitory, computer-readable medium having instructions stored thereon that are executable by one or more processors to cause a system to perform the method of any one of Examples 21-30.

Example 32: A device comprising a network interface, one or more processors, and a tangible, non-tangible computer-readable medium having instructions stored thereon that are executable by the one or more processors to cause the system to perform the method of any of Examples 21-30.

Example 33: A system comprising a network interface, one or more processors, and a tangible, non-tangible computer-readable medium having instructions stored thereon that are executable by the one or more processors to cause the system to perform the method of any of Examples 21-30.

Example 34: A system comprising one or more devices comprising a network interface, one or more processors, and a tangible, non-tangible computer-readable medium having instructions stored thereon that are executable by the one or more processors to cause the system to perform the method of any of Examples 21-30.

The invention claimed is:

1. A system comprising a point-of-contact (POC) Internet-of-Things (IoT) device in an IoT system comprising a plurality of IoT devices on a local area network, wherein the plurality of IoT devices comprises the POC IoT device, wherein the POC IoT device comprises a network interface, at least one processor and at least one non-transitory computer-readable medium including instructions that are executable by the at least one processor such that the POC IoT device is configured to:
   while connected to the local area network, receive, via the network interface from one or more servers of a cloud service, data representing command intermediates comprising (i) an intermediate command and (ii) one or more intermediate parameters, wherein the one or more servers are outside of the local area network, and wherein the command intermediates are based on a first command determination performed on a user input by at least one server outside of the local area network;
   perform a second command determination on the command intermediates to determine (i) one or more IoT system commands and (ii) one or more target IoT devices from among the plurality of IoT devices in the IoT system; and
   cause the determined one or more target IoT devices to perform the determined one or more IoT system commands.

2. The system of claim 1, wherein the instructions that are executable by the at least one processor such that the POC IoT device is configured to cause the determined one or more target IoT devices to perform the determined one or more IoT system commands comprise instructions that are executable by the at least one processor such that the POC IoT device is configured to:
   update state information on at least one target IoT device according to the determined one or more IoT system commands; and
   generate a state update event for state event subscribers, wherein generating the state update event causes the state event subscribers to (i) receive, via respective network interfaces, a state object comprising state information modified by carrying out the determined one or more IoT system commands and (ii) update respective state information representing the state information modified by carrying out the determined one or more IoT system commands.

3. The system of claim 1, wherein the user input comprises a voice command, wherein the one or more intermediate parameters comprise a parameter indicating a network microphone device (NMD) that detected the voice command, and wherein the instructions that are executable by the at least one processor such that the POC IoT device is configured to perform the second command determination on the command intermediates comprise instructions that are executable by the at least one processor such that the POC IoT device is configured to:
   identify at least one particular IoT device as the one or more target IoT devices based on the parameter indicating the NMD that detected the voice command.

4. The system of claim 3, wherein the instructions that are executable by the at least one processor such that the POC IoT device is configured to identify the one or more target IoT devices comprise instructions that are executable by the at least one processor such that the POC IoT device is configured to:

identify the at least one particular IoT device as the one or more target IoT devices based on an association between the NMD and the at least one particular IoT device.

5. The system of claim 4, wherein the instructions that are executable by the at least one processor such that the POC IoT device is configured to identify the one or more target IoT devices comprise instructions that are executable by the at least one processor such that the POC IoT device is further configured to:
identify one or more additional IoT devices as the one or more target IoT devices based on the at least one particular IoT device being in a group with the one or more additional IoT devices.

6. The system of claim 3, wherein the intermediate command is a IoT transfer command, wherein the instructions that are executable by the at least one processor such that the POC IoT device is configured to perform the second command determination on the command intermediates comprise instructions that are executable by the at least one processor such that the POC IoT device is configured to:
identify the at least one particular IoT device as the one or more target IoT devices based on (i) an association between the NMD and the at least one particular IoT device; and
identify one or more particular functions operating on the one or more source IoT devices to transfer to the one or more target IoT devices based on a IoT status of the one or more source IoT devices indicating that the one or more source IoT devices are performing the one or more particular functions.

7. The system of claim 1, and wherein the instructions that are executable by the at least one processor such that the POC IoT device is configured to perform the second command determination on the command intermediates comprise instructions that are executable by the at least one processor such that the POC IoT device is configured to:
determine that the one or more intermediate parameters indicate a first target IoT device and a second target IoT device;
determine that the first target IoT device and the second target IoT device are ungrouped; and
based on (i) the determination that the one or more intermediate parameters indicate the first target IoT device and the second target IoT device and (ii) the determination that the first target IoT device and the second target IoT device are ungrouped, determine that the one or more IoT system commands include a group creation command to group the first target IoT device and the second target IoT device in a group to perform the determined one or more IoT system commands.

8. The system of claim 7, wherein the instructions that are executable by the at least one processor such that the POC IoT device is configured to determine that the one or more intermediate parameters indicate the first target IoT device and the second target IoT device for the IoT command comprise instructions that are executable by the at least one processor such that the POC IoT device is configured to:
determine that a particular intermediate parameter represents an area identifier, the area identifier corresponding to an area pre-configured to include two or more constituent zones of the IoT system when instantiated, wherein the two or more constituent zones comprise a first zone comprising the first target IoT device and a second zone comprising the second target IoT device.

9. The system of claim 1, wherein the instructions that are executable by the at least one processor such that the POC IoT device is configured to perform the second command determination on the command intermediates comprise instructions that are executable by the at least one processor such that the POC IoT device is configured to determine that the one or more IoT system commands comprise a group creation command to group two or more IoT devices in a group to perform the determined one or more IoT system commands concurrently, and wherein the instructions that are executable by the at least one processor such that the POC IoT device is configured to cause the determined one or more target IoT devices to perform the determined one or more IoT system commands comprise instructions that are executable by the at least one processor such that the POC IoT device is configured to:
select a group coordinator from among the two or more IoT devices to distribute information to the other IoT devices in the group; and
update state information on the group coordinator to indicate that the group coordinator is the group coordinator of the group.

10. The system of claim 9, wherein the instructions are executable by the at least one processor such that the POC IoT device is further configured to:
generate a group event for group event subscribers, wherein generating the group event causes the group event subscribers to (i) receive, via respective network interfaces, a first group object comprising group state information corresponding to the group and (ii) update respective state information representing the group according to the first group object.

11. The system of claim 1, wherein the instructions that are executable by the at least one processor such that the POC IoT device is configured to perform the second command determination on the command intermediates comprise instructions that are executable by the at least one processor such that the POC IoT device is configured to:
determine that a particular user account is associated with the user input; and
determine particular parameters for the determined one or more IoT system commands based on one or more of (i) one or more preferences of the particular user account and (ii) one or more zones that include the one or more target IoT devices, and (iii) a time of day that the user input was received.

12. The system of claim 11, wherein the instructions that are executable by the at least one processor such that the POC IoT device is configured to determine the particular parameters for the determined one or more IoT system commands comprise instructions that are executable by the at least one processor such that the POC IoT device is configured to:
predict a user activity based on one or more of (i) the one or more preferences of the particular user account and (ii) the one or more zones that include the one or more target IoT devices, and (iii) the time of day that the user input was received; and
determine the particular parameters based on the predicted user activity.

13. The system of claim 1, wherein the instructions that are executable by the at least one processor such that the POC IoT device is configured to perform the second command determination on the command intermediates comprise instructions that are executable by the at least one processor such that the POC IoT device is configured to:
determine that the one or more intermediate parameters explicitly indicate a portable IoT device;

determine that the portable IoT device is not currently available in the IoT system; and identify one or more alternative IoT devices as the one or more target IoT devices.

14. The system of claim 1, wherein the instructions are executable by the at least one processor such that the POC IoT device is further configured to:

update status information in the IoT system to indicate status' of the one or more target IoT devices after carrying out the determined one or more IoT system commands; and send, via the network interface to the one or more servers of the cloud service, data representing a subset of the updated status information.

15. The system of claim 1, wherein the instructions that are executable by the at least one processor such that the POC IoT device is configured to perform the second command determination comprise instructions that are executable by the at least one processor such that the POC IoT device is configured to:

perform a secondary intent determination, wherein the one or more servers of the cloud service performed a primary intent determination on the user input.

16. The system of claim 1, wherein the POC IoT device is not one of the one or more target IoT devices.

17. The system of claim 1, wherein the cloud service comprises the at least one server.

18. The system of claim 1, wherein an additional cloud service comprises the at least one server.

19. A method to be performed by a system comprising a point-of-contact (POC) IoT device in an IoT system comprising a plurality of IoT devices connected to a local area network, the method comprising:

while the POC IoT device is connected to the local area network, receiving, via a network interface of the POC IoT device from one or more servers of a cloud service, data representing command intermediates comprising (i) an intermediate command and (ii) one or more intermediate parameters, wherein the one or more servers are outside of the local area network, and wherein the command intermediates are based on a first command determination performed on a user input by at least one server outside of the local area network;

performing a second command determination on the command intermediates to determine (i) one or more IoT system commands and (ii) one or more target playback devices from among the plurality of IoT devices in the IoT system, wherein the plurality of IoT devices comprise the POC IoT device, and wherein the plurality of IoT devices are on the local area network; and sending, via the local area network, instructions to cause the determined one or more target IoT devices to perform the determined one or more IoT system commands.

20. A point-of-contact (POC) IoT device comprising:

a network interface, at least one processor and at least one non-transitory computer-readable medium including instructions that are executable by the at least one processor such that the POC IoT device is configured to:

while the POC IoT device is connected to a local area network, receive, via the network interface from one or more servers of a cloud service, data representing command intermediates comprising (i) an intermediate command and (ii) one or more intermediate parameters, wherein the one or more servers are outside of the local area network, and wherein the command intermediates are based on a first command determination performed on a user input by at least one server outside of the local area network;

perform a second command determination on the command intermediates to determine (i) one or more IoT system commands and (ii) one or more target IoT devices from among a plurality of IoT devices in an IoT system, wherein the plurality of IoT devices comprise the POC IoT device, and wherein the plurality of IoT devices are on the local area network; and cause the determined one or more target IoT devices to perform the determined one or more IoT system commands.

* * * * *

UNITED STATES PATENT AND TRADEMARK OFFICE
CERTIFICATE OF CORRECTION

PATENT NO. : 12,495,179 B2  
APPLICATION NO. : 18/811338  
DATED : December 9, 2025  
INVENTOR(S) : Casimiro et al.

Page 1 of 1

It is certified that error appears in the above-identified patent and that said Letters Patent is hereby corrected as shown below:

In the Claims

In Column 67, in Claim 7, Line 32, after "claim 1," delete "and".

In Column 70, in Claim 20, Line 16, delete "processor" and insert -- processor, --, therefor.

Signed and Sealed this  
Third Day of February, 2026

John A. Squires  
*Director of the United States Patent and Trademark Office*